(12) United States Patent
Chaudhri et al.

(10) Patent No.: US 11,126,321 B2
(45) Date of Patent: Sep. 21, 2021

(54) APPLICATION MENU USER INTERFACE

(75) Inventors: Imran A. Chaudhri, San Francisco, CA (US); Scott Herz, San Jose, CA (US); Steven Jobs, Palo Alto, CA (US); Freddy A. Anzures, San Francisco, CA (US); Greg Christie, San Jose, CA (US)

(73) Assignee: Apple Inc., Cupertino, CA (US)

( * ) Notice: Subject to any disclaimer, the term of this patent is extended or adjusted under 35 U.S.C. 154(b) by 501 days.

(21) Appl. No.: 11/850,005

(22) Filed: Sep. 4, 2007

(65) Prior Publication Data

US 2009/0064055 A1 Mar. 5, 2009

(51) Int. Cl.
*G06F 3/0481* (2013.01)
*G06F 3/0482* (2013.01)
*G06F 3/0488* (2013.01)
*G06F 3/0483* (2013.01)

(52) U.S. Cl.
CPC ........ *G06F 3/04817* (2013.01); *G06F 3/0482* (2013.01); *G06F 3/0483* (2013.01); *G06F 3/04883* (2013.01)

(58) Field of Classification Search
USPC ....... 715/863, 839, 782, 848, 853, 855, 763, 715/765, 864
See application file for complete search history.

(56) References Cited

U.S. PATENT DOCUMENTS

| | | | |
|---|---|---|---|
| 5,051,736 A | 9/1991 | Bennett et al. | |
| 5,072,412 A * | 12/1991 | Henderson, Jr. | G06F 3/0481 715/804 |
| 5,146,556 A | 9/1992 | Hullot et al. | |
| 5,196,838 A | 3/1993 | Meier et al. | |
| 5,233,687 A * | 8/1993 | Henderson, Jr. | G06F 3/0481 715/804 |
| 5,394,521 A * | 2/1995 | Henderson, Jr. | G06F 3/0481 715/804 |
| 5,491,778 A | 2/1996 | Gordon et al. | |
| 5,564,002 A * | 10/1996 | Brown | G09G 5/14 715/778 |
| 5,598,524 A | 1/1997 | Johnston, Jr. et al. | |
| 5,610,653 A | 3/1997 | Abecassis | |

(Continued)

FOREIGN PATENT DOCUMENTS

| | | |
|---|---|---|
| AU | 2006338183 A1 | 8/2007 |
| AU | 2012202140 A1 | 5/2012 |

(Continued)

OTHER PUBLICATIONS

Apple, "Iphone User Guide", iPhone first generation, released on Jun. 29, 2007, 124 pages.*

(Continued)

*Primary Examiner* — Reza Nabi
(74) *Attorney, Agent, or Firm* — Dentons US LLP

(57) ABSTRACT

Methods, systems, and apparatus, including computer program products, for presenting user interface elements. A first page of one or more user interface elements is presented on a touch-sensitive display. Each of the user interface elements corresponds to a respective application. A gesture performed on the touch-sensitive display is detected. In response to the detected gesture, a second page of one or more user interface elements is presented on the touch-sensitive display.

30 Claims, 18 Drawing Sheets

(56) References Cited

U.S. PATENT DOCUMENTS

| | | | |
|---|---|---|---|
| 5,612,719 A | 3/1997 | Beernink et al. | |
| 5,621,878 A | 4/1997 | Owens et al. | |
| 5,642,490 A | 6/1997 | Morgan et al. | |
| 5,644,739 A | 7/1997 | Moursund | |
| 5,657,049 A | 8/1997 | Ludolph et al. | |
| 5,678,015 A * | 10/1997 | Goh | G06F 3/04815 |
| | | | 345/419 |
| 5,726,687 A | 3/1998 | Belfiore et al. | |
| 5,745,096 A | 4/1998 | Ludolph et al. | |
| 5,745,116 A | 4/1998 | Pisutha-Arnond | |
| 5,745,910 A | 4/1998 | Piersol et al. | |
| 5,754,179 A | 5/1998 | Hocker et al. | |
| 5,757,371 A | 5/1998 | Oran et al. | |
| 5,760,773 A | 6/1998 | Berman et al. | |
| 5,774,119 A | 6/1998 | Alimpich et al. | |
| 5,796,401 A | 8/1998 | Winer | |
| 5,812,862 A | 9/1998 | Smith et al. | |
| 5,825,349 A | 10/1998 | Maier et al. | |
| 5,825,357 A | 10/1998 | Malamud et al. | |
| 5,841,435 A * | 11/1998 | Dauerer | G06F 3/0481 |
| | | | 715/775 |
| 5,870,683 A | 2/1999 | Wells et al. | |
| 5,877,765 A | 3/1999 | Dickman et al. | |
| 5,914,716 A | 6/1999 | Rubin et al. | |
| 5,914,717 A | 6/1999 | Kleewein et al. | |
| 5,923,327 A | 7/1999 | Smith et al. | |
| 5,923,908 A | 7/1999 | Schrock et al. | |
| 5,934,707 A | 8/1999 | Johnson | |
| 5,963,204 A | 10/1999 | Ikeda et al. | |
| 5,995,106 A | 11/1999 | Naughton et al. | |
| 6,025,842 A | 2/2000 | Filetto et al. | |
| 6,043,818 A * | 3/2000 | Nakano | G06F 3/04815 |
| | | | 345/473 |
| 6,049,336 A | 4/2000 | Liu et al. | |
| 6,069,626 A | 5/2000 | Cline et al. | |
| 6,072,486 A | 6/2000 | Sheldon et al. | |
| 6,073,036 A | 6/2000 | Heikkinen et al. | |
| 6,111,573 A | 8/2000 | McComb et al. | |
| 6,133,914 A | 10/2000 | Rogers et al. | |
| 6,144,863 A | 11/2000 | Charron | |
| 6,145,083 A | 11/2000 | Shaffer et al. | |
| 6,177,936 B1 | 1/2001 | Cragun | |
| 6,188,407 B1 | 2/2001 | Smith et al. | |
| 6,195,094 B1 | 2/2001 | Celebiler | |
| 6,199,082 B1 | 3/2001 | Ferrel et al. | |
| 6,211,858 B1 | 4/2001 | Moon et al. | |
| 6,229,542 B1 | 5/2001 | Miller | |
| 6,243,080 B1 | 6/2001 | Molne | |
| 6,256,008 B1 | 7/2001 | Sparks et al. | |
| 6,262,732 B1 | 7/2001 | Coleman et al. | |
| 6,262,735 B1 | 7/2001 | Etelaperä | |
| 6,271,841 B1 | 8/2001 | Tsujimoto | |
| 6,275,935 B1 | 8/2001 | Barlow et al. | |
| 6,278,454 B1 | 8/2001 | Krishnan | |
| 6,297,795 B1 | 10/2001 | Kato et al. | |
| 6,313,853 B1 | 11/2001 | Lamontagne et al. | |
| 6,313,855 B1 | 11/2001 | Shuping et al. | |
| 6,317,140 B1 | 11/2001 | Livingston et al. | |
| 6,323,846 B1 | 11/2001 | Westerman et al. | |
| 6,326,970 B1 | 12/2001 | Mott et al. | |
| 6,349,410 B1 | 2/2002 | Lortz | |
| 6,353,451 B1 | 3/2002 | Teibel et al. | |
| 6,359,615 B1 | 3/2002 | Singh | |
| 6,377,698 B1 | 4/2002 | Cumoli et al. | |
| 6,396,520 B1 | 5/2002 | Ording | |
| 6,407,757 B1 | 6/2002 | Ho et al. | |
| 6,411,283 B1 | 6/2002 | Murphy | |
| 6,433,801 B1 | 8/2002 | Moon et al. | |
| 6,466,198 B1 | 10/2002 | Feinstein | |
| 6,466,203 B2 | 10/2002 | Van Ee | |
| 6,486,895 B1 | 11/2002 | Robertson et al. | |
| 6,489,975 B1 | 12/2002 | Patil et al. | |
| 6,496,182 B1 | 12/2002 | Wong et al. | |
| 6,545,669 B1 | 4/2003 | Kinawi et al. | |
| 6,570,557 B1 | 5/2003 | Westerman et al. | |
| 6,570,583 B1 | 5/2003 | Kung et al. | |
| 6,590,568 B1 | 7/2003 | Astala et al. | |
| 6,597,391 B2 | 7/2003 | Hudson | |
| 6,613,100 B2 | 9/2003 | Miller | |
| 6,621,768 B1 | 9/2003 | Keller et al. | |
| 6,628,309 B1 * | 9/2003 | Dodson | G06F 3/0486 |
| | | | 715/769 |
| 6,629,793 B1 | 10/2003 | Miller | |
| 6,639,584 B1 | 10/2003 | Li | |
| 6,677,932 B1 | 1/2004 | Westerman | |
| 6,683,628 B1 * | 1/2004 | Nakagawa | G06F 3/0485 |
| | | | 345/672 |
| 6,700,612 B1 | 3/2004 | Anderson et al. | |
| 6,710,788 B1 * | 3/2004 | Freach | G06F 3/0481 |
| | | | 715/778 |
| 6,714,222 B1 | 3/2004 | Bjorn et al. | |
| 6,727,916 B1 | 4/2004 | Ballard | |
| 6,763,388 B1 | 7/2004 | Tsimelzon | |
| 6,771,250 B1 | 8/2004 | Oh | |
| 6,781,575 B1 | 8/2004 | Hawkins et al. | |
| 6,820,111 B1 | 11/2004 | Rubin et al. | |
| 6,915,294 B1 | 7/2005 | Singh et al. | |
| 6,915,490 B1 | 7/2005 | Ewing | |
| 6,928,461 B2 | 8/2005 | Tuli | |
| 6,931,601 B2 | 8/2005 | Vronay et al. | |
| 6,934,911 B2 | 8/2005 | Salmimaa et al. | |
| 6,940,494 B2 | 9/2005 | Hoshino et al. | |
| 6,950,949 B1 | 9/2005 | Gilchrist | |
| 6,956,564 B1 | 10/2005 | Williams | |
| 6,970,749 B1 | 11/2005 | Chinn et al. | |
| 6,976,210 B1 | 12/2005 | Silva et al. | |
| 6,978,127 B1 | 12/2005 | Bulthuis et al. | |
| 6,987,991 B2 | 1/2006 | Nelson | |
| 6,990,452 B1 | 1/2006 | Ostermann et al. | |
| 7,003,495 B1 * | 2/2006 | Burger | G06F 21/6218 |
| | | | 235/375 |
| 7,007,239 B1 | 2/2006 | Hawkins et al. | |
| 7,010,755 B2 * | 3/2006 | Anderson | G06F 3/0481 |
| | | | 715/751 |
| 7,017,118 B1 | 3/2006 | Carroll | |
| 7,030,861 B1 | 4/2006 | Westerman et al. | |
| 7,054,965 B2 | 5/2006 | Bell et al. | |
| 7,071,943 B2 | 7/2006 | Adler | |
| 7,075,512 B1 | 7/2006 | Fabre et al. | |
| 7,085,590 B2 | 8/2006 | Kennedy et al. | |
| 7,093,201 B2 | 8/2006 | Duarte | |
| 7,133,859 B1 | 11/2006 | Wong | |
| 7,134,095 B1 | 11/2006 | Smith et al. | |
| 7,149,549 B1 | 12/2006 | Ortiz et al. | |
| 7,166,791 B2 | 1/2007 | Robbin et al. | |
| 7,167,731 B2 | 1/2007 | Nelson | |
| 7,171,625 B1 | 1/2007 | Sacchi | |
| 7,221,933 B2 | 5/2007 | Sauer et al. | |
| 7,231,229 B1 | 6/2007 | Hawkins et al. | |
| 7,283,845 B2 | 10/2007 | De Bast | |
| 7,310,636 B2 | 12/2007 | Bodin et al. | |
| 7,330,875 B1 * | 2/2008 | Parasnis | G06Q 10/10 |
| | | | 709/203 |
| 7,346,855 B2 | 3/2008 | Hellyar et al. | |
| 7,355,593 B2 | 4/2008 | Hill et al. | |
| 7,360,166 B1 | 4/2008 | Krzanowski | |
| 7,362,331 B2 | 4/2008 | Ording | |
| 7,403,910 B1 | 7/2008 | Hastings et al. | |
| 7,432,928 B2 | 10/2008 | Shaw et al. | |
| 7,434,177 B1 | 10/2008 | Ording et al. | |
| 7,437,005 B2 | 10/2008 | Drucker et al. | |
| 7,461,353 B2 | 12/2008 | Rohrabaugh et al. | |
| 7,480,870 B2 | 1/2009 | Anzures et al. | |
| 7,487,467 B1 | 2/2009 | Kawahara et al. | |
| 7,490,295 B2 | 2/2009 | Chaudhri et al. | |
| 7,493,573 B2 | 2/2009 | Wagner | |
| 7,506,268 B2 | 3/2009 | Jennings et al. | |
| 7,509,588 B2 | 3/2009 | van Os et al. | |
| 7,512,898 B2 | 3/2009 | Jennings et al. | |
| 7,526,738 B2 | 4/2009 | Ording et al. | |
| 7,546,548 B2 | 6/2009 | Chew et al. | |
| 7,546,554 B2 | 6/2009 | Chiu et al. | |
| 7,561,874 B2 | 7/2009 | Wang et al. | |
| 7,587,671 B2 | 9/2009 | Saft et al. | |

(56) References Cited

U.S. PATENT DOCUMENTS

| | | |
|---|---|---|
| 7,587,683 B2 | 9/2009 | Ito et al. |
| 7,603,105 B2 | 10/2009 | Bocking et al. |
| 7,614,008 B2 | 11/2009 | Ording |
| 7,620,894 B1 | 11/2009 | Kahn et al. |
| 7,624,357 B2 | 11/2009 | De Bast |
| 7,633,076 B2 | 12/2009 | Huppi et al. |
| 7,642,934 B2 | 1/2010 | Scott |
| 7,650,137 B2 | 1/2010 | Jobs et al. |
| 7,653,883 B2 | 1/2010 | Hotelling et al. |
| 7,657,252 B2 | 2/2010 | Futami |
| 7,657,849 B2 | 2/2010 | Chaudhri et al. |
| 7,663,607 B2 | 2/2010 | Hotelling et al. |
| 7,669,135 B2 | 2/2010 | Cunningham et al. |
| 7,683,889 B2 | 3/2010 | Rimas Ribikauskas et al. |
| 7,694,231 B2 | 4/2010 | Kocienda et al. |
| 7,719,542 B1 | 5/2010 | Gough et al. |
| 7,720,893 B2 | 5/2010 | Boudreau et al. |
| 7,730,401 B2 | 6/2010 | Gillespie et al. |
| 7,735,018 B2 * | 6/2010 | Bakhash ............ G06F 3/04817 715/782 |
| 7,735,021 B2 | 6/2010 | Padawer et al. |
| 7,739,271 B2 | 6/2010 | Cook et al. |
| 7,739,604 B1 | 6/2010 | Lyons et al. |
| 7,747,289 B2 | 6/2010 | Wang et al. |
| 7,783,583 B2 | 8/2010 | Sendhoff et al. |
| 7,783,990 B2 | 8/2010 | Amadio et al. |
| 7,788,583 B1 | 8/2010 | Amzallag et al. |
| 7,805,684 B2 | 9/2010 | Arvilommi |
| 7,810,038 B2 | 10/2010 | Matsa et al. |
| 7,831,926 B2 | 11/2010 | Rohrabaugh et al. |
| 7,835,729 B2 | 11/2010 | Hyon |
| 7,840,901 B2 | 11/2010 | Lacey et al. |
| 7,844,889 B2 | 11/2010 | Rohrabaugh et al. |
| 7,844,914 B2 | 11/2010 | Andre et al. |
| 7,853,972 B2 | 12/2010 | Brodersen et al. |
| 7,856,602 B2 | 12/2010 | Armstrong |
| 7,873,356 B2 * | 1/2011 | Flynt ............ H04M 1/72469 455/418 |
| 7,917,846 B2 | 3/2011 | Decker et al. |
| 7,934,152 B2 | 4/2011 | Krishnamurthy et al. |
| 7,940,250 B2 * | 5/2011 | Forstall ............ G06F 3/04817 345/173 |
| 7,957,762 B2 | 6/2011 | Herz et al. |
| 7,958,457 B1 | 6/2011 | Brandenberg et al. |
| 7,996,789 B2 | 8/2011 | Louch et al. |
| 8,006,002 B2 | 8/2011 | Kalayjian et al. |
| 8,099,441 B2 | 1/2012 | Surasinghe |
| 8,108,791 B2 * | 1/2012 | Wang ............ G06F 3/0485 715/778 |
| 8,127,239 B2 | 2/2012 | Louch et al. |
| 8,205,172 B2 | 6/2012 | Wong et al. |
| 8,239,784 B2 | 8/2012 | Hotelling et al. |
| 8,266,550 B1 * | 9/2012 | Cleron ............ G06F 3/04845 715/863 |
| 8,279,180 B2 | 10/2012 | Hotelling et al. |
| 8,306,515 B2 | 11/2012 | Ryu et al. |
| 8,312,371 B2 * | 11/2012 | Ording ............ G06F 3/04845 715/700 |
| 8,365,084 B1 | 1/2013 | Lin et al. |
| 8,381,135 B2 | 2/2013 | Hotelling et al. |
| 8,446,371 B2 | 5/2013 | Fyke et al. |
| 8,479,122 B2 | 7/2013 | Hotelling et al. |
| 8,519,964 B2 | 8/2013 | Platzer et al. |
| 8,519,972 B2 | 8/2013 | Forstall |
| 8,521,146 B2 * | 8/2013 | Lee ............ G06F 3/04817 455/418 |
| 8,558,808 B2 | 10/2013 | Forstall |
| 8,564,544 B2 | 10/2013 | Jobs et al. |
| 8,601,370 B2 * | 12/2013 | Chiang ............ G06F 3/0482 715/700 |
| 8,619,038 B2 | 12/2013 | Chaudhri et al. |
| 8,677,284 B2 * | 3/2014 | Aguilar ............ G06F 3/04883 715/863 |
| 8,681,105 B2 * | 3/2014 | Huh ............ H04M 1/72427 345/173 |
| 8,788,954 B2 | 7/2014 | Lemay et al. |
| 8,832,585 B2 * | 9/2014 | Missig ............ G06F 3/04817 715/778 |
| 8,850,351 B2 * | 9/2014 | Beharie ............ G06F 3/0481 715/778 |
| 9,256,627 B2 | 2/2016 | Surasinghe |
| 9,367,232 B2 | 6/2016 | Platzer et al. |
| 9,386,432 B2 | 7/2016 | Chu et al. |
| 9,619,143 B2 | 4/2017 | Herz et al. |
| 9,927,970 B2 | 3/2018 | Ording et al. |
| 2001/0024195 A1 | 9/2001 | Hayakawa |
| 2001/0024212 A1 | 9/2001 | Ohnishi |
| 2002/0008691 A1 | 1/2002 | Hanajima et al. |
| 2002/0015024 A1 | 2/2002 | Westerman et al. |
| 2002/0015042 A1 | 2/2002 | Robotham et al. |
| 2002/0015064 A1 | 2/2002 | Robotham et al. |
| 2002/0018051 A1 | 2/2002 | Singh |
| 2002/0024540 A1 | 2/2002 | McCarthy |
| 2002/0038299 A1 | 3/2002 | Zernik et al. |
| 2002/0054090 A1 | 5/2002 | Silva et al. |
| 2002/0067376 A1 | 6/2002 | Martin et al. |
| 2002/0085037 A1 | 7/2002 | Leavitt et al. |
| 2002/0093531 A1 | 7/2002 | Barile |
| 2002/0104096 A1 | 8/2002 | Cramer et al. |
| 2002/0109721 A1 | 8/2002 | Konaka et al. |
| 2002/0123368 A1 | 9/2002 | Yamadera et al. |
| 2002/0149561 A1 | 10/2002 | Fukumoto et al. |
| 2002/0152283 A1 | 10/2002 | Dutta et al. |
| 2002/0188948 A1 | 12/2002 | Florence |
| 2002/0191029 A1 | 12/2002 | Gillespie et al. |
| 2002/0196238 A1 | 12/2002 | Tsukada et al. |
| 2003/0007012 A1 | 1/2003 | Bate |
| 2003/0013483 A1 * | 1/2003 | Ausems ............ H04M 1/7243 455/556.1 |
| 2003/0014415 A1 | 1/2003 | Weiss et al. |
| 2003/0016241 A1 | 1/2003 | Burke |
| 2003/0025676 A1 | 2/2003 | Cappendijk |
| 2003/0030664 A1 | 2/2003 | Parry |
| 2003/0033331 A1 | 2/2003 | Sena et al. |
| 2003/0044021 A1 * | 3/2003 | Wilkinson ............ G06F 1/163 381/56 |
| 2003/0048295 A1 | 3/2003 | Lilleness et al. |
| 2003/0063072 A1 | 4/2003 | Brandenberg et al. |
| 2003/0063125 A1 | 4/2003 | Miyajima et al. |
| 2003/0081135 A1 | 5/2003 | Boll |
| 2003/0090572 A1 | 5/2003 | Belz et al. |
| 2003/0095135 A1 | 5/2003 | Kaasila et al. |
| 2003/0095155 A1 | 5/2003 | Johnson |
| 2003/0117427 A1 | 6/2003 | Haughawout et al. |
| 2003/0117440 A1 | 6/2003 | Hellyar et al. |
| 2003/0122787 A1 | 7/2003 | Zimmerman et al. |
| 2003/0132938 A1 | 7/2003 | Shibao |
| 2003/0164861 A1 | 9/2003 | Barbanson et al. |
| 2003/0169298 A1 | 9/2003 | Ording |
| 2003/0174172 A1 | 9/2003 | Conrad et al. |
| 2003/0179240 A1 * | 9/2003 | Gest ............ G06F 3/0481 715/779 |
| 2003/0184552 A1 | 10/2003 | Chadha |
| 2003/0184587 A1 | 10/2003 | Ording et al. |
| 2003/0193524 A1 | 10/2003 | Bates et al. |
| 2003/0200289 A1 | 10/2003 | Kemp et al. |
| 2003/0206195 A1 | 11/2003 | Matsa et al. |
| 2003/0206197 A1 | 11/2003 | McInerney |
| 2003/0210280 A1 * | 11/2003 | Baker ............ H04M 1/72469 715/835 |
| 2003/0225811 A1 | 12/2003 | Ali et al. |
| 2004/0021643 A1 | 2/2004 | Hoshino et al. |
| 2004/0041849 A1 | 3/2004 | Mock et al. |
| 2004/0056809 A1 | 3/2004 | Prassmayer et al. |
| 2004/0056839 A1 | 3/2004 | Yoshihara |
| 2004/0093582 A1 | 5/2004 | Segura |
| 2004/0095379 A1 * | 5/2004 | Chang ............ G06Q 10/10 715/727 |
| 2004/0103156 A1 | 5/2004 | Quillen et al. |
| 2004/0103371 A1 | 5/2004 | Chen et al. |
| 2004/0109013 A1 | 6/2004 | Goertz |

(56) References Cited

U.S. PATENT DOCUMENTS

| | | |
|---|---|---|
| 2004/0109025 A1 | 6/2004 | Hullot et al. |
| 2004/0121823 A1 | 6/2004 | Noesgaard et al. |
| 2004/0125088 A1 | 7/2004 | Zimmerman et al. |
| 2004/0138569 A1 | 7/2004 | Grunwald et al. |
| 2004/0141011 A1 | 7/2004 | Smethers et al. |
| 2004/0143796 A1 | 7/2004 | Lerner et al. |
| 2004/0155909 A1 | 8/2004 | Wakner |
| 2004/0169674 A1 | 9/2004 | Linjama |
| 2004/0177148 A1 | 9/2004 | Tsimelzon |
| 2004/0201595 A1 | 10/2004 | Manchester |
| 2004/0205492 A1 | 10/2004 | Newsome |
| 2004/0205496 A1 | 10/2004 | Dutta et al. |
| 2004/0215719 A1 | 10/2004 | Altshuler |
| 2004/0221006 A1 | 11/2004 | Gopalan et al. |
| 2004/0222975 A1 | 11/2004 | Nakano et al. |
| 2004/0268400 A1 | 12/2004 | Barde et al. |
| 2005/0005246 A1 | 1/2005 | Card et al. |
| 2005/0005248 A1 | 1/2005 | Rockey et al. |
| 2005/0010955 A1 | 1/2005 | Elia et al. |
| 2005/0020317 A1 | 1/2005 | Koyama |
| 2005/0024341 A1 | 2/2005 | Gillespie et al. |
| 2005/0026644 A1 | 2/2005 | Lien |
| 2005/0039134 A1 | 2/2005 | Wiggeshoff et al. |
| 2005/0044509 A1 | 2/2005 | Hunleth et al. |
| 2005/0057524 A1 | 3/2005 | Hill et al. |
| 2005/0057548 A1 | 3/2005 | Kim |
| 2005/0060653 A1 | 3/2005 | Fukase et al. |
| 2005/0060664 A1 | 3/2005 | Rogers |
| 2005/0060665 A1 | 3/2005 | Rekimoto |
| 2005/0066286 A1 | 3/2005 | Makela |
| 2005/0071364 A1 | 3/2005 | Xie et al. |
| 2005/0071736 A1 | 3/2005 | Schneider et al. |
| 2005/0071778 A1 | 3/2005 | Tokkonen |
| 2005/0078804 A1 | 4/2005 | Yomoda |
| 2005/0079896 A1 | 4/2005 | Kokko et al. |
| 2005/0088423 A1 | 4/2005 | Keely et al. |
| 2005/0091609 A1 | 4/2005 | Matthews et al. |
| 2005/0093826 A1 | 5/2005 | Huh |
| 2005/0097089 A1 | 5/2005 | Nielsen et al. |
| 2005/0108657 A1 | 5/2005 | Han |
| 2005/0114788 A1 | 5/2005 | Fabritius |
| 2005/0116026 A1 | 6/2005 | Burger et al. |
| 2005/0120142 A1 | 6/2005 | Hall |
| 2005/0134578 A1 | 6/2005 | Chambers et al. |
| 2005/0138569 A1 | 6/2005 | Baxter et al. |
| 2005/0154798 A1* | 7/2005 | Nurmi .................. G06F 1/1626 710/1 |
| 2005/0156873 A1 | 7/2005 | Walter et al. |
| 2005/0166232 A1 | 7/2005 | Lamkin et al. |
| 2005/0169527 A1 | 8/2005 | Longe et al. |
| 2005/0177783 A1 | 8/2005 | Agrawala et al. |
| 2005/0183017 A1 | 8/2005 | Cain |
| 2005/0190059 A1 | 9/2005 | Wehrenberg |
| 2005/0192924 A1 | 9/2005 | Drucker et al. |
| 2005/0204385 A1 | 9/2005 | Sull et al. |
| 2005/0210018 A1 | 9/2005 | Singh et al. |
| 2005/0210369 A1 | 9/2005 | Damm, Jr. |
| 2005/0210403 A1 | 9/2005 | Satanek |
| 2005/0216913 A1 | 9/2005 | Gemmell et al. |
| 2005/0229102 A1 | 10/2005 | Watson et al. |
| 2005/0229118 A1 | 10/2005 | Chiu et al. |
| 2005/0250438 A1 | 11/2005 | Makipaa et al. |
| 2005/0251755 A1 | 11/2005 | Mullins et al. |
| 2005/0253817 A1 | 11/2005 | Rytivaara et al. |
| 2005/0259087 A1 | 11/2005 | Hoshino et al. |
| 2005/0262448 A1 | 11/2005 | Vronay et al. |
| 2005/0267869 A1 | 12/2005 | Horvitz et al. |
| 2005/0275636 A1 | 12/2005 | Dehlin et al. |
| 2005/0283734 A1 | 12/2005 | Santoro et al. |
| 2005/0285880 A1 | 12/2005 | Lai et al. |
| 2005/0289458 A1 | 12/2005 | Kylmanen |
| 2005/0289476 A1 | 12/2005 | Tokkonen |
| 2006/0005207 A1 | 1/2006 | Louch et al. |
| 2006/0007182 A1 | 1/2006 | Sato et al. |
| 2006/0017692 A1 | 1/2006 | Wehrenberg et al. |
| 2006/0025110 A1 | 2/2006 | Liu |
| 2006/0026170 A1 | 2/2006 | Kreitler et al. |
| 2006/0026521 A1* | 2/2006 | Hotelling .............. G06F 3/0488 715/702 |
| 2006/0026636 A1 | 2/2006 | Hotelling et al. |
| 2006/0033724 A1 | 2/2006 | Chaudhri et al. |
| 2006/0033751 A1 | 2/2006 | Keely et al. |
| 2006/0033761 A1 | 2/2006 | Suen et al. |
| 2006/0035628 A1 | 2/2006 | Miller et al. |
| 2006/0036944 A1 | 2/2006 | Wilson |
| 2006/0048069 A1 | 3/2006 | Igeta |
| 2006/0051073 A1 | 3/2006 | Jung et al. |
| 2006/0053386 A1 | 3/2006 | Kuhl et al. |
| 2006/0053387 A1 | 3/2006 | Ording |
| 2006/0055662 A1 | 3/2006 | Rimas-Ribikauskas et al. |
| 2006/0055700 A1 | 3/2006 | Niles et al. |
| 2006/0064647 A1 | 3/2006 | Tapuska et al. |
| 2006/0075355 A1 | 4/2006 | Shiono et al. |
| 2006/0075396 A1 | 4/2006 | Surasinghe |
| 2006/0080616 A1 | 4/2006 | Vogel et al. |
| 2006/0085743 A1 | 4/2006 | Baudisch et al. |
| 2006/0085763 A1 | 4/2006 | Leavitt et al. |
| 2006/0097991 A1 | 5/2006 | Hotelling et al. |
| 2006/0101354 A1 | 5/2006 | Hashimoto et al. |
| 2006/0105814 A1 | 5/2006 | Monden et al. |
| 2006/0112335 A1 | 5/2006 | Hofmeister et al. |
| 2006/0116578 A1 | 6/2006 | Grunwald et al. |
| 2006/0117197 A1 | 6/2006 | Nurmi |
| 2006/0123360 A1 | 6/2006 | Anwar et al. |
| 2006/0125799 A1* | 6/2006 | Hillis .................. G06K 9/00355 345/173 |
| 2006/0129647 A1 | 6/2006 | Kaghazian |
| 2006/0139328 A1 | 6/2006 | Maki et al. |
| 2006/0143574 A1 | 6/2006 | Ito et al. |
| 2006/0146016 A1 | 7/2006 | Chan et al. |
| 2006/0146038 A1 | 7/2006 | Park et al. |
| 2006/0148526 A1 | 7/2006 | Kamiya et al. |
| 2006/0153531 A1 | 7/2006 | Kanegae et al. |
| 2006/0161871 A1 | 7/2006 | Hotelling et al. |
| 2006/0168510 A1 | 7/2006 | Bryar et al. |
| 2006/0174211 A1 | 8/2006 | Hoellerer et al. |
| 2006/0179415 A1 | 8/2006 | Cadiz et al. |
| 2006/0187212 A1 | 8/2006 | Park et al. |
| 2006/0190833 A1* | 8/2006 | SanGiovanni ........ G06F 3/0485 715/767 |
| 2006/0197753 A1 | 9/2006 | Hotelling |
| 2006/0209035 A1 | 9/2006 | Jenkins et al. |
| 2006/0210958 A1 | 9/2006 | Rimas-Ribikauskas et al. |
| 2006/0224997 A1 | 10/2006 | Wong et al. |
| 2006/0236266 A1 | 10/2006 | Majava |
| 2006/0238625 A1 | 10/2006 | Sasaki et al. |
| 2006/0242145 A1 | 10/2006 | Krishnamurthy et al. |
| 2006/0242596 A1 | 10/2006 | Armstrong |
| 2006/0242604 A1 | 10/2006 | Wong et al. |
| 2006/0242607 A1 | 10/2006 | Hudson |
| 2006/0253771 A1 | 11/2006 | Baschy |
| 2006/0265643 A1 | 11/2006 | Saft et al. |
| 2006/0268100 A1 | 11/2006 | Karukka et al. |
| 2006/0271864 A1 | 11/2006 | Satterfield et al. |
| 2006/0271867 A1 | 11/2006 | Wang et al. |
| 2006/0271874 A1 | 11/2006 | Raiz et al. |
| 2006/0277460 A1 | 12/2006 | Forstall et al. |
| 2006/0277481 A1 | 12/2006 | Forstall et al. |
| 2006/0277588 A1 | 12/2006 | Harrington et al. |
| 2006/0278692 A1 | 12/2006 | Matsumoto et al. |
| 2006/0282786 A1 | 12/2006 | Shaw et al. |
| 2006/0282790 A1 | 12/2006 | Matthews et al. |
| 2006/0284852 A1 | 12/2006 | Hofmeister et al. |
| 2006/0290661 A1 | 12/2006 | Innanen et al. |
| 2007/0004451 A1 | 1/2007 | C. Anderson |
| 2007/0013665 A1 | 1/2007 | Vetelainen et al. |
| 2007/0022386 A1 | 1/2007 | Boss et al. |
| 2007/0024646 A1 | 2/2007 | Saarinen et al. |
| 2007/0028269 A1 | 2/2007 | Nezu et al. |
| 2007/0030362 A1 | 2/2007 | Ota et al. |
| 2007/0033254 A1* | 2/2007 | AlHusseini .............. H04L 67/38 709/205 |
| 2007/0038612 A1 | 2/2007 | Sull et al. |
| 2007/0055947 A1 | 3/2007 | Ostojic et al. |

(56) References Cited

U.S. PATENT DOCUMENTS

| | | | |
|---|---|---|---|
| 2007/0067272 A1* | 3/2007 | Flynt | H04M 1/72403 |
| 2007/0067738 A1* | 3/2007 | Flynt | H04M 1/72403 |
| | | | 715/810 |
| 2007/0083827 A1 | 4/2007 | Scott et al. | |
| 2007/0083911 A1 | 4/2007 | Madden et al. | |
| 2007/0101292 A1 | 5/2007 | Kupka | |
| 2007/0101297 A1 | 5/2007 | Forstall et al. | |
| 2007/0106950 A1 | 5/2007 | Hutchinson et al. | |
| 2007/0106952 A1 | 5/2007 | Matas et al. | |
| 2007/0124677 A1 | 5/2007 | de los Reyes et al. | |
| 2007/0132789 A1 | 6/2007 | Ording et al. | |
| 2007/0150810 A1* | 6/2007 | Katz | G06F 3/04815 |
| | | | 715/229 |
| 2007/0150830 A1 | 6/2007 | Ording et al. | |
| 2007/0152980 A1* | 7/2007 | Kocienda | G06F 3/0236 |
| | | | 345/173 |
| 2007/0152984 A1* | 7/2007 | Ording | G06F 3/04845 |
| | | | 345/173 |
| 2007/0155434 A1 | 7/2007 | Jobs et al. | |
| 2007/0156697 A1 | 7/2007 | Tsarkova | |
| 2007/0157089 A1* | 7/2007 | Van Os et al. | 715/702 |
| 2007/0157094 A1 | 7/2007 | Lemay et al. | |
| 2007/0157228 A1 | 7/2007 | Bayer et al. | |
| 2007/0177803 A1 | 8/2007 | Elias et al. | |
| 2007/0177804 A1 | 8/2007 | Elias et al. | |
| 2007/0180395 A1 | 8/2007 | Yamashita et al. | |
| 2007/0189737 A1 | 8/2007 | Chaudhri et al. | |
| 2007/0192741 A1 | 8/2007 | Yoritate et al. | |
| 2007/0200713 A1 | 8/2007 | Weber et al. | |
| 2007/0204218 A1 | 8/2007 | Weber et al. | |
| 2007/0233695 A1 | 10/2007 | Boudreau et al. | |
| 2007/0234235 A1 | 10/2007 | Scott | |
| 2007/0240079 A1 | 10/2007 | Flynt et al. | |
| 2007/0243862 A1 | 10/2007 | Coskun et al. | |
| 2007/0243905 A1 | 10/2007 | Juh et al. | |
| 2007/0245250 A1 | 10/2007 | Schechter et al. | |
| 2007/0250768 A1 | 10/2007 | Funakami et al. | |
| 2007/0254722 A1 | 11/2007 | Kim et al. | |
| 2007/0260999 A1 | 11/2007 | Amadio et al. | |
| 2007/0263176 A1 | 11/2007 | Nozaki et al. | |
| 2007/0266011 A1 | 11/2007 | Rohrs et al. | |
| 2007/0266342 A1 | 11/2007 | Chang et al. | |
| 2007/0287477 A1* | 12/2007 | Tran | H04L 65/604 |
| | | | 455/466 |
| 2007/0288860 A1 | 12/2007 | Ording et al. | |
| 2007/0288862 A1 | 12/2007 | Ording | |
| 2007/0288868 A1 | 12/2007 | Rhee et al. | |
| 2007/0300160 A1 | 12/2007 | Ferrel et al. | |
| 2008/0001924 A1 | 1/2008 | de los Reyes et al. | |
| 2008/0005703 A1 | 1/2008 | Radivojevic et al. | |
| 2008/0034309 A1 | 2/2008 | Louch et al. | |
| 2008/0042984 A1 | 2/2008 | Lim et al. | |
| 2008/0059906 A1 | 3/2008 | Toki | |
| 2008/0062137 A1 | 3/2008 | Brodersen et al. | |
| 2008/0062141 A1 | 3/2008 | Chandhri | |
| 2008/0082930 A1 | 4/2008 | Omernick et al. | |
| 2008/0104515 A1 | 5/2008 | Dumitru et al. | |
| 2008/0122796 A1* | 5/2008 | Jobs | G06F 3/0488 |
| | | | 345/173 |
| 2008/0125180 A1 | 5/2008 | Hoffman et al. | |
| 2008/0132252 A1 | 6/2008 | Altman et al. | |
| 2008/0139176 A1 | 6/2008 | Kim | |
| 2008/0155617 A1 | 6/2008 | Angiolillo et al. | |
| 2008/0161045 A1 | 7/2008 | Vuorenmaa | |
| 2008/0168075 A1 | 7/2008 | Kamiyabu | |
| 2008/0168365 A1 | 7/2008 | Chaudhri | |
| 2008/0168367 A1 | 7/2008 | Chaudhri et al. | |
| 2008/0168401 A1 | 7/2008 | Boule et al. | |
| 2008/0168478 A1 | 7/2008 | Platzer et al. | |
| 2008/0171555 A1 | 7/2008 | Oh et al. | |
| 2008/0174562 A1 | 7/2008 | Kim | |
| 2008/0182598 A1 | 7/2008 | Bowman | |
| 2008/0182628 A1 | 7/2008 | Lee et al. | |
| 2008/0184052 A1 | 7/2008 | Itoh et al. | |
| 2008/0184112 A1 | 7/2008 | Chiang et al. | |
| 2008/0189108 A1 | 8/2008 | Atar | |
| 2008/0201452 A1 | 8/2008 | Athas et al. | |
| 2008/0216017 A1 | 9/2008 | Kurtenbach et al. | |
| 2008/0218523 A1 | 9/2008 | Zuverink | |
| 2008/0225013 A1* | 9/2008 | Muylkens | G06F 3/04883 |
| | | | 345/173 |
| 2008/0231610 A1 | 9/2008 | Hotelling et al. | |
| 2008/0259045 A1 | 10/2008 | Kim et al. | |
| 2008/0259057 A1 | 10/2008 | Brons | |
| 2008/0268882 A1 | 10/2008 | Moloney | |
| 2008/0276280 A1 | 11/2008 | Nashida et al. | |
| 2008/0300055 A1 | 12/2008 | Lutnick et al. | |
| 2008/0300572 A1 | 12/2008 | Rankers et al. | |
| 2008/0310602 A1 | 12/2008 | Bhupati | |
| 2008/0313110 A1 | 12/2008 | Kreamer et al. | |
| 2008/0313596 A1 | 12/2008 | Kreamer et al. | |
| 2009/0002324 A1 | 1/2009 | Harbeson et al. | |
| 2009/0002335 A1 | 1/2009 | Chaudhri | |
| 2009/0006991 A1 | 1/2009 | Lindberg et al. | |
| 2009/0007017 A1 | 1/2009 | Anzures et al. | |
| 2009/0058821 A1 | 3/2009 | Chaudhri et al. | |
| 2009/0064055 A1 | 3/2009 | Chaudhri et al. | |
| 2009/0070708 A1 | 3/2009 | Finkelstein | |
| 2009/0073194 A1* | 3/2009 | Ording | G06F 3/04845 |
| | | | 345/672 |
| 2009/0102805 A1* | 4/2009 | Meijer | G06F 3/016 |
| | | | 345/173 |
| 2009/0128581 A1 | 5/2009 | Brid et al. | |
| 2009/0138827 A1 | 5/2009 | Van Os et al. | |
| 2009/0163193 A1 | 6/2009 | Fyke et al. | |
| 2009/0172549 A1* | 7/2009 | Davidson | G06F 3/0481 |
| | | | 715/732 |
| 2009/0178008 A1 | 7/2009 | Herz et al. | |
| 2009/0199128 A1 | 8/2009 | Matthews et al. | |
| 2009/0217187 A1 | 8/2009 | Kendall et al. | |
| 2009/0222765 A1 | 9/2009 | Ekstrand | |
| 2009/0249252 A1 | 10/2009 | Lunday et al. | |
| 2009/0254799 A1 | 10/2009 | Unger | |
| 2009/0288032 A1 | 11/2009 | Chang et al. | |
| 2009/0295753 A1* | 12/2009 | King | G06F 3/03547 |
| | | | 345/174 |
| 2010/0075287 A1* | 3/2010 | Dohrmann | G09B 5/00 |
| | | | 434/309 |
| 2010/0095238 A1 | 4/2010 | Baudet | |
| 2010/0095240 A1* | 4/2010 | Shiplacolf | G06F 3/04842 |
| | | | 715/784 |
| 2010/0105454 A1 | 4/2010 | Weber et al. | |
| 2010/0169357 A1 | 7/2010 | Ingrassia et al. | |
| 2010/0179991 A1 | 7/2010 | Lorch et al. | |
| 2010/0283743 A1 | 11/2010 | Coddington | |
| 2010/0318709 A1 | 12/2010 | Bell et al. | |
| 2011/0007009 A1 | 1/2011 | Ishihara et al. | |
| 2011/0078624 A1* | 3/2011 | Missig | G06F 3/04883 |
| | | | 715/802 |
| 2011/0252349 A1* | 10/2011 | Chaudhri | G06F 9/451 |
| | | | 715/769 |
| 2011/0252373 A1 | 10/2011 | Chaudhri et al. | |
| 2012/0071208 A1* | 3/2012 | Lee | G06F 3/04842 |
| | | | 455/566 |
| 2012/0102434 A1* | 4/2012 | Zerhusen | A61G 7/0524 |
| | | | 715/835 |
| 2012/0144306 A1* | 6/2012 | Moody | E21B 41/00 |
| | | | 715/733 |
| 2012/0192113 A1* | 7/2012 | Higuchi | G06F 3/04817 |
| | | | 715/835 |
| 2012/0271742 A1* | 10/2012 | Solomon | B65G 1/127 |
| | | | 705/28 |
| 2013/0117703 A1* | 5/2013 | Jang | G06F 3/0483 |
| | | | 715/776 |
| 2014/0068483 A1 | 3/2014 | Platzer et al. | |
| 2014/0096083 A1* | 4/2014 | Kim | G06F 3/04842 |
| | | | 715/835 |
| 2014/0237360 A1 | 8/2014 | Chaudhri et al. | |
| 2015/0012853 A1 | 1/2015 | Chaudhri et al. | |
| 2015/0242092 A1 | 8/2015 | Van et al. | |
| 2016/0182805 A1 | 6/2016 | Emmett et al. | |
| 2016/0253065 A1 | 9/2016 | Platzer et al. | |

(56) References Cited

U.S. PATENT DOCUMENTS

| | | | |
|---|---|---|---|
| 2017/0147198 A1 | 5/2017 | Herz et al. | |
| 2017/0223176 A1 | 8/2017 | Anzures et al. | |
| 2017/0374205 A1 | 12/2017 | Panda | |

FOREIGN PATENT DOCUMENTS

| | | |
|---|---|---|
| CA | 2349649 A1 | 1/2002 |
| CA | 2349649 A1 | 1/2002 |
| CN | 1392977 A | 1/2003 |
| CN | 1464719 A | 12/2003 |
| CN | 1695105 A | 11/2005 |
| CN | 1257247 A | 2/2006 |
| CN | 1773875 A | 5/2006 |
| CN | 1818843 A | 8/2006 |
| CN | 1940833 A | 4/2007 |
| CN | 1998150 A | 7/2007 |
| CN | 101072410 A | 11/2007 |
| EP | 163032 A2 | 12/1985 |
| EP | 0 322 332 A2 | 11/1988 |
| EP | 404373 A1 | 12/1990 |
| EP | 476972 A2 | 3/1992 |
| EP | 0 626 635 A2 | 11/1994 |
| EP | 651544 A2 | 5/1995 |
| EP | 0 689 134 A1 | 6/1995 |
| EP | 701220 A1 | 3/1996 |
| EP | 0 844 553 A1 | 5/1998 |
| EP | 880090 A2 | 11/1998 |
| EP | 1049305 A1 | 11/2000 |
| EP | 1 143 334 A2 | 10/2001 |
| EP | 1 231 763 A1 | 8/2002 |
| EP | 1 517 228 A2 | 3/2005 |
| EP | 1632874 A2 | 3/2006 |
| EP | 1674976 A2 | 6/2006 |
| EP | 1 744 242 | 1/2007 |
| EP | 1752880 A1 | 2/2007 |
| EP | 1964022 B1 | 3/2010 |
| FR | 2 819 675 A1 | 7/2002 |
| GB | 2301217 A | 11/1996 |
| GB | 2 329 813 A | 3/1999 |
| GB | 2407900 A | 5/2005 |
| JP | 5-225302 A | 9/1993 |
| JP | 06 051930 | 2/1994 |
| JP | 6-208446 A | 7/1994 |
| JP | 7-225829 A | 8/1995 |
| JP | 8-221203 A | 8/1996 |
| JP | 09 073381 | 3/1997 |
| JP | 9-097162 A | 4/1997 |
| JP | 9-101874 A | 4/1997 |
| JP | 9-138745 A | 5/1997 |
| JP | 9-258971 A | 10/1997 |
| JP | 9-297750 A | 11/1997 |
| JP | 10-40067 A | 2/1998 |
| JP | 10-96648 A | 4/1998 |
| JP | 10-214350 A | 8/1998 |
| JP | 11-143604 A | 5/1999 |
| JP | 11-508116 A | 7/1999 |
| JP | 11-242539 A | 9/1999 |
| JP | 11-327433 A | 11/1999 |
| JP | 2000-010702 A | 1/2000 |
| JP | 2000-20213 A | 1/2000 |
| JP | 2000 105772 | 4/2000 |
| JP | 2000 163031 | 6/2000 |
| JP | 2000 163193 | 6/2000 |
| JP | 2000-163444 A | 6/2000 |
| JP | 2000-181436 A | 6/2000 |
| JP | 2000-242390 A | 9/2000 |
| JP | 2001-92430 A | 4/2001 |
| JP | 2001-142604 A | 5/2001 |
| JP | 2001-175386 A | 6/2001 |
| JP | 2001-265481 A | 9/2001 |
| JP | 2001-312347 A | 11/2001 |
| JP | 2002-41197 A | 2/2002 |
| JP | 2002-041206 A | 2/2002 |
| JP | 2002 062966 | 2/2002 |
| JP | 2002-099370 A | 4/2002 |
| JP | 2002-132412 A | 5/2002 |
| JP | 2002-149312 A | 5/2002 |
| JP | 2002 149616 A | 5/2002 |
| JP | 2002-189567 A | 7/2002 |
| JP | 2002-244635 A | 8/2002 |
| JP | 2002-525705 A | 8/2002 |
| JP | 2002-297514 A | 10/2002 |
| JP | 2002-312105 A | 10/2002 |
| JP | 2002-323850 A | 11/2002 |
| JP | 2003-066941 A | 3/2003 |
| JP | 2003-139546 A | 5/2003 |
| JP | 2003-162356 A | 6/2003 |
| JP | 2003 248538 | 9/2003 |
| JP | 2003-256142 A | 9/2003 |
| JP | 2003-271310 A | 9/2003 |
| JP | 2003-536125 A | 12/2003 |
| JP | 2004-38260 A | 2/2004 |
| JP | 2004-038310 A | 2/2004 |
| JP | 2004-062645 A | 2/2004 |
| JP | 2004 070492 | 3/2004 |
| JP | 2004-118478 A | 4/2004 |
| JP | 2004-132741 A | 4/2004 |
| JP | 2004-152075 A | 5/2004 |
| JP | 2004-159028 A | 6/2004 |
| JP | 2004 164242 | 6/2004 |
| JP | 2004-206230 A | 7/2004 |
| JP | 2004 227393 | 8/2004 |
| JP | 2004-288208 A | 10/2004 |
| JP | 2004-318505 A | 11/2004 |
| JP | 2004 341886 | 12/2004 |
| JP | 2004-341892 A | 12/2004 |
| JP | 2004-343662 A | 12/2004 |
| JP | 2005-004396 A | 1/2005 |
| JP | 2005-018229 A | 1/2005 |
| JP | 2005 115896 | 4/2005 |
| JP | 2005-515530 A | 5/2005 |
| JP | 2005-228088 A | 8/2005 |
| JP | 2005-234291 A | 9/2005 |
| JP | 2005-242669 A | 9/2005 |
| JP | 2005-267049 A | 9/2005 |
| JP | 2005 309933 A | 11/2005 |
| JP | 2005-321915 A | 11/2005 |
| JP | 2005-327064 A | 11/2005 |
| JP | 2005 352924 | 12/2005 |
| JP | 2005 352943 | 12/2005 |
| JP | 2006-018645 A | 1/2006 |
| JP | 2006-99733 A | 4/2006 |
| JP | 2006-155232 A | 6/2006 |
| JP | 2006-259376 A | 9/2006 |
| JP | 2007-132676 A | 5/2007 |
| JP | 2008-503007 A | 1/2008 |
| JP | 2008-123553 A | 5/2008 |
| JP | 2008-518330 A | 5/2008 |
| JP | 2009-051921 A | 3/2009 |
| JP | 2009-522666 A | 6/2009 |
| JP | 2009-151821 A | 7/2009 |
| JP | 2010-538394 A | 12/2010 |
| JP | 2013-211055 A | 10/2013 |
| KR | 2002-0010863 | 2/2002 |
| KR | 10-0490373 B1 | 5/2005 |
| KR | 10-2006-0085850 A | 7/2006 |
| WO | 99/28815 | 6/1999 |
| WO | WO 99/38149 A1 | 7/1999 |
| WO | 1999/054807 A1 | 10/1999 |
| WO | WO 00/08757 A | 2/2000 |
| WO | 00/16186 A2 | 3/2000 |
| WO | WO 01/16690 A2 | 3/2001 |
| WO | 01/46790 A2 | 6/2001 |
| WO | WO 01/57716 A2 | 8/2001 |
| WO | 02/08881 | 1/2002 |
| WO | WO 02/13176 A2 | 2/2002 |
| WO | 2002/046903 A1 | 6/2002 |
| WO | 2002/082418 A2 | 10/2002 |
| WO | 2002/093542 A1 | 11/2002 |
| WO | 2003/052626 A1 | 6/2003 |
| WO | 2003/060622 A2 | 7/2003 |
| WO | WO 03/107168 A1 | 12/2003 |
| WO | 2004/021166 A1 | 3/2004 |
| WO | 2004/040481 A1 | 5/2004 |

(56) References Cited

FOREIGN PATENT DOCUMENTS

| WO | 2004/063862 | 7/2004 |
|---|---|---|
| WO | 2005/036416 A2 | 4/2005 |
| WO | WO 2005/041020 | 5/2005 |
| WO | 2005/074268 A1 | 8/2005 |
| WO | 2005/106684 A1 | 11/2005 |
| WO | 2006/003591 A2 | 1/2006 |
| WO | WO 06/020304 A2 | 2/2006 |
| WO | WO 06/020305 A2 | 2/2006 |
| WO | WO 2006/019639 | 2/2006 |
| WO | 2006/036069 | 4/2006 |
| WO | WO 2006/037545 | 4/2006 |
| WO | 2006/092464 A1 | 9/2006 |
| WO | 2006/117438 A1 | 11/2006 |
| WO | 2007/031816 A1 | 3/2007 |
| WO | WO 2007/032972 A1 | 3/2007 |
| WO | WO 2007/069835 A1 | 6/2007 |
| WO | 2007/080559 A2 | 7/2007 |
| WO | WO 2007/094894 A2 | 8/2007 |
| WO | 2008/030874 A1 | 3/2008 |
| WO | 2008/030976 A2 | 3/2008 |
| WO | 2008/086303 A1 | 7/2008 |
| WO | 2009/032638 A2 | 3/2009 |
| WO | 2009/032750 A1 | 3/2009 |
| WO | 2009/089222 A2 | 7/2009 |

OTHER PUBLICATIONS

Microsoft, Working screenshot of Microsoft Office 2003, released on Aug. 19, 2003, 14 pages.*
Apple, "Iphone User Guide", iPhone first generation, released on Jun. 29, 2007, 124 pages. (Year: 2007).*
Working screenshot of Microsoft Office 2003 manufactured by Microsoft, released on Aug. 19, 2003, 14 pages (Year: 2003).*
International Search Report and Written Opinion from related U.S. International Patent Application No. PCT/US2008/074341 dated Nov. 27, 2009, 25 pages.
Communication dated Apr. 28, 2010 from European Patent Office in related European Patent Application No. 08798713.7, 2 pages.
Communication dated Jun. 22, 2011 from European Patent Office in related European Patent Application No. 08798713.7, 10 pages.
Notification of the First Office Action dated Nov. 11, 2011 in related Chinese Patent Application No. 200880110708.X, 10 pages.
Agarawala et al. "Database Compendex/EI," Engineering Information, Inc., Apr. 27, 2006, 1 page.
Agarawala et al., "Keepin' it Real: Pushing the Desktop Metaphor with Physics, Piles and the Pen," CHI Proceedings 2006, Apr. 22-27, 2006, Montréal, Québec, Canada, pp. 1283-1292.
Andrew's Widgets, "Developing Dashboard Widgets—What the Heck is a Widget," printed Jan. 25, 2008, 9 pages, http://andrew.hedges.name/widgets/dev/.
Anonymous, "Asus Eee PC Easy Mode Internet Tab Options," asuseeehacks.blogspot.com, Nov. 10, 2007, 33 pages, http://asuseeehacks.blogspot.com/2007/11/asus-eee-pc-user-interface-tour.html.
Anonymous, "Desktop Icon Toy—History," Oct. 8, 2009, 2 pages, http://www.idesksoft.com/history.html.
Apple.com, "Tiger Developer Overview Series-Developing Dashboard Widgets," Jun. 26, 2006, 9 pages, http://developer.apple.com/macosx/dashboard.html.
Apple Computer, Inc., "Dashboard Tutorial," Apple Computer, Inc. © 2004, 2006, 24 pages.
Berka, J., "iFuntastic 3 Opens Up New iPhone Functionality," ars technics, Aug. 30, 2007, http://arstechnica.com/journals/apple.ars/2007/08/30/ifuntastic-3-opens-up-new-iphone-functionality.
Chang et al., "Animation: From Cartoons to the User Interface," UIST '93 Conference Proceedings, Atlanta, GA, Nov. 1993, 12 pages.
Chartier, D., "iPhone 1.1.3 Video Brings the Proof," ars technica, Dec. 30, 2007, http://arstechnica.com/journals/apple.are/2007/12/30/iphone-1-1-3-video-brings-the-proof, 3 pages.

CNET, "Video:Create custom widgets with Web Clip," CNET News, Aug. 8, 2006, 3 pages, http://news.cnet.com/1606-2-6103525.html.
Domshlak, C. et al. "Preference-Based Configuration of Web Page Content," Proceedings of the 17th Int'l Joint Conf. on Artificial Intelligence (IJCAI), pp. 1451-1456, Seattle, WA.
Edwards, A., "iPhone 1.1.3 Firmware Feature Gallery," Gear Live, Dec. 28, 2007, http://www.gearlive.com/news/article/q407-iphone-113-firmware-feature-gallery/.
Elo, "Touschscreen User Manual, Elo Projected Capacitance Driver Software Version 1.00 (Serial)," Elo TouchSystems, Inc., pre Dec. 30, 2005 (exact date of publication unknown), 37 pages.
Fondantfancies, "Dash Clipping: Don't wait for Mac OS X 10.5 Leopard," fondantfancies.com, Aug. 8, 2006, 9 pages, http://www.fondantfancies.com/blog/3001239/.
Forsberg et al., "Aperture Based Selection for Immersive Virtual Environments," Proceedings of the ACM Symposium on User Interface Software and Technology, 1996, 2 pages.
Hesseldahl, A., "An App the Mac can Brag About " Forbes.com, Dec. 15, 2003, 2 pages, http://www.forbes.com/2003/12/15/cx_ah_1215tentech_print.html.
IPhone Dev Wiki, "IPhone Customization," http://iphone.fiveforty.net/wiki/index.php/Iphone_Customization.
IPhone Hacks, "iPhone Firmware 1.1.1: Multi-Page SpringBoard Hack," Oct. 10, 2007, 4 pages, http://www.iphonehacks.com/2007/10/springboardhack.html.
IPhone Hacks, "SummerBoard for iPhone OS v1.1.1: iPhone Hack Enables Scrolling of iPhone's Home Screen," http://www.iphonehacks.com/2007/10/summerboard-v3.html.
IPhone Info, "Modifying the iPhone SpringBoard," http://iphoneinfo.ca/modifying-the-iphone-springboard.
Jazzmutant: "Jazzmutant Lemur," Nov. 16, 2005, 3 pages, http://64.233.167.104/search?q=cache:3g4wFSaZiXIJ:www.nuloop.c.
Jazzmutant: "The Lemur: Multitouch Control Surface", printed Nov. 16, 2005, 3 pages http://64233.167.104/search?q=cahe:j0_nFbNVzOcJ:www.cycling7.
Macworld, "Whip up a widget," Macworld.com., Sep. 23, 2005, 5 pages, http://www.macworld.com/article/46622/2005/09/octgeekfactor.html.
Macworld, "First Look: Leopard first looks: Dashboard," Aug. 9, 2006, 3 pages, http://www.macworld.com/article/52297/2005/08/leodash.html.
Mello, Jr., J.,"Tiger's Dashboard Brings Widgets to New Dimension," MacNewsWorld, printed Jun. 23, 2006, 3 pages, http://www.macnewsworld.com/story/42630.html.
Microsoft, "Right-Clicking with a Pen," microsoft.com, Nov. 7, 2002, 3 pages, http://www.microsoft.com/windowsxp/using/tabletpc/learnmore/rightclick.mspx.
MountFocus Information Systems, "An Onscreen Virtual Keyboard: touchsereen, kiosk and Windows compatible," printed Dec. 19, 2007, 3 pages, http://www.virtual-keyboard.com.
O'Hara, "Absolute Beginner's Guide to Microsoft Window XP," Que Publishing 2003, 1 page.
Opera Software, "Welcome to Widgetize," Copyright © 2006 Opera Software ASA, 1 page, http://widgets.opera.com/widgetize.
Sadun, E., "Erica's Documentation: Applications and Utilities for the iPhone and iPod Touch," Copyright 2007, http://ericasadun.com/ftp/Deprecated/Documentation/Manual-0.04.pdf.
Thomas et al., "Applying Cartoon Animation Techniques to Graphical User Interfaces," ACM Transactions on Computer-Human Interaction, vol. 8, No. 3, Sep. 2001, pp. 198-222.
Tidwell, J., "Animated Transition," from Designing Interfaces, O'Reilly Media, Inc., Nov. 2005, pp. 84-85.
tuaw.com, "Springboard Scrolling," new page dot feature, Oct. 9, 2007, http://www.tuaw.com/gallery/springboard-scrolling/431347/.
tuaw.com, "Springboard Scrolling," mid-scroll, Oct. 9, 2007, http://www.tuaw.com/photos/springboard-scrolling/731348/.
tuaw.com, "Springboard Scrolling," mostly unpopulated pages, Oct. 9, 2007, http://www.tuaw.com/photos/springboard-scrolling/431349/.
tuaw.com, "TUAW Hack: Mess with Your iPhone Settings," Dec. 18, 2007, http://www/tuaw.com/tag/SpringBoard/.

(56) References Cited

OTHER PUBLICATIONS tuaw.com, "1.1.1 iPhone Multipage Springboard Hack," posted Oct. 9. 2007, http://www.tuaw.com/2007/10/09/1-1-1-iphone-multipage-springboard-hack/.

Vrba, J., "iPhone Customizations and Applications," Ezine Articles, http://ezinearticles.com/?iPhone-Customizations-and-Applications&id=815807&opt=print.

Wildarya, "iDesksoft Desktop Icon Toy v2.9," Oct. 16, 2007, 4 pages, http://www.dl4all.com/2007/10/16/idesksoft_desktop_icon_toy_v2.9.html.

International Search Report and Written Opinion dated May 8, 2008, received in International Application No. PCT/US2007/077643, which corresponds to U.S. Appl. No. 11/850,011, 13 pages (Forstall).

Invitation to Pay Additional Fees dated Jun. 27, 2008, received in International Application No. PCT/US2008/050430, which corresponds to U.S. Appl. No. 11/969,809, 7 pages (Platzer).

International Search Report and Written Opinion dated Sep. 1. 2008, received in International Application No. PCT/US2008/050430, which corresponds to U.S. Appl. No. 11/969,809, 18 pages (Platzer).

International Search Report and Written Opinion dated Jun. 17, 2008, received in International Application No. PCT/US2008/050431, which corresponds to U.S. Appl. No. 11/969,912, 15 pages (Lemay).

Invitation to Pay Additional Fees dated Nov. 16, 2009, received in International Patent Application No. PCT/US2009/030225, which corresponds to U.S. Appl. No. 12/242,851, 4 pages (Herz).

International Search Report and Written Opinion dated Feb. 25, 2010, received in International Application No. PCT/US2009/030225, which corresponds to U.S. Appl. No. 12/242,851, 20 pages (Herz).

International Preliminary Report on Patentability dated Jul. 15, 2010, received in International Application No. PCT/US2009/030225, which corresponds to U.S. Appl. No. 12/242,851, 11 pages (Herz).

International Preliminary Report on Patentability dated Mar. 18, 2010, received in International Application No. PCT/US2008/074625, which corresponds to U.S. Appl. No. 11/849,938, 7 pages (Chaudhri).

Office Action dated Sep. 14, 2009, received in Australian Patent Application 2009100812, which corresponds to U.S. Appl. No. 11/459,602, 2 pages (van Os).

Office Action dated Sep. 14, 2009, received in Australian Patent Application No. 2009100813, which corresponds to U.S. Appl. No. 11/459,602, 2 pages (van Os).

Office Action dated Jul. 28, 2011, received in Australian Patent Application No. 2010200763, which corresponds to U.S. Appl. No. 11/459,602, 2 pages (van Os).

Office Action dated Apr. 2, 2009, received in Canadian Patent Application No. 2,633,759, which corresponds to U.S. Appl. No. 11/459,602, 5 pages (van Os).

Office Action dated Dec. 10, 2009, received in Canadian Application No. 2633759, which corresponds to U.S. Appl. No. 11/459,602, 6 pages (van Os).

Office Action dated Aug. 12, 2010, received in Canadian Application No. 2633759, which corresponds to U.S. Appl. No. 11/459,602, 8 pages (van Os).

Office Action dated Mar. 30, 2010, received in Chinese Application for Invention No. 200680053441.1, which corresponds to U.S. Appl. No. 11/459,602, 5 pages (van Os).

Office Action dated Nov. 12, 2010, received in Chinese Application for Invention No. 200680053441.1, which corresponds to U.S. Appl. No. 11/459,602, 4 pages (van Os).

Grant for Invention Patent dated Jan. 28, 2011, Received in Chinese Patent Application No. ZL200680053441.1, which corresponds to U.S. Appl. No. 11/459,602, 10 pages (van Os).

Office Action dated Nov. 30, 2011, received in Chinese Patent Application No. 200910173272.0, which corresponds to U.S. Appl. No. 11/459,602, 8 pages (van Os).

Office Action dated Oct. 27, 2009, received in German Patent Application No. 11 2006 003 600.9, which corresponds to U.S. Appl. No. 11/459,602, 9 pages (van Os).

Office Action dated Aug. 9, 2011, received in German Patent Application No. 11 2006 003 600.9, which corresponds to U.S. Appl. No. 11/459,602, 4 pages (van Os).

Office Action dated Oct. 13, 2008, received in European Application No. 06 846 840.4, which corresponds to U.S. Appl. No. 11/459,602, 3 pages (van Os).

Office Action dated Dec. 13, 2011, received in European Patent Application No. 09 170 697.8, which corresponds to U.S. Appl. No. 11/850,602, 5 pages (van Os).

Office Action dated May 30, 2011, received in Japanese Patent Application No. 2008 548858, which corresponds to U.S. Appl. No. 11/459,602, 3 pages (van Os).

Office Action dated Jan. 20, 2012, received in Japanese Patent Application No. 2009-51921, which corresponds to U.S. Appl. No. 11/850,602, 5 pages (van Os).

Office Action dated Jun. 27, 2011, received in Japanese Patent Application No. 2009-051921, which corresponds to U.S. Appl. No. 11/459,602, 6 pages (van Os).

Office Action dated Jan. 20, 2012, received in Japanese Patent Application No. 2008-548858, which corresponds to U.S. Appl. No. 11/850,602, 5 pages (van Os).

Office Action dated Aug. 11, 2010, received in U.S. Appl. No. 11/850,011, 28 pages (Forstall).

Final Office Action dated Dec. 1, 2010, received in U.S. Appl. No. 11/850,011, 16 pages (Forstall).

Notice of Allowance dated Feb. 18, 2011, received in U.S. Appl. No. 11/850,011, 11 pages (Forstall).

Office Action dated Jan. 18, 2012, received in Chinese Patent Application No. 200780041309.3, which corresponds to U.S. Appl. No. 11/850,011, 15 pages (Forstall).

Office Action dated Mar. 4, 2011, received in European Application No. 07 814 689.1, which corresponds to U.S. Appl. No. 11/850,011, 6 pages (Forstall).

Summons to attend oral proceedings dated Dec. 1, 2011, received in European Patent Application No. 07814689.1, which corresponds to U.S. Appl. No. 11/850,011, 6 pages (Forstall).

Office Action dated Mar. 14, 2011, received in U.S. Appl. No. 11/969,809, 25 pages (Platzer).

Final Office Action dated Jul. 14, 2011, received in U.S. Appl. No. 11/969,809, 31 pages (Platzer).

Office Action dated Apr. 13, 2011, received in U.S. Appl. No. 11/969,912, 20 pages (Lemay).

Final Office Action dated Oct. 31, 2011, received in U.S. Appl. No. 11/969,912, 14 pages (Lemay).

Office Action dated Apr. 15, 2011, received in U.S. Appl. No. 12/242,851, 33 pages (Herz).

Final Office Action dated Dec. 12, 2011, received in U.S. Appl. No. 12/242,851, 17 pages (Herz).

Examiner's Report dated Apr. 20, 2010, received in Australian Patent Application 2009204252, which corresponds to U.S. Appl. No. 12/242,851, 3 pages (Herz).

Examiner's Report dated May 18, 2011, received in Australina Patent Application No. 2009204252, which corresponds to U.S. Appl. No. 12/242,851, 2 pages (Herz).

Notification of Acceptance dated Oct. 17, 2011, received in Australian Patent Application No. 2009204252, which corresponds to U.S. Appl. No. 12/242,851, 3 pages (Herz).

Office Action dated Oct. 21, 2011, received in Australian Patent Application No. 2011101194, which corresponds to U.S. Appl. No. 12/242,851, 2 pages (Herz).

Certification of Australian Innovation Patent No. 2011101194 dated Mar. 2, 2012, which corresponds to U.S. Appl. No. 12/242,851, 4 pages (Herz).

Office Action dated Nov. 30, 2011, received in Chinese Patent Application No. 200980000229.2, which corresponds to U.S. Appl. No. 12/242,851 24 pages (Herz).

Office Action dated Nov. 26, 2010, received in European Patent Application No. 09 700 333.9, which corressonds to U.S. Appl. No. 12/242,851, 5 pages (Herz).

(56) References Cited

OTHER PUBLICATIONS

Office Action dated Jun. 10, 2011, received in European Patent Application No. 09 700 333.9, which corresponds to U.S. Appl. No. 12/242,851, 5 pages (Herz).
Office Action dated Apr. 18, 2011, received in U.S. Appl. No. 12/217,029, 35 pages (Anzures).
Office Action dated Jan. 25, 2012, received in U.S. Appl. No. 12/217,029, 24 pages (Anzures).
Office Action dated Nov. 13, 2009 received in U.S. Appl. No. 12/364,470, 19 pages (van Os).
Final Office Action dated May 5, 2010, received in U.S. Appl. No. 12/364,470, 18 pages (van Os).
Office Action dated Sep. 2, 2010, received in U.S. Appl. No. 12/364,470, 29 pages (van Os).
Office Action dated Mar. 4, 2011, received in U.S. Appl. No. 12/364,470, 18 pages (van Os).
Final Office Action dated Oct. 19, 2011, received in U.S. Appl. No. 12/364,470, 25 pages (van Os).
Office Action dated Oct. 12, 2010, received in U.S. Appl. No. 11/849,938, 25 pages (Chaudhri).
Final Office Action dated May 27, 2011, received in U.S. Appl. No. 11/849,938, 23 pages (Chaudhri).
Office Action dated Dec. 14, 2011, received in U.S. Appl. No. 11/849,938, 30 pages (Chaudhri).
Office Action dated Oct. 29, 2010, received in Australian Patent Application No. 2008296445, which corresponds to U.S. Appl. No. 11/849,938, 2 pages (Chaudhri).
Notice of Acceptance dated Dec. 14, 2011, received in Australian Patent Application No. 2008296445, which corresponds to U.S. Appl. No. 11/849,938, 3 pages (Chaudhri).
Office Action dated Aug. 24, 2011, received in Chinese Patent Application No. 200880112570.2, which corresponds to U.S. Appl. No. 11/849,938, 6 pages (Chaudhri).
Office Action dated Oct. 15, 2010, received in European Application No. 08 829 660.3, which corresponds to U.S. Appl. No. 11/849,938, 9 pages (Chaudhri).
Office Action dated Feb. 13, 2012, received in Japanese Patent Application No. 2010-524102, which corresponds to U.S. Appl. No. 11/849,938, 2 pages (Chaudhri).
Office Action dated Aug. 8, 2011, received in Korean Patent Application No. 10-2010-7007258, which corresponds to U.S. Appl. No. 11/849,938, 2 pages (Chaudhri).
Apple, "Welcome to Tiger," copyright © 2005 Apple Computer, Inc., 32 pages, http://manuals.info.apple.com/en/Welcome_to_Mac_OS_X_v10.4_Tiger.pdf.
Widgipedia, "I Need a Bog and a Forum Please?" 2 pages, printed Oct. 19, 2006, http://www.widgipedia.com/widgets/details/adni18/hyalo-weather_27.html.
International Search Report and Written Opinion dated Jul. 8, 2008 for International Application No. PCT/US2007/077639, which corresponds to U.S. Appl. No. 11/850,010, 11 pages (Omernick).
Office Action dated May 2, 2011, received in U.S. Appl. No. 11/850,010, 12 pages (Omernick).
Final Office Action dated Oct. 17, 2011, received in U.S. Appl. No. 11/850,010, 11 pages (Omernick).
Office Action dated May 16, 2012, received in U.S. Appl. No. 11/850,010, 12 pages (Omenick).
Delltech, "Working with Graphics," Windows XP: The Complete Reference, Chapter 18, Apr. 5, 2005, 4 pages.
Dodge et al., "Microsoft Office Excel 2003 Office Manual," Microsoft Press, Jul. 12, 2004, vol. 1, p. 66-68, Unable to Locate English Translation.
Cerulean Studios, "Trillian Online User Manual," 2006, http://www.ceruleanstudios.com/support/manual.php?hchap=4&hsub=1&hsect=5.
Cha, B. "HTC Touch (Sprint)," CNET Reviews, Nov. 6, 2007, http://web.archive.org/web/20071106065114/http.//reviews.cnet.com/smartphones/htc-touch-sprint/4505-6452_7-3267123.html, 10 pages.
CNET, "bounding box," cnet.com, downloaded Dec. 29, 2008, 1 page, http://www.cnet.com/Resources/Info/Glossary/Terms/boundingbox.html.
Dearman et al., "Rendezvousing with Location-Aware Devices: Enhancing Social Coordination," Interacting with Computers, vol. 17, Issue 5, Sep. 2005, http://www.dgp.toronto-edu/~dearman/publications/dearman_IWC05.pdf, pp. 542-566.
Emesene forum, "Autocomplete plugin," Jun. 20, 2008, http://emeseme.org/smf/index.php?topic=1276.0, 5 pages.
Foxit, "Foxit Reader v. 1.3 Feature Description," Foxit Software Company, 2008, http://www.foxitsoftware.com/pdf/reader_2/verhistory.htm, 4 pages.
Gade. L., "HTC-Touch (Sprint)—MobileTechReview," Smartphone Reviews by Mobile Tech Review, Nov. 2, 2007, http://www.mobiletechreview.com/phones/HTC-Touch.htm, 7 pages.
ImageShack—Hosting, downloaded Nov. 2008: 1 page, http://img129.imagesnack.us/my.php?image=autocompleteemoticonprexw0.jpg.
ISO, 9241-10:1996 Ergonomic requirements for office work with visual display terminals (VDTs)—Part 10: Dialogue principles, International Standard—ISO, Zuerich, CH, vol. 9241-10, May 1, 1996 (May 1, 1006), 18 pages.
ISO 9241-11:1998 Ergonomic requirements for office work with visual display terminals (VDTs)—Part 11: Guidance on usability, International Standard—ISO, Zuerich, CH, vol. 9241-11, Jan. 1, 1998 (Jan. 1, 1998); 28 pages.
ISO 9241-12:1998 Ergonomic requirements for office work with visual display terminals (VDTs)—Part 12: Presentation of information, International Standard—ISO, Zuerioh, CH, vol. 9241-12, Dec. 1, 1998 (Dec. 1, 1998), 52 pages.
PocketGear.com, "Software Keyboards: Effy-Japanese (Eng/Jp) 4.0," updated Sep. 23, 2008, http://classic.pocketgear.com/software_detail.asp?id=9115.
Potter, "Graffiti Smilies," PalmInfocenter Forums, Feb. 9, 2003. 6 pages, 2005, http://www.palminfocenter.com/forum/viewtopic.php?t=11307.
RealNetworks: "Transition Effects," RealNetworks Production Guide, 2001, http://service.real.com/help/library/guides/productionguidepreview/HTML/htmfiles/transit.htm, 21 pages.
Sharewareconnection, "Handy Animated Emoticons," Jul. 2007, http://www.sharewareconnection.com/handy-animated-emoticons.htm, 3 pages.
SnapFiles, "Dexpot," SnapFile.s.com, Oct. 10, 2007, 3 pages.
Zhang et al., "An Ergonomics Study of Menu—Operation on Mobile Phone Interface," In Proceedings of the Workshop on Intelligent Information Technology Application, Dec. 2007, 5 pages.
Extended European Search Report dated Feb. 1, 2013, received in European Patent Application No. 12177813.8, which corresponds to U.S. Appl. No. 11/850,011, 6 pages (Forstall).
European Search Report dated Jan. 16, 2013, received in European Patent Application No. 12194312.0, which corresponds to U.S. Appl. No. 12/242,851, 8 pages (Herz).
European Search Report dated Jan. 16, 2013, received in European Patent Application No. 12194315.3, which corresponds to U.S. Appl. No. 12/242,851,7 pages (Herz ).
European Search Report dated Dec. 18, 2012, received in European Patent Application No. 12189764.9, which ocrresonds to U.S. Appl. No. 11/849,938, 5 pages (Chaudbri).
Final Office Action dated Feb. 15, 2013, received in U.S. Appl. No. 11/850,010, 21 pages (Omernick).
Office Action dated Nov. 1, 2012, received in Chinese Patent Application No. 200780041309.3, which corresponds to U.S. Appl. No. 11/850,011 5 pages (Forstall).
Office Action dated Jul. 2, 2013, received in Chinese Patent Application No. 200780041309.3, which corresponds to U.S. Appl. No. 11/850,011, 12 pages (Forstall).
Notice of Allowance dated Apr. 26, 2013, received in U.S. Appl. No. 11/969,809, 23 pages (Platter).
Office Action dated Sep. 10, 2013, received in U.S. Appl. No. 11/969,912, 20 pages (Lemay).
Office Action dated Sep. 20, 2012, received in U.S. Appl. No. 12/242,851, 21 pages (Herz).

(56) References Cited

OTHER PUBLICATIONS

Final Office Action dated May 10, 2013, received in U.S. Appl. No. 12/242,851, 33 pages (Herz).
Office Action dated Oct. 26, 2012, received in Chinese Patent Application No. 200980000229.2, which corresponds to U.S. Appl. No. 12/242,851, 22 pages (Herz).
Office Acton dated Jul. 2, 2013 received in Chinese Patent Application No. 200980000229.2, which corresponds to U.S. Appl. No. 12/242,851, 4 pages (Herz).
Summons to oral proceedings dated Sep. 21, 2012, received in European Patent Application No. 09700333.9, which corresponds to U.S. Appl. No. 12/242,851, 4 pages (Herz).
Grant Notice dated Jun. 20, 2013, received in European Patent Application No. 09 700 333.9, which corresponds to U.S. Appl. No. 12/242,851, 7 pages (Herz).
Office Action dated Oct. 8, 2013, received in European Patent Application No. 12 194 312.0, which corresponds to U.S. Appl. No. 12/242,851, 5 pages (Herz).
Office Action dated Oct. 8, 2013, received in European Patent Application No. 12 194 315.3, which corresponds to U.S. Appl. No. 12/242,851, 5 pages, (Herz).
Final Office Action dated Oct. 5, 2012, received in U.S. Appl. No. 12/217,029, 32 pages (Anzures).
Office Action dated Aug. 19, 2013, received in U.S. Appl. No. 12/217,029, 10 pages (Anzures).
Office Action dated Aug. 26, 2011, received in U.S. Appl. No. 12/274,346 (Moore).
Final Office Action dated Mar. 14, 2012, received in U.S. Appl. No. 12/274,346, 49 pages (Moore).
Notice of Allowance dated Mar. 12, 2013, received in U.S. Appl. No. 12/274,346, 19 pages (Moore).
Notice of Allowance dated Jul. 17, 2013, received in U.S. Appl. No. 12/274,346, 12 pages (Moore).
Office Action dated Dec. 5, 2012, received in Chinese Patent Application No. 200980152822.9, which corresponds to U.S. Appl. No. 12/274,346, 10 pages (Moore).
Office Action dated Jan. 25, 2013, received in Japanese Patent Application No. 2011537452, which corresponds to U.S. Appl. No. 12/274,346, 5 pages (Moore).
Grant of Application dated Jun. 14, 2013, received in Japanese Patent Application No. 2011-537452, which corresponds to U.S. Appl. No. 12/274,346, 4 pages (Moore).
Office Action dated Jan. 17, 2013, received in Korean Patent Application No. 10 2011 7014104, which corresponds to U.S. Appl. No. 12/274,346, 4 pages (Moore).
Notice of Allowance dated Aug. 29, 2013, received in Korean Patent Application No. 2011 7014104, which corresponds to U.S. Appl. No. 12/274,346, 2 pages (Moore).
Office Action dated Aug. 31, 2011 received in U.S. Appl. No. 12/365,887 (Moore).
Final Office Action dated Feb. 29, 2012, received in U.S. Appl. No. 12/365,887 (Moore).
Notice of Allowance dated May 23, 2012, received in U.S. Appl. No. 12/365,887, 5 pages (Moore).
Office Action dated Nov. 10, 2011, received in U.S. Appl. No. 12/365,888 (Moore).
Final Office Action dated Jan. 30, 2013, received in U.S. Appl. No. 11/849,938, 38 pages (Chaudhri).
Notice of Allowance dated Oct. 10, 2013, received in U.S. Appl. No. 11/849,938, 35 pages (Chaudhri).
Office Action dated Aug. 12, 2013, received in Australian Patent Application No. 2012202140, which corresponds to U.S. Appl. No. 11/849,938, 2 pages (Chaudhri).
Office Action dated Feb. 20, 2013, received in Chinese Patent Application, which corresponds to U.S. Appl. No. 11/849,938, 5 pages (Chaudhri).
Office Action dated Aug. 2, 2013, received in European Patent Appiication No. 08 829 660.3, which corresponds to U.S. Appl. No. 11/849,938, 7 pages (Chaudhri).

Office Action dated Oct. 26, 2012, received in Japanese Patent Application No. 2010-524102, which corresponds to U.S. Appl. No. 11/849,938, 4 pages (Chaudhri).
Decision to Grant dated May 31, 2013, received in Japanese Patent Application No. 2010-524102, which corresponds to U.S. Appl. No. 11/849,938, 3 pages (Chaudhri).
Office Action dated Jan. 30, 2013, received in Koran Patent Application No. 1020107007258, which corresponds to U.S. Appl. No. 11/849,938, 4 pages (Chaudhri).
Office Action dated Nov. 13, 2012, received in U.S. Appl. No. 13/104,903, 21 pages, (Forstall).
Notice of Allowance dated Apr. 29, 2013, received in U.S. Appl. No. 13/104,903, 8 pages (Forstall).
Office Action dated Feb. 20, 2013, received in U.S. Appl. No. 13/104,911, 25 pages (Forstall).
Notice of Allowance dated Jun. 10, 2013, received in U.S. Appl. No. 13/104,911, 6 pages (Forstall).
Decision to Grant dated Aug. 6, 2012, received in Chinese Patent Application No. 200880110709.X, which corresponds to U.S. Appl. No. 11/850,005, 2 pages (Chaudhri).
Summons to attend oral arguments dated Aug. 30, 2013, received in European Patent Application No. 08798713.7, which corresponds to U.S. Appl. No. 11/850,005, 15 pages (Chaudhri).
Notice of Acceptance received for Australian Patent Application No. 2010200763, dated Aug. 21, 2012, 1 page.
Certificate of Examination received for Australian Patent Application No. 2011101190, dated Nov. 23, 2011, Nov. 23, 2011, 1 page.
Office Action received for Chinese Patent Application No. 201210399033.9, dated Nov. 27, 2014, 7 pages (Official Copy only).(See Communication under 37 CFR § 1.98(a) (3)).
Office Action received for Australian Patent Application No. 2012200475, dated Nov. 19, 2013, 4 pages.
Notice of Acceptance received for Australian Patent Application No. 2012202140, dated May 28, 2014, 2 pages.
Notice of Acceptance received for Australia Patent Application No. 2012261534, dated Jan. 6, 2015, 2 pages.
Office Action received for Australian Patent Application No. 2012261534, dated Dec. 3, 2013, 3 pages.
Office Action received for Japanese Patent Application No. 2013-011209, dated Feb. 7, 2014, 3 pages (Official copy only).(See Communication under 37 CFR § 1.98(a) (3)).
Office Action received for Japanese Patent Application No. 2013-011209, dated Oct. 27, 2014, 3 pages (Official Copy only).(See Communication under 37 CFR § 1.98(a) (3)).
Office Action received for Japanese Patent Application No. 2013-127963, dated Aug. 15, 2014, 8 pages (6 pages of English Translation and 2 pages of Official Copy).
Office Action received for Japanese Patent Application No. 2013-127963, dated Mar. 10, 2014, 7 pages (4 pages of English translation and 3 pages of Official copy).
Office Action received for Japanese Patent Application No. 2013-252338, dated Jan. 30, 2015, 4 pages (Official Copy only).(See Communication under 37 CFR § 1.98(a) (3)).
International Preliminary Report on Patentability received for PCT Patent Application No. PCT/US2006/062685, dated Jul. 1, 2008, 6 pages.
International Search Report and Written Opinion received for PCT Patent Application No. PCT/US2007/077638, dated Feb. 19, 2008, 9 pages.
International Preliminary Report on Patentability received for PCT Patent Application No. PCT/US2007/077639, dated Mar. 10, 2009, 6 pages.
International Preliminary Report on Patentability received for PCT Patent Application No. PCT/US2007/077643, dated Mar. 10, 2009, 7 pages.
International Search Report and Written Opinion received for PCT Patent Application No. PCT/US2007/077644, dated May 30, 2008, 18 pages.
Invitation to pay additional fees received for PCT Patent Application No. PCT/US2007/077644, dated Jan. 23, 2008, 10 pages.
International Search Report and Written Opinion received for PCT Patent Application No. PCT/US2007/077773, dated Jan. 15, 2008, 8 pages.

(56) References Cited

OTHER PUBLICATIONS

International Search Report and Written Opinion received for PCT Patent Application No. PCT/US2007/088879, dated Jun. 30, 2008, 8 pages.
International Search Report and Written Opinion received for PCT Patent Application No. PCT/US2007/088893, dated Jul. 11, 2008, 10 pages.
International Preliminary Report on Patentability received for PCT Patent Application No. PCT/US2008/050430, dated Jul. 7, 2009, 10 pages.
International Preliminary Report on Patentability received for PCT Patent Application No. PCT/US2008/050431, dated Jul. 7, 2009, 8 pages.
International Preliminary Report on Patentability received for PCT Patent Application No. PCT/US2008/074341, dated Mar. 9, 2010, 8 pages.
International Search Report and Written Opinion received for PCT Patent Application No. PCT/US2008/074625, dated Jan. 8, 2009, 8 pages.
Smiley Conversion Table, available at "http://surf-style.us/manual3.htm", Dec. 5, 2008, 8 pages.
Agarwal, Amit, "iTunesInlineVideo", Digital Inspiration—The Tech Guide, available online at "http://labnol.blogspot.com/2006_09_17_labnol_archive.html", 2006, 27 pages.
Ahmad et al., "Content-Based Image Retrieval on Mobile Devices", Proceedings of SPIE-ISANDT Electronic Imaging, vol. 5684, 2005, pp. 255-264.
Alam et al., "Web Document Manipulation for Small Screen Devices: A Review", Available at "http://www.csc.liv.ac.uk/~wda2003/Papers/Section_II/Paper_8.pdf", 2003, pp. 33-36.
Alejandre, Suzanne, "Graphing Linear Equations", Available at "http://mathforum.org/alejandre/palm/times.palm.html", retrieved on Jun. 12, 2006, 2006, 3 pages.
Apparao et al., "Level 1 Document Object Model Specification", W3C Working Draft, available at "http://www.w3.org/TR/WD-DOM/", Jul. 20, 1998, 3 pages.
Apple, "iPhone User's Guide", Available at "http://mesnotices.20minutes.fr/manuel-notice-mode-emploi/APPLE/IPHONE%2D%5FE#", Retrieved on Mar. 27, 2008, Jun. 2007, 137 pages.
Apple IPhone School, "Customize 1.19 Update for the iPhone", 4:02 minutes video, available at "http://www.youtube.com/watch?v=5ogDzOM89oc", uploaded on Dec. 8, 2007, 2 pages.
Apple IPhone School, "SummerBoard 3.0a9 for iPhone", 4:50 minutes video, available at "http://www.youtube.com/watch?v=s_P_9mrZTKs", uploaded on Oct. 21, 2007, 2 pages.
Barsch, Bill, "3D Desktop! TouchScreen and XGL on Linux!", 2:42 minutes video, available at "http://www.youtube.com/watch?v=Yx9FgLr9oTk", uploaded on Aug. 15, 2006, 2 pages.
Baudisch et al., "Collapse-to-Zoom: Viewing Web Pages on Small Screen Devices by Interactively Removing Irrelevant Content", Microsoft Research, Available at "http://www.patrickbaudisch.com/publications/2004-Baudisch-UIST04-CollapseToZoom.pdf", Oct. 27, 2004, 4 pages.
Bitstream, "ThunderHawk Pocket PC Edition for End Users", Available at "http://www.bitstream.com/wireless/products/pocketpc/faq_using.html", retrieved on Jun. 12, 2006, 2006, 4 pages.
Blickenstorfer, Conrad H., "NeoNode N1 Can a Unique Interface Put this Compelling Smart Phone on the Map?", available at "http://pencomputing.com/WinCE/neonode-n1-review.html", retrieved on Sep. 1, 2014, 5 pages.
Bos et al., "3 Conformance: Requirements and Recommendations", Cascading Style Sheets, level 2 CSS2 Specification, W3C Recommendation, available at "http://www.w3.org/TR/CSS21/conform.html#doctree", May 12, 1998, 6 pages.
Buyukkokten et al., "Power Browser: Efficient Web Browsing for PDAs", Proceedings of the SIGCHI conference on Human Factors in Computing Systems, Dec. 27, 2000, 8 pages.

Chen et al., "A Novel Navigation and Transmission Technique for Mobile Handheld Devices", Technical Report CSE-2003-1, Department of Computer Science, University of California at Davis,, 2003, 8 pages.
Chen et al., "Detecting Web Pages Structure for Adaptive Viewing on Small Form Factor Devices", Proceedings of the 12th international conference on World Wide Web, 2003, 9 pages.
Chen et al., "DRESS: A Slicing Tree Based Web Page Representation for Various Display Sizes", Microsoft Researach, Technical Report, Nov. 16, 2002, 9 pages.
CNET, "Fujitsu LifeBook B6110D", Reviews, Nov. 24, 2005, 2 pages.
Cooper, Alan, "The Inmates Are Running the Asylum", Sams Publishing, Mar. 23, 1999, pp. 138-147.
ExpansysTV, "HTC Touch Dual Demonstration by eXpansys", 5:26 minutes video, available at "http://www.youtube.com/watch?v=Tupk8MYLhMk", uploaded on Oct. 1, 2007, 2 pages.
Eyemodule Springboard Compatible, "Turn Your Handspring Visor Handheld into a Digital Camera", User's Manual, 2000, 9 pages.
Farber, Dan, "Jobs: Today Apple is Going to Reinvent the Phone", ZDNet, available at "http://www.zdnet.com/blog/btl/jobs-today-apple-is-going-to-reinvent-the-phone/4249", Jan. 9, 2007, 3 pages.
Fingerworks Forums, "Is the Multitouch Lemur?", Available at "http://64233.167.104/search?q=cache:sjVdtyFBvRMJ:forums.finger", retrieved on Nov. 16, 2005, Dec. 24, 2004, 2 pages.
Fingerworks, Inc., "Installation and Operation Guide for the TouchStream and TouchStream LP", available at "http://www.fingerworks.com", 2002, 14 pages.
Tooeasytoforget, "iPhone—Demo of SummerBoard and Its Features", 5:05 minutes video, available at "http://www.youtube.com/watch?v=CJOb3ftQLac", uploaded on Sep. 24, 2007, 2 pages.
Versiontracker, "Photogather-7.2.6. Hi-res Image Viewer and Editor for Palm", Available online at "http://www.versiontracker.com/dyn/moreinfo/palm/4624", retrieved on Jun. 12, 2006, 2006, 5 pages.
w3schools.com, "Playing Videos on the Web", Available online at "http://www.w3schools.com/media/media_browservideos.asp?out=print", 2006, 3 pages.
w3schools.com, "Multimedia Video Formats", Available online at "http://www.w3sschools.com/media/media_videoformats.asp?output=print", 2006, 2 pages.
w3schools.com, "Playing QuickTime Movies", Available online at "http://www.3schools.com/media/media_quicktime.asp?output=print", 2006, 2 pages.
Warabino et al., "Video Transcoding Proxy for 3Gwireless Mobile Internet Access", IEEE Communications Magazine, vol. 38, No. 10, Oct. 2000, pp. 66-71.
Wave Technologies, International Inc., "Certified Internet Webmaster Foundations Study Guide", A Thomson Learning Company, CIWF-SGMN-0101A, copyright 1988-2000, 88 pages.
Weblogs, "An Overview of WebCore", Chapter 2, WebCore Documentation, available at "http:/Iweblogs.mozillazine.org/hyatt/WebCore/chapter2.html", 2006, 3 pages.
Weblogs, "Downloading and Building WebCore", Chapter 1, WebCore Documentation, available at "http://weblogs.mozillazine.org/hyatt/WebCore/chapter1.html", 2006, 2 pages.
webmasterworld.com, "Page Zooming with IE—Hidden Feature!", Available at "http://www.webmasterworld.com/forum83/4179.htm", Jul. 2004, 7 pages.
Wikipedia, "Comparison of Layout Engines", The free encyclopedia, available at "http://en.wikipedia.org/wiki/Comparison_of_layout_engines", 2006, 3 pages.
Wikipedia, "History of YouTube", The Free Encyclopedia, available at "http://en.wikipedia.org/wiki/History_of_YouTube", retrieved on Mar. 15, 2011, 4 pages.
Wikipedia, "KDE", The free encyclopedia, available at "http://en.wikipedia.org/wiki/KDE", 2006, 9 pages.
Wikipedia, "KHTML", The free encyclopedia, available at "http://en.wikipedia.org/wiki/KHTML", 2006, 3 pages.
Wikipedia, "List of Layout Engines", The Free Encyclopedia, available at "http://en.wikipedia.org/wiki/List_of_layout_engines", 2006, 1 page.
Williams, Martyn, "LG's Cell Phone Can Pause Live TV", PC World, Oct. 11, 2005, 2 pages.

(56) References Cited

OTHER PUBLICATIONS

Wobbrock et al., "WebThumb: Interaction Techniques for Small-Screen Browsers", UIST'02, Paris France, Oct. 27-30, 2002, pp. 205-208.
Xiao et al., "Slicing-Tree Based Web Page Transformation for Small Displays", International Conference on Information and Knowledge Management, Oct. 31-Nov. 5, 2005, 2 pages.
Xie et al., "Efficient Browsing of Web Search Results on Mobile Devices Based on Block Importance Model", Microsoft Research Asia, 2005, 10 pages.
Yin et al., "Using Link Analysis to Improve Layout on Mobile Devices", Proceedings of the 13th international conference on World Wide Web, available at "http://www.iw3c2.org/WWW2004/docs/1p338.pdf", May 17-22, 2004, pp. 338-344.
Youtube, "Broadcast Yourself", Available at "www.youtube.com", Nov. 1, 2005, 2 pages.
Youtube, "Broadcasting Ourselves", The Official Youtube blog Available at "http://youtube-global.blogspot.in/2005_11_01_archive.html", Nov. 15, 2005, 5 pages.
Notice of Allowance received for U.S. Appl. No. 11/969,912, dated Mar. 6, 2014, 12 pages.
Office Action received for German Patent Application No. 112007002107.1, dated Jun. 7, 2010, 3 pages (English Translation only).
Final Office Action received for U.S. Appl. No. 12/217,029, dated May 22, 2014, 12 pages.
Advisory Action received for U.S. Appl. No. 12/242,851, dated Nov. 15, 2013, 4 pages.
Non-Final Office Action received for U.S. Appl. No. 12/242,851, dated Oct. 6, 2014, 27 pages.
Non-Final Office Action received for U.S. Appl. No. 12/981,433, dated Oct. 11, 2012, 29 pages.
Extended European Search Report (includes Partial European Search Report and European Search Opinion) received for European Patent Application No. 12169786.6, dated Jul. 11, 2012, 10 pages.
Office Action received for European Patent Application No. 12194312.0, dated Jan. 13, 2014, 4 pages.
Office Action received for European Patent Application No. 12194315.3, dated Jan. 13, 2014, 4 pages.
Non-Final Office Action received for U.S. Appl. No. 13/155,304, dated Sep. 5, 2012, 11 pages.
Extended European Search Report (includes Partial European Search Report and European Search Opinion) received for European Patent Application No. 13174706.5, dated Jan. 8, 2015, 8 pages.
Final Office Action received for U.S. Appl. No. 14/261,112, dated Oct. 9, 2014, 29 pages.
Non-Final Office Action received for U.S. Appl. No. 14/261,112, dated Jun. 18, 2014, 25 pages.
Notice of Allowance received for Canadian Patent Application No. 2,633,759, dated Sep. 9, 2013, 1 page.
Office Action received for Canadian Patent Application No. 2,633,759, dated Aug. 12, 2010, 8 pages.
Office Action received from Canadian Patent Application No. 2,633,759, dated Apr. 18, 2013, 2 pages.
Notice of Allowance received for Canadian Patent Application No. 2,845,297, dated Nov. 10, 2014, 1 page.
Office Action received for Canadian Patent Application No. 2,845,297, dated Apr. 23, 2014, 2 pages.
Office Action received for Australian Patent Application No. 2007289019, dated Jul. 2, 2009, 3 pages.
Office Action received for Australian Patent Application No. 2007289019, dated Oct. 7, 2009, 2 pages.
Notice of Acceptance received for Australian Patent Application No. 2007292383, dated Jan. 4, 2012, 3 pages.
Office Action received for Australian Patent Application No. 2007292383, dated Dec. 22, 2011, 2 pages.
Office Action received for Australian Patent Application No. 2007292383, dated Mar. 24, 2010, 2 pages.
Office Action received for Australian Patent Application No. 2007292383, dated May 12, 2011, 2 pages.
Decision to Grant received for Chinese Patent Application No. 200780001140.9, dated Feb. 3, 2012, 4 pages (2 pages of English Translation and 2 pages of Official copy).
Office Action received for Chinese Patent Application No. 200780001140.9, dated Jan. 15, 2010, 5 pages (English Translation only).
Office Action received for Chinese Patent Application No. 200780001140.9, dated Jun. 10, 2011, 7 pages (English Translation only).
Office Action received for Chinese Patent Application No. 200780041222.6, dated Feb. 29, 2012, 6 pages (3 pages of English Translation and 3 pages of Official copy).
Office Action received for Chinese Patent Application No. 200780041222.6, dated Jul. 25, 2012, 3 pages (English Translation only).
Office Action received for Chinese Patent Application No. 200780041222.6, dated Oct. 13, 2010, 10 pages (English Translation only).
Office Action received for Chinese Patent Application No. 200780052019.9, dated Feb. 29, 2012, 6 pages (3 pages of English Translation and 3 pages of Official Copy).
Patent Grant received for Japanese Patent Application No. 2008-548858, dated Sep. 24, 2012, 3 pages (Official Copy only).(See Communication under 37 CFR § 1.98(a) (3)).
Notice of Allowance received for Japanese Patent Application No. 2009-051921, dated Jan. 20, 2014, 2 pages (Official Copy only). (See Communication under 37 CFR § 1.98(a) (3)).
Office Action received for Japanese Patent Application No. 2009-051921, dated May 31, 2013, 7 pages (3 pages of English Translation and 4 pages of Official Copy).
Office Action received from Japanese Patent Application No. 2009-051921, dated Sep. 24, 2012, 3 pages (English Translation only).
Office Action received for Australian Patent Application No. 2009100760, dated Sep. 28, 2009, 2 pages.
Intention to Grant received for Chinese Patent Application No. 200910173272.0, dated Oct. 23, 2012, 1 page (English Translation Only).
Office Action received for Chinese Patent Application No. 200910175852.3, dated Apr. 24, 2012, 10 pages (6 pages of English Translation and 4 pages of Official Copy).
Office Action received for Chinese Patent Application No. 200910175852.3, dated Jun. 2, 2011, Jun. 2, 2011, 6 pages (English Translation only).
Office Action received for Australian Patent Application No. 2009204252, dated Nov. 28, 2013, 2 pages.
Office Action received for Australian Patent Application No. 2009204252, dated Sep. 16, 2014, 6 pages.
Response to Notice of Opposition filed for Australian Patent Application No. 2009204252, on Apr. 28, 2014, 4 pages.
Office Action received for Japanese Patent Application No. 2009-527541, dated May 21, 2012, 3 pages (English Translation only).
Office Action received for Japanese Patent Application No. 2009-527541, dated Sep. 26, 2011, 3 pages (English Translation only).
Office Action received for Japanese Patent Application No. 2009-527566, dated Aug. 15, 2011, 3 pages (English Translation only).
Office Action received for Japanese Patent Application No. 2009-527566, dated Sep. 21, 2012, 3 pages (English Translation only).
Notice of Allowance received for Chinese Patent Application No. 200980000229.2, dated Oct. 24, 2014, 2 pages (Official Copy only).(See Communication under 37 CFR § 1.98(a) (3)).
Office Action received for Chinese Patent Application No. 200980000229.2, dated Jan. 6, 2014, 6 pages (3 pages of English Translation and 3 pages of Official Copy).
Office Action received for Chinese Patent Application No. 200980000229.2, dated Jun. 27, 2014, 7 pages (4 pages of English Translation and 3 pages of Official copy).
Office Action received for Chinese Patent Application No. 200980152822.9, dated Oct. 21, 2013, 2 pages(English Translation Only).
Office Action received for European Patent Application No. 07814690.9, dated Jun. 21, 2010, 5 pages.
Office Action received for European Patent Application No. 07814690.9, dated Oct. 19, 2010, 8 pages.

(56) References Cited

OTHER PUBLICATIONS

Summons to Attend Oral Proceedings received for European Patent Application No. 07814690.9, mailed on Nov. 22, 2011, 4 pages.
Office Action received for European Patent Application No. 07841980.1, dated Feb. 23, 2012, 5 pages.
Summons to Attend Oral Proceedings received for European Patent Application No. 07841980.1, mailed on Sep. 28, 2012, 8 pages.
Office Action received for European Patent Application No. 07869929.5, dated Dec. 27, 2010, 6 pages.
Summons to Attend Oral Proceedings received for European Patent Application No. 07869929.5, mailed on Dec. 13, 2011, 6 pages.
Summons to Attend Oral Proceedings received for European Patent Application No. 07869929.5, mailed on Jan. 23, 2012, 1 page.
Office Action received for European Patent Application No. 08798713.7, dated Feb. 9, 2012, 7 pages.
Extended European Search Report (includes Partial European Search Report and European Search Opinion) received for European Patent Application No. 09170697.8, dated Apr. 28, 2010, 3 pages.
Summons to attend oral proceedings received for European Application No. 09170697.8, mailed on Apr. 22, 2013, 6 pages.
Decision to Refusal received for European Patent Application No. 09171787.6, dated Dec. 14, 2011, 22 pages.
Extended European Search Report (includes Partial European Search Report and European Search Opinion) received for European Patent Application No. 09171787.6, dated Jan. 26, 2010, 6 pages.
Office Action received for European Patent Application No. 09171787.6, dated Jul. 12, 2011, 5 pages.
Office Action received for Taiwan Patent Application No. 097100075, dated Dec. 29, 2011, 5 pages (English Translation only).
Notice of Allowance received for Korean Patent Application No. 10-2009-7007064, dated Sep. 30, 2011, 2 pages (Official Copy only).(See Communication under 37 CFR § 1.98(a) (3)).
Notice of Allowance received for Korean Patent Application No. 10-2009-7007067, dated Dec. 1, 2011, 2 pages (Official Copy only).(See Communication under 37 CFR § 1.98(a) (3)).
Office Action received for Korean Patent Application No. 10-2009-7007067, dated Aug. 30, 2011, 2 pages (English Translation only).
Office Action received for Korean Patent Application No. 10-2009-7007067, dated Nov. 12, 2010, 3 pages (English Translation only).
Notice of Allowance received for Korean Patent Application No. 10-2010-7007258, dated Nov. 20, 2013, 2 pages (Official Copy only).(See Communication under 37 CFR § 1.98(a) (3)).
Office Action received for Korean Patent Application No. 10-2010-7007258, dated Jan. 30, 2013, 8 pages (4 pages of English Translation and 4 pages of Official Copy).
Zytronic, "Touchscreen User Manual Zytronic X-Y Controller (Serial and USB)", XP007916436, Nov. 17, 2006, pp. 1-51.
Notice of Allowance received for Korean Patent Application No. 10-2011-7019633, dated May 18, 2012, 2 pages (Official Copy only).(See Communication under 37 CFR § 1.98(a) (3)).
Office Action received for Korean Patent Application No. 10-2011-7026583, dated Aug. 14, 2014, 6 pages (2 pages of English Translation and 4 pages of Official Copy).
Office Action received for Korean Patent Application No. 10-2014-7011273, dated Aug. 14, 2014, 5 pages (2 pages of English Translation and 3 pages of Official Copy).
Final Office Action received for U.S. Appl. No. 11/620,647, dated Dec. 23, 2010, 21 pages.
Non-Final Office Action received for U.S. Appl. No. 11/620,647, dated Jun. 24, 2010, 19 pages.
Non-Final Office Action received for U.S. Appl. No. 11/620,647, dated Nov. 17, 2009, 20 pages.
Non-Final Office Action received for U.S. Appl. No. 11/620,647, dated Oct. 13, 2011, 23 pages.
Notice of Allowance received for U.S. Appl. No. 11/620,647, dated Mar. 2, 2012, 8 pages.
Notice of Allowance received for U.S. Appl. No. 11/849,938, dated Nov. 27, 2013, 2 pages.
Final Office Action received for U.S. Appl. No. 11/850,008, dated Dec. 29, 2010, 14 pages.
Non-Final Office Action received for U.S. Appl. No. 11/850,008, dated Aug. 2, 2010, 14 pages.
Notice of Allowance received for U.S. Appl. No. 11/850,008, dated Mar. 11, 2011, 7 pages.
Final Office Action received for U.S. Appl. No. 11/850,010, dated May 8, 2014, 11 pages.
Non Final Office Action received for U.S. Appl. No. 11/850,010, dated Dec. 17, 2014, 10 pages.
Non-Final Office Action received for U.S. Appl. No. 11/850,010, dated Oct. 24, 2013, 13 pages.
Notice of Allowance received for U.S. Appl. No. 11/850,011, dated Feb. 11, 2011, 5 pages.
Supplemental Notice of Allowance received for U.S. Appl. No. 11/850,011, dated Feb. 24, 2011, 6 pages.
Non-Final Office Action received for U.S. Appl. No. 11/850,013, dated Jun. 11, 2010, 32 pages.
Notice of Allowance received for U.S. Appl. No. 11/850,013, dated Oct. 20, 2010, 20 pages.
Final Office Action received for U.S. Appl. No. 11/850,638, dated May 15, 2012, 16 pages.
Final Office Action received for U.S. Appl. No. 11/850,638, dated Feb. 8, 2011, 14 pages.
Non-Final Office Action received for U.S. Appl. No. 11/850,638, dated Oct. 26, 2010, 17 pages.
Non-Final Office Action received for U.S. Appl. No. 11/850,638, dated Jan. 17, 2012, 15 pages.
Final Office Action received for U.S. Appl. No. 11/961,773, dated Nov. 2, 2011, 12 pages.
Final Office Action received for U.S. Appl. No. 11/961,773, dated Nov. 29, 2012, 15 pages.
Non-Final Office Action received for U.S. Appl. No. 11/961,773, dated Apr. 15, 2011, 21 pages.
Non-Final Office Action received for U.S. Appl. No. 11/961,773, dated May 10, 2012, 14 pages.
Notice of Allowance received for U.S. Appl. No. 11/969,912, dated Jun. 11, 2014, 4 pages.
Notice of Allowance received for Korean Patent Application No. 10-2011-7026583, dated Apr. 29, 2015, 2 pages (Official Copy only). (See Communication under 37 CFR § 1.98(a) (3)).
Notice of Allowance received for Korean Patent Application No. 10-2014-7011273, dated Apr. 28, 2015, 2 pages (Official Copy only). (See Communication under 37 CFR § 1.98(a) (3)).
Fingerworks, Inc., "Quick Reference Guide for iGesture Products", available at "http://www.fingerworks.com", 1999-2002, 2 pages.
Fingerworks, Inc., "Quick Reference Guide for TouchStream ST/LP", available at "http://www.fingerworks.com", 2001-2003, 4 pages.
Fingerworks, Inc., "TouchStream LP Silver", available at "http://www.fingerworks.com", Apr. 27, 2005, 18 pages.
Geary, Leigh, "Orange SPV C600 Review", Available at "http://www.coolsmartphone.com/2010/12/23/orange-spv-c600-review/", Apr. 14, 2006, 58 pages.
Getgreg, "Jeff Han's Multiple Touch Point Display, the Stuff Dreams are Made of", Available at "http://www.theyshoulddothat.com/2006/08/jeff_hanns_multiple_touch_poin.html", retrieved on Aug. 16, 2006, Aug. 16, 2006, 2 pages.
Gsmarena, Team, "HTC Touch Review: Smart to Touch the Spot", available at "http://www.gsmarena.com/htc_touch-review-189.php", Nov. 28, 2007, 18 pages.
Guan et al., "Zoom Selector: A Pen-based Interaction Technique for Small Target Selection", Transactions of the Information Processing Society of Japan, vol. 45, No. 8, Aug. 2004, pp. 2087-2097.
Han, Jeff, "Unveiling the Genius of Multi-touch Interface Design", Ted Ideas Worth Spreading, available at "http://www.ted.com/index.php/talks/view/id/65", Aug. 2006, 1 page.
Hart, Kim, "Rewriting the Web for Mobile Phones", washingtonpost.com, available at "http://www.washingtonpost.com/wp-dyn/content/article/2006/07/25/AR2006072501517_pf.html", Jul. 26, 2006, 2 pages.
Hinckley et al., "Input/Output Devices and Interaction Techniques", CRC Press, Nov. 2004, pp. 1-79.

(56) References Cited

OTHER PUBLICATIONS

Holmquist, Lars Erik., "The Zoom Browser Showing Simultaneous Detail and Overview in Large Documents", Available at "http://www.hb.se/bhs/ith/3-98/leh.htm" retrieved Dec. 19, 2007, Human IT, 1998, pp. 1-12.
Infoworld Video, "Two Geeks and an iPhone: Part 3", available at "http://web.archive.org/web/20080124065641/http:/www.infoworld.com/video/interviews/Mobile-Tech-Apple-iPhone/Two-Geeks-and-an-iPhone-Part-3/video_1966.html", Dec. 18, 2007, 2 pages.
Karlson et al., "AppLens and LaunchTile: Two Designs for One-Handed Thumb Use on Small Devices", CHI 2005, Papers: Small Devices 1, Apr. 2-7, 2005, pp. 201-210.
Karlson et al., "AppLens and LaunchTile: Two Designs for One-Handed Thumb Use on Small Devices", Powerpoint Presentation, CHI 2005, 17 pages.
Khella et al., "Pocket PhotoMesa: A Zoomable Image Browser for PDAs", Proceedings of the 3rd International Conference on Mobile and Ubiquitous Multimedia, available at "http://delivery.acm.org/10.1145/1060000/1052384/p19-khella.pdf?key1=1052384ANDkey2=2419987911ANDco11=GUIDEANDd1=GUIDEANDCFID=47073625ANDCFTOKEN=65767142", Oct. 29, 2004, pp. 19-24.
Kinoma, "Kinoma Player 4 EX Documentation", Available at "http://replay.waybackmachine.org/20061101175306/http://www.kinoma.com/index/pd-player-4", archived on Nov. 1, 2006, 28 pages.
Laakko et al., "Adapting Web Content to Mobile User Agents", IEEE Internet Computing, vol. 9, No. 2, Mar./Apr. 2005, pp. 46-53.
Landragin, Frederic, "The Role of Gesture in Multimodal Referring Actions", Proceedings of the 4th IEEE International Conference on Multimodal Interfaces, available at "http://ieeexplore.iee.org/ie15/8346/26309/01166988pdf?arnumber=1166988", 2002, 6 pages.
Lie, Hakon Wium, "Cascading Style Sheets", University of Osloensis, MDCCCXI, 2005, pp. 243-247.
Microsoft Word, "Example of Scrolling Pages in Word 2003", 2003, 3 pages.
Milic-Frayling et al., "SmartView: Enhanced Document Viewer for Mobile Devices", Microsoft Technical Report, available at "ftp://ftp.research.microsoft.com/pub/tr/tr-2002-114.pdf", retrieved on Dec. 17, 2007, Nov. 15, 2002, 9 pages.
Milic-Frayling et al., "SmartView: Flexible Viewing of Web Page Contents", Proceedings of the Eleventh International World Wide Web Conference, available at "http://www2002.org/CDROM/poster/172/", May 11, 2002, 4 pages.
Miller, Matthew, "HTC Touch and TouchFLO Interface", 7:53 minutes video, available at "http://www.youtube.com/watch?v=6oUp4wOcUc4", uploaded on Jun. 6, 2007, 2 pages.
Neonode Inc., "Welcome to the N1 Guide", available at "http://www.ebookspdf.com/gadget/2818/neonode-n1m-manual/", Jul. 2004, pp. 1-42.
neonode.com, "N1 Quick Start Guide", Version 0.5, Apr. 5, 2005, pp. 1-24.
NTT Docomo, "i-mode Compatible Pictograms", available at "http://www.nttdocomo.co.jp/english/service/imode/make/content/pictograph/index.html", 2008, 2 pages.
Oliver, Dick, "Adding Multimedia to Your Web Site", Chapter 22, Web Publishing Professional Reference Edition, Available online at "http://www.ssuet.edu.pk/taimoor/books/1-57521-198-X/index.htm", 1997, 14 pages.
Opera Software, "Download the Opera Mobile™ Browser", Available at "http://www.opera.com/products/mobile/products/", retrieved on Oct. 19, 2006, 5 pages.
Opera Software, "Opera 7.60 for Series 60 Mobile", Available at "http://jp.opera.com/support/tutorials/s60/760/O760manual.pdf", 2009, 14 pages.
Opera Software, "Opera 8.5 Beta 2 for Windows Mobile, Pocket PC", Available at "http://www.opera.com/products/mobile/products/winmobileppc", retrieved on Apr. 5, 2006, 2 pages.
Opera Software, "Opera 8.5 for S60 Phones—Get the Full Internet Experience on Your Mobile Phone", Available at "http://www.symbian-freak.com/news/1105/opera.htm", Oct. 14, 2005, 3 pages.
Opera Software, "Opera for Mobile, The Full Web Anytime, Anywhere", Available at "www.opera.com/mobile", Jan. 2006, 7 pages.
Opera Software, "Opera for S60 Tutorial", Available at "http://www.xmarks.com/site/www.opera.com/support/tutorials/s60/", retrieved on Apr. 5, 2006, 5 pages.
Opera Software, "Opera for Windows Mobile Smartphone 2003 Tutorial", Available at "http://www.opera.com/support/tutorials/winmobile", retrieved on Apr. 5, 2005, 4 pages.
Opera Software, "The New Opera Browser for Series 60 Features Zoom and Password Manager", Press Releases Database, Available at "http://pressreleases.techwhack.com/1334/1411-opera-browser-features-zoom-and-password", Nov. 14, 2005, 3 pages.
Palme et al., "MIME Encapsulation of Aggregate Documents, such as HTML", Network Working Group, 1999, 24 pages.
Palmone, "Your Mobile Manager", Chapter 2, LifeDrive User's Guide, available at "http://www.palm.com/us/support/handbooks/lifedrive/en/lifedrive_handbook.pdf", 2005, 23 pages.
Park, Will, "Apple iPhone v1.1.1 SpringBoard Hacked to Display Multiple Pages", available at "http://www.intomobile.com/2007/10/09/apple-iphone-v111-springboard-hacked-to-display-multiple-pages/", Oct. 9, 2007, 5 pages.
PCFAN, "Boot Camp Introduction/Data Transition/Operability/Ability Truth Derived from Gap MacANDWin Dual Boot Hard Verification", Daily Communications, vol. 13, No. 14, Jun. 15, 2006, p. 57 (Japanese Language only).(See Communication under 37 CFR § 1.98(a) (3)).
Raman et al., "Application-Specific Workload Shaping in Multimedia-Enabled Personal Mobile Devices", CODES +ISSS, Oct. 22-25, 2006, pp. 4-9.
Robie, Jonathan, "What is the Document Object Model?", Texcel Research, available at "http://www.w3.org/TR-DOM/introduction.html", 2006, 5 pages.
Rohrer, Tim, "Metaphors We Compute by: Bringing Magic into Interface Design", Available online at "http://www.uoregon.edu/-uophil/metaphor/gui4web.htm", retrieved on Jun. 13, 2006, 7 pages.
Roto et al., "Minimap—A Web Page Visualization Method for Mobile Phones", Proceedings of the SIGCHI Conference on Human Factors in Computing Systems, Apr. 22-27, 2006, pp. 35-44.
Sadun, Erica, "1.1.1 iPhone Multipage Springboard Hack", Available at: "http://www.tuaw.com/2007/10/09/1-1-1-iphone-multipage-springboard-hack/", Oct. 9, 2007, 3 pages.
Sadun, Erica, "Found Footage: Scrolling iPhone Dock Smashes Through 16-icon Home Screen Limit", The Unofficial Apple Weblog, available at "http://www.tuaw.com/2007/08/30/found-footage-scrolling-iphone-dock-smashes-through-16-icon-hom/", Aug. 30, 2007, 3 pages.
Salmre, I., "Characteristics of Mobile Applications", Chapter 2, Salmre_02.fm, Dec. 20, 2004, pp. 19-36.
Schreiner, Tony, "High DPI in IE: Tip and Mystery Solved", Tony Schreiner's Blog, available at "http://blogs.msdn.com/tonyschr/archive/2004/05/05/126305.aspx", May 2004, 2 pages.
Stampfli, Tracy, "Exploring Full-Screen Mode in Flash Player 9", Available online at "http://www.adobe.com/devnet/flashplayer/articles/full_screen_mode.html", Nov. 14, 2006, 2 pages.
Stanek et al., "Video and Animation Plug-Ins", Chapter 9, Web Publishing Professional Reference Edition, available online at "http://www.ssuet.edu.pk/taimoor/books/1-57521-198-X/index.htm", 1997, 18 pages.
Surfin'Safari, "XUL", Available online at "http://weblogs.mozillazine.org/hyatt.archives/2003_10.html", Oct. 2003, 7 pages.
Office Action received for Australian Patent Application No. 2012200475, dated Aug. 4, 2015, 3 pages.
Office Action received for Australian Patent Application No. 2014204422, dated Aug. 7, 2015, 3 pages.
Non-Final Office Action received for U.S. Appl. No. 11/850,010, dated Jun. 25, 2015, 10 pages.
Non-Final Office Action received for U.S. Appl. No. 12/242,851, dated Jun. 26, 2015, 33 pages.
Non-Final Office Action received for U.S. Appl. No. 14/261,112, dated Jul. 8, 2015, 29 pages.
Office Action received for Australian Patent Application No. 2012200475, dated Jun. 29, 2015, 3 pages.

(56) References Cited

OTHER PUBLICATIONS

Non Final Office Action received for U.S. Appl. No. 14/142,640, dated Jun. 5, 2015, 29 pages.
GSM, Arena, "Neonode N2 User Interface", 3:06 minutes video, available at <https://www.youtube.com/watch?v=MfDMHmIZRLc>, uploaded on Feb. 13, 2007, 2 pages.
Joire, Myriam, "Neonode N1m Review", 9:55 minutes video, available at <http://www.youtube.com/watch?v=Tj-KS2kflr0>, uploaded on Jun. 29, 2007, 3 pages.
Park, Will, "Neonode N2 Unboxing Pics!", available at <http://www.intomobile.com/2007/07/18/neonode-n2-unboxing-pics/>, Jul. 18, 2007, 7 pages.
Office Action dated Jul. 29, 2014, directed to EP Application No. 08798713.7; 18 pages.
Decision to refuse a European Patent application received for European Patent Application No. 06846840.4, dated Mar. 4, 2010, 10 Pages.
Summons to Attend Oral proceedings received for European Patent Application No. 06846840.4, mailed on May 18, 2009, 7 pages.
Decision to Refuse Patent Application received for European Patent Application No. 07814689.1, dated May 11, 2012, 15 pages.
Decision to Refuse Application received for European Patent Application No. 09170697.8, dated Oct. 23, 2013, 12 Pages.
Decision to Grant received for European Patent Application No. 09700333.9, dated Nov. 7, 2013, 2 pages.
Non-Final Office Action received for U.S. Appl. No. 12/217,029, dated Oct. 28, 2015, 23 pages.
Notice of Allowance received for U.S. Appl. No. 14/011,639, dated Sep. 29, 2015, 11 pages.
Advisory Action received for U.S. Appl. No. 14/261,112, dated Apr. 23, 2015, 3 pages.
Office Action received for Chinese Patent Application No. 201210399033.9, dated Oct. 8, 2015, 8 pages (3 pages of English Translation and 5 pages of Official Copy).
Notice of Acceptance received for Australian Patent Application No. 2012200475, dated Aug. 24, 2015, 2 pages.
Notice of Allowance received for Japanese Patent Application No. 2013-127963, dated Oct. 9, 2015, 2 pages (Official Copy only). (See Communication under 37 CFR § 1.98(a) (3)).
Intention to Grant received for European Patent Application No. 12194315.3, dated May 31, 2017, 8 pages.
Notice of Allowance received for Canadian Patent Application No. 2,890,778, dated Apr. 24, 2017, 1 page.
Office Action received for Australian Patent Application No. 2015215876, dated May 24, 2017, 4 pages.
Office Action received for Australian Patent Application No. 2016213886, dated May 18, 2017, 2 pages.
Office Action received for Chinese Patent Application No. 201310724733.5, dated Apr. 21, 2017, 18 pages (5 pages of English Translation and 13 pages of Official Copy).
Advisory Action received for U.S. Appl. No. 12/217,029, dated Dec. 14, 2016, 3 pages.
Advisory Action received for U.S. Appl. No. 14/710,125, dated Mar. 14, 2017, 3 pages.
Board Opinion received for Chinese Patent Application No. 200780041309.3, dated Apr. 1, 2016, 16 pages (9 pages of English Translation and 7 pages of Official Copy).
Decision of Board of Appeal received for European Patent Application No. 09170697.8, mailed on Oct. 24, 2016, 24 pages.
Decision to Grant received for European Patent Application No. 12177813.8, dated Nov. 24, 2016, 3 pages.
Final Office Action received for U.S. Appl. No. 14/261,112, dated Mar. 3, 2016, 31 pages.
Final Office Action received for U.S. Appl. No. 11/850,010, dated Apr. 18, 2016, 16 pages.
Final Office Action received for U.S. Appl. No. 12/242,851, dated Jul. 1, 2016, 90 pages.
Final Office Action received for U.S. Appl. No. 14/710,125, dated Oct. 27, 2016, 13 pages.

Final Office Action received for U.S. Appl. No. 14/142,640, dated Mar. 8, 2016, 35 pages.
Huang, et al., "Effects of Visual Vibratory Perception by Cross-Modali Matching with Tactile Sensation", Retrieved from the Internet: URL:http://media.nuas.ac.jp/~robin/Research/ADC99.html, 1999, pp. 1-7.
Intention to Grant received for European Patent Application No. 12177813.8, dated Jul. 6, 2016, 8 pages.
Kondo, Daisuke, "Windows XP Tablet PC Edition Quick Review Challenging by Microsoft", PC fan No. 9, No. 28, Japan, Mainichi Communication, Oct. 15, 2002, pp. 12-17 (Official Copy only) (see attached 37 CFR § 1.98(a) (3)).
"Launch 'Em Version 3.1", Retrieved from the Internet: URL:http://www.fladnag.net/downloads/telephone/palm/APPS/Inchem31/Documentation/LaunchEm.pdf, 2001, pp. 1-39.
"Macintosh Human Interface Guidelines (chapter 1)", 1995, pp. 3-14.
Nakata, Atsushi, "Tablet PC aiming at spread pen input by changing target user", Nikkei Windows for IT Professionals, Nikkei Business Publications, Inc. No. 69, Dec. 1, 2002, pp. 14-16, (Official Copy only) (see attached 37 CFR § 1.98(a) (3)).
Nazley, et al., "LauncherX", Online Available at <http://www.palmx.org/mambo/index2.php?option=com_content&task=view&id=65&Itemid>, Nov. 21, 2002, 3 pages.
"Nokia 7710", Available online at https://www.nokia.com/en_int/phones/sites/default/files/user-guides/Nokia_7710_UG_en.pdf, 2005, pp. 153.
Non-Final Office Action received for U.S. Appl. No. 14/261,112, dated Nov. 29, 2016, 34 pages.
Non-Final Office Action received for U.S. Appl. No. 14/710,125, dated Apr. 12, 2016, 12 pages.
Notice of Acceptance received for Australian Patent Application No. 2014204422, dated Apr. 28, 2016, 2 pages.
Notice of Allowance received for Australian Patent Application No. 2015202076, dated Apr. 5, 2017, 3 Pages.
Notice of Allowance received for Chinese Patent Application No. 201210399033.9, dated Jun. 20, 2016, 3 pages (2 pages of English Translation and 1 page of Official Copy).
Notice of Allowance received for Japanese Patent Application No. 2013-011209, dated Jun. 13, 2016, 2 pages (Official Copy only) (see attached 37 CFR § 1.98(a) (3)).
Notice of Allowance received for U.S. Appl. No. 12/217,029, dated Jan. 17, 2017, 10 pages.
Notice of Allowance received for U.S. Appl. No. 12/242,851, dated Dec. 27, 2016, 20 pages.
Notice of Allowance received for U.S. Appl. No. 14/011,639, dated Feb. 16, 2016, 5 pages.
Office Action received for Australian Patent Application No. 2015202076, dated May 5, 2016, 3 pages.
Office Action received for Australian Patent Application No. 2015215876, dated Aug. 1, 2016, 4 pages.
Office Action received for Chinese Patent Application No. 200780041309.3, dated Feb. 8, 2017, 4 pages (1 page of English Translation and 3 pages of Official Copy).
Office Action received for Chinese Patent Application No. 2013107247335, dated Apr. 12, 2016, 14 pages (3 pages of English Translation and 11 pages of Official Copy).
Office Action received for Chinese Patent Application No. 2013107247335, dated Dec. 30, 2016, 13 pages (3 pages of English Translation and 10 pages of Official Copy).
Office Action received for Chinese Patent Application No. 2014102506484, dated Oct. 9, 2016, 6 pages (3 pages of English Translation and 3 pages of Official Copy).
Office Action received for Chinese Patent Application No. 2014102506889, dated Sep. 28, 2016, 7 pages (3 pages of English Translation and 4 pages of Official Copy).
Office Action received for Chinese Patent Application No. 2014102513702, dated Sep. 5, 2016, 7 pages (3 pages of English Translation and 4 pages of Official Copy).
Office Action received for Chinese Patent Application No. 201410251400.X, dated Jul. 4, 2016, 8 pages (2 pages of English Translation and 6 pages of Official Copy).

(56) References Cited

OTHER PUBLICATIONS

Office Action received for European Patent Application No. 08829660.3, dated Jul. 5, 2016, 5 pages.
Office Action received for European Patent Application No. 09170697.8, dated Mar. 3, 2017, 8 pages.
Office Action received for European Patent Application No. 12189764.9, dated Mar. 1, 2016, 6 pages.
Office Action received for Japanese Patent Application No. 2013-011209, dated Nov. 2, 2015, 9 pages (2 pages of English Translation and 7 pages of Official Copy).
Office Action received for Japanese Patent Application No. 2013-252338, dated Dec. 4, 2015, 4 pages (2 pages of English Translation and 2 pages of Official Copy).
Office Action received for Japanese Patent Application No. 2013-252338, dated Jan. 27, 2017, 10 pages (5 pages of English Translation and 5 pages of Official Copy).
Office Action received for Japanese Patent Application No. 2013-252338, dated Jun. 24, 2016, 4 pages (2 pages of English Translation and 2 pages of Official Copy).
Office Action received for Japanese Patent Application No. 2014-253365, dated Dec. 14, 2015, 6 pages (3 pages of English Translation and 3 pages Official Copy).
Office Action received for Japanese Patent Application No. 2014-253365, dated Oct. 17, 2016, 11 pages (5 pages of English Translation and 6 pages of Official Copy).
Office Action received for Japanese Patent Application No. 2016-042767, dated Mar. 3, 2017, 10 pages (6 pages of English Translation and 4 pages of Official Copy).
Office Action received for Japanese Patent Application No. 2016-091460, dated Nov. 4, 2016, 6 pages (3 pages of English Translation and 3 pages of Official Copy).
Shima, Korekazu, et al., "Android Application-Development", From basics of development to mashup/hardware interaction, a road to ""takumi"" of Android application-development, Section I, difference from prior platforms, things which can be done with Android, Mar. 18, 2009, pp. 58-65, (Official Copy only) (see attached 37 CFR § 1.98(a) (3)).
Shiota, Shinji, "Special Developer's Story", DOS/V magazine, vol. 13, No. 10, Jun. 1, 2004, pp. 156-161, (Official Copy only) (see attached 37 CFR § 1.98(a) (3)).
"SilverScreen Theme Library", Online Available at https://web.archive.org/web/20061113121041/http://wvvw.pocketsensei.com/ss_themes.htm, Nov. 13, 2006, 3 pages.
"SilverScreen User Guide", Online Available at <https://web.archive.org/web/20061113121032/http://www.pocketsensei.com/ss_guide.htm>, Nov. 13, 2006, 12 pages.
Summons to Attend Oral Proceedings received for European Application No. 09170697.8, mailed on Jul. 29, 2016, 9 pages.
Summons to Oral Proceedings received for European Patent Application No. 12194312.0, mailed on Dec. 8, 2016, 9 pages.
Summons to Oral Proceedings received for European Patent Application No. 12194315.3, mailed on Dec. 8, 2016, 9 pages.
"TH8000 Series Programmable Thermostats", Retrieved from the Internet: URL:https://ia802507.us.archive.org/1/items/generalmanual_000075065/generalmanual_000075065.pdf, 2004, 44 pages.
Wright, Ben, "Palm OS PDA Application Mini-Reviews", Online Available at http://library.indstate.edu/newsletter/feb04/palmmini.htm, Feb. 3, 2015, 11 pages.
Notice of Allowance received for Japanese Patent Application No. 2013-252338, dated Jun. 23, 2017, 3 pages (Official Copy only) (see attached 37 CFR § 1.98(a) (3)).
Office Action received for Chinese Patent Application No. 201410250688.9, dated Jun. 1, 2017, 12 pages (5 pages of English Translation and 7 pages of Official Copy).
Office Action received for Chinese Patent Application No. 201410251370.2, dated May 12, 2017, 8 pages (4 pages of English Translation and 4 pages of Official Copy).
Office Action Received for Chinese Patent Application No. 201410251400.X, dated May 26, 2017, 11 pages (3 pages of English Translation and 8 pages of Official Copy).

Final Office Action received for U.S. Appl. No. 15/426,836, dated Mar. 29, 2019, 49 pages.
Notice of Allowance received for U.S. Appl. No. 14/710,125, dated Apr. 19, 2019, 8 pages.
Advisory Action received for U.S. Appl. No. 14/261,112, dated Nov. 30, 2017, 3 pages.
Clifton, Marc, "Detect if Another Process is Running and Bring it to the Foreground", Online Available at : https://www.codeproject.com/Articles/2976/Detect-if-another-process-is-running-andbring-it, Sep. 30, 2002, 6 pages.
cocoabuilder.com, "Single Instance of a Cocoa Application", Available at: http://www.cocoabuilder.com/archive/cocoa/167892-single-instance-of-cocoa-application.html, Jul. 19, 2006, 4 pages.
DEANHILL1971, "Run a Program or Switch to an Already Running Instance", Available Online at <https://autohotkey.com/board/topic/7129-run-a-program-or-switch-to-an-already-running-instance/>, Feb. 1, 2006, 16 pages.
Decision to Grant received for European Patent Application No. 12194312.0, dated Feb. 1, 2018, 2 pages.
Decision to Grant Received for European Patent Application No. 12194315.3, dated Oct. 12, 2017, 2 pages.
Decision to Refuse received for European Patent Application No. 09170697.8, dated Jul. 10, 2018, 31 pages.
Examiner's Answer to Appeal Brief received for U.S. Appl. No. 14/710,125, dated Jan. 26, 2018, 6 pages.
Examiner's Pre-review report received for Japanese Patent Application No. 2014-253365, dated Dec. 12 , 2017, 7 pages (3 page of English Translation and 4 pages of Official Copy).
Extended European Search Report received for European Patent Application No. 17210062.0, dated Feb. 20, 2018, 12 pages.
Final Office Action received for U.S. Appl. No. 11/850,010, dated Aug. 14, 2018, 21 pages.
Final Office Action received for U.S. Appl. No. 11/850,010, dated May 11, 2018, 24 pages.
Final Office Action received for U.S. Appl. No. 14/261,112, dated Aug. 10, 2017, 35 pages.
Final Office Action received for U.S. Appl. No. 14/261,112, dated Nov. 7, 2018, 34 pages.
GSMArena Team, "HTC Touch review", Online Available at: <twww.gsmarena.com/htc_touch-review-189p3.php>, Nov. 28, 2007, 18 Pages.
Higuchi, Tadahiro, "Try API!, Making a Cool Application with Visual Basic 6.0", 1st edition, Japan, AI Publishing, AI Mook 221, Jul. 16, 1999, 23 pages (Official Copy Only) (see attached 37 CFR § 1.98(a) (3)).
Intention to Grant received for European Patent Application No. 12194312.0, dated Aug. 3, 2017, 8 pages.
Intention to Grant received for European Patent Application No. 13174706.5, dated Nov. 22, 2018, 12 pages.
Jobs, Steve, "iPhone Introduction in 2007 (Complete)", available at <https://www.youtube.com/watch?v=9hUlxyE2Ns8>, Jan. 10, 2013, 3 pages.
Minutes of Meeting received for European Patent Application No. 09170697.8, dated Jul. 10, 2018, 6 pages.
Minutes of the Oral Proceedings received for European Application No. 08798713.7, mailed on Aug. 6, 2018, 4 pages.
Mobilissimo.Ro, "HTC Touch—Touch FLO Demo", Online Available at: <<https://www.youtube.com/watch?v=YQ8TQ9Rr_7E>, Jun. 5, 2007, 1 page.
Non-Final Office Action received for U.S. Appl. No. 11/459,602, dated Sep. 4, 2008, 13 pages.
Non-Final Office Action received for U.S. Appl. No. 11/850,010, dated Jul. 24, 2017, 19 pages.
Non-Final Office Action received for U.S. Appl. No. 14/261,112, dated Apr. 5, 2018, 40 pages.
Non-Final Office Action received for U.S. Appl. No. 15/153,617, dated Apr. 2, 2018, 12 pages.
Non-Final Office Action received for U.S. Appl. No. 15/426,836, dated Oct. 18, 2018, 40 pages.
Non-Final Office Action received for U.S. Appl. No. 15/493,672, dated Nov. 6, 2018, 21 pages.
Notice of Acceptance received for Australian Patent Application No. 2016213886, dated Feb. 9, 2018, 3 pages.

(56) References Cited

OTHER PUBLICATIONS

Notice of Acceptance received for Australian Patent Application No. 2017201768, dated Nov. 21, 2018, 3 pages.
Notice of Allowance received for Chinese Patent Application No. 200780041309.3, dated Jul. 31, 2017, 2 Pages (Official Copy only) (see attached 37 CFR § 1.98(a) (3)).
Notice of Allowance received for Chinese Patent Application No. 201310724733.5, dated Dec. 27, 2018, 2 pages (1 page of English translation and 1 page of Official Copy).
Notice of Allowance received for Chinese Patent Application No. 201410250648.4, dated Aug. 20, 2018, 2 pages (1 page of English Translation and 1 page of Official Copy).
Notice of Allowance received for Chinese Patent Application No. 201410250688.9, dated May 21, 2018, 3 pages (1 page of English Translation and 2 pages of Official Copy).
Notice of Allowance received for Chinese Patent Application No. 201410251370.2, dated Jul. 31, 2018, 2 pages (1 page of English Translation and 1 page of Official Copy).
Notice of Allowance received for Chinese Patent Application No. 201410251400.X, dated Aug. 20, 2018, 3 pages (1 page of English Translation and 2 pages of Official Copy).
Notice of Allowance received for Japanese Patent Application No. 2014-253365, dated Nov. 26, 2018, 3 pages (1 page of English Translation and 2 pages of Official Copy).
Notice of Allowance received for Japanese Patent Application No. 2016-091460, dated Oct. 9, 2018, 3 pages (1 page of English Translation and 2 pages of Official Copy).
Notice of Allowance received for U.S. Appl. No. 11/459,602, dated Jan. 9, 2009, 6 pages.
Notice of Allowance received for U.S. Appl. No. 12/364,470, dated Nov. 24, 2017, 9 pages.
Notice of Allowance received for U.S. Appl. No. 15/153,617, dated Nov. 23, 2018, 10 pages.
Office Action received for European Patent Application No. 13174706.5, dated Oct. 16, 2017, 8 pages.
Office Action received for Australian Patent Application No. 2015215876, dated Jul. 26, 2017, 6 pages.
Office Action received for Australian Patent Application No. 2015215876, dated Jun. 28, 2017, 4 pages.
Office Action received for Australian Patent Application No. 2017201768, dated Feb. 28, 2018, 4 pages.
Office Action received for Australian Patent Application No. 2017202587, dated Jul. 4, 2018, 4 pages.
Office Action received for Australian Patent Application No. 2018200272, dated Jan. 17, 2019, 2 pages.
Office Action received for Canadian Patent Application No. 2,890,778, dated May 19, 2016, 6 pages.
Office Action received for Canadian Patent Application No. 2,983,178, dated Aug. 16, 2018, 5 pages.
Office Action received for Chinese Patent Application No. 201310724733.5, dated Apr. 9, 2018, 11 pages (2 pages of English Translation and 9 pages of Official copy).
Office Action received for Chinese Patent Application No. 201310724733.5, dated Aug. 15, 2018, 2 pages (1 page of English Translation and 1 page of Official copy).
Office Action received for Chinese Patent Application No. 201310724733.5, dated Aug. 28, 2018, 6 pages (3 pages of English Translation and 3 pages of Official copy).
Office Action received for Chinese Patent Application No. 201310724733.5, dated Oct. 30, 2017, 14 pages (3 pages of English Translation and 11 pages of Official Copy).
Office action received for Chinese Patent Application No. 201410250648.4, dated Feb. 14, 2018, 6 pages (3 pages of English Translation and 3 pages of Official Copy).
Office Action received for Chinese Patent Application No. 2014102506484, dated Jun. 29, 2017, 13 pages (5 pages of English Translation and 8 pages of Official Copy).
Office Action received for Chinese Patent Application No. 201410250688.9, dated Nov. 16, 2017, 6 pages (3 pages of English Translation and 3 pages of Official Copy).

Office Action received for Chinese Patent Application No. 201410251370.2, dated Feb. 11, 2018, 14 pages (5 pages of English Translation and 9 pages of Official Copy).
Office Action received for Chinese Patent Application No. 201410251400.X, dated Feb. 8, 2018, 6 pages (3 pages of English Translation and 3 pages of Official Copy).
Office Action received for European Patent Application No. 08829660.3, dated Jan. 11, 2019, 7 pages.
Office Action Received for European Patent Application No. 12189764.9, dated Jan. 21, 2019, 7 pages.
Office Action received for European Patent Application No. 17210062.0, dated Jan. 3, 2019, 6 pages.
Office Action received for Japanese Patent Application No. 2014-253365, dated Aug. 31 , 2018, 6 pages (3 pages of English Translation and 3 pages of Official Copy).
Office Action received for Japanese Patent Application No. 2014-253365, dated Jul. 18 , 2017, 9 pages (4 pages of English Translation and 5 pages of Official Copy).
Office Action received for Japanese Patent Application No. 2016-091460, dated Jun. 01, 2018, 3 pages (1 page of English Translation and 2 pages of Official Copy).
Office Action received for Japanese Patent Application No. 2016-091460, dated Jun. 26, 2017, 6 pages (3 pages of English Translation and 3 pages of Official Copy).
Office Action received for Japanese Patent Application No. 2016-091460, dated Nov. 27, 2017, 7 pages (4 pages of English Translation and 3 pages of Official Copy).
Office Action received for Japanese Patent Application No. 2017-204561, dated Aug. 6, 2018, 7 pages (4 pages of English Translation and 3 pages of Official copy).
Office Action received for Japanese Patent Application No. 2017-204561, dated Nov. 6, 2018, 8 pages (4 pages of English Translation and 4 pages of Official copy).
Office Action received for Japanese Patent Application No. 2017-223021, dated Jul. 30, 2018, 12 pages (6 pages of English Translation and 6 pages of Official copy).
Summons to Attend Oral Proceedings received for European Application No. 09170697.8, mailed on Oct. 19, 2017, 12 pages.
Summons to Attend Oral proceedings received for European Patent Application No. 08798713.7, mailed on Mar. 26, 2018, 11 pages.
Takahashi, Masaaki, "Inside Macintosh, Mystery of File V, Mystery of Drag & Drop", NikkeiMAC, Nikkei Business Publications Inc., vol. 17, Aug. 15, 1994, pp. 212-217 (see attached 37 CFR § 1.98(a) (3)).
Turetta, Jonathan, "Steve Jobs iPhone 2007 Presentation (HD)", Retrieved from the Internet: URL: https://www.youtube.com/watch?v=vN4U5FqrOdQ&feature=youtu.be, May 13, 2013, 2 pages.
Notice of Allowance received for U.S. Appl. No. 11/850,010, dated Feb. 6, 2019, 25 pages.
Intention to Grant received for European Patent Application No. 13174706.5, dated Apr. 30, 2019, 7 pages.
Notice of Acceptance received for Australian Patent Application No. 2018200272, dated Apr. 23, 2019, 3 pages.
Notice of Allowance received for U.S. Appl. No. 14/710,125, dated May 7, 2019, 9 pages.
Office Action received for Australian Patent Application No. 2017202587, dated Apr. 26, 2019, 4 pages.
Office Action received for Japanese Patent Application No. 2017-223021, dated Apr. 8, 2019, 7 pages (3 pages of English Translation and 4 pages of Official Copy).
Decision on Appeal received for U.S. Appl. No. 14/710,125. mailed on Mar. 12, 2019, 7 pages.
Notice of Allowance received for Japanese Patent Application No. 2017-204561, dated Mar. 12, 2019, 4 pages (1 page of English Translation and 3 pages of Official Copy).
Decision to Grant received for European Patent Application No. 13174706.5, dated Jul. 11, 2019, 2 pages.
Intention to Grant received for European Patent Application No. 12189764.9, dated Mar. 5, 2021, 14 pages.
Office Action received for Japanese Patent Application No. 2019-024663, dated Feb. 19, 2021, 8 pages (4 pages of English Translation and 4 pages of Official Copy).

(56) References Cited

OTHER PUBLICATIONS

Advisory Action received for U.S. Appl. No. 15/493,672, dated Aug. 12, 2019, 7 pages.
Applicant-Initiated Interview Summary received for U.S. Appl. No. 15/493,672, dated Jan. 31, 2020, 5 pages.
Blickenstorfer Conrad H., "Neonode N2 A new version of the phone that pioneered touchscreens", Pen Computing Magazine, Online Available at: http://www.pencomputing.com/WinCE/neonode-n2-review.html, Nov. 4, 2007, 9 pages.
Communication of the Board of Appeal received for European Patent Application No. 09170697.8, dated Jan. 25, 2021, 6 pages.
Corrected Notice of Allowance received for U.S. Appl. No. 14/142,640, dated Feb. 5, 2020, 4 pages.
Decision on Acceptance received for Australian Patent Application No. 2017202587, dated Oct. 8, 2019, 19 pages.
Decision on Appeal received for U.S. Patent Application No. 14/142,640, mailed on Oct. 7, 2019, 9 pages.
Decision on Appeal received for U.S. Appl. No. 14/261,112, mailed on Oct. 29, 2020, 20 pages.
Decision to Grant received for European Patent Application No. 17210062.0, dated Oct. 1, 2020, 2 pages.
Decision to Refuse received for European Patent Application No. 19190231.1, dated Jan. 14, 2020, 2 pages.
Examiner's Answer to Appeal Brief received for U.S. Appl. No. 14/261,112, dated Oct. 29, 2019, 10 pages.
Extended European Search Report received for European Patent Application No. 20203888.1, dated Feb. 10, 2021, 8 pages.
Final Office Action received for U.S. Appl. No. 15/493,672, dated May 31, 2019, 25 pages.
Intention to Grant received for European Patent Application No. 17210062.0, dated Jun. 23, 2020, 8 pages.
Minutes of Oral Proceedings received for European Patent Application No. 17210062.0, mailed on Jun. 17, 2020, 5 pages.
Minutes of the Oral Proceedings received for European Patent Application No. 12189764.9, mailed on Oct. 13, 2020, 6 pages.
Non-Final Office Action received for U.S. Appl. No. 15/493,672, dated Dec. 12, 2019, 32 pages.
Notice of Acceptance received for Australian Patent Application No. 2017202587, dated Nov. 6, 2019, 3 pages.
Notice of Acceptance received for Australian Patent Application No. 2019200692, dated Apr. 7, 2020, 3 pages.
Notice of Acceptance received for Australian Patent Application No. 2019204835, dated Dec. 7, 2020, 3 pages.
Notice of Acceptance received for Australian Patent Application No. 2019210673, dated Oct. 17, 2020, 3 pages.
Notice of Allowance received for Canadian Patent Application No. 2,983,178, dated Oct. 20, 2020, 1 page.
Notice of Allowance received for Japanese Patent Application No. 2017-223021, dated Dec. 18, 2020, 3 pages (1 page of English Translation and 2 pages of Official Copy).
Notice of Allowance received for Japanese Patent Application No. 2018-201088, dated Sep. 18, 2020, 4 pages (1 page of English Translation and 3 pages of Official Copy).
Notice of Allowance received for U.S. Appl. No. 14/142,640, dated Dec. 11, 2019, 7 pages.
Notice of Allowance received for U.S. Appl. No. 14/261,112, dated Nov. 18, 2020, 6 pages.
Notice of Allowance received for U.S. Appl. No. 15/426,836, dated Dec. 16, 2019, 16 pages.
Notice of Allowance received for U.S. Appl. No. 15/493,672, dated Apr. 14, 2020, 16 pages.
Office Action received for Australian Patent Application No. 2017202587, dated Jul. 4, 2019, 4 pages.
Office Action received for Australian Patent Application No. 2019200692, dated Dec. 24, 2019, 2 pages.
Office Action received for Australian Patent Application No. 2019204835, dated Sep. 16, 2020, 6 pages.
Office Action received for Australian Patent Application No. 2019210673, dated Jul. 28, 2020, 4 pages.
Office Action received for Australian Patent Application No. 2019210673, dated Sep. 28, 2020, 2 pages.
Office Action received for Canadian Patent Application No. 2,983,178, dated Jul. 22, 2019, 6 pages.
Office Action received for European Patent Application No. 08829660.3, dated Jan. 3, 2020, 6 pages.
Office Action received for Japanese Patent Application No. 2017-223021, dated Sep. 11, 2020, 20 pages (10 pages of English Translation and 10 pages of Official Copy).
Office Action received for Japanese Patent Application No. 2017-223021, dated Sep. 24, 2019, 6 pages (3 pages of English Translation and 3 pages of Official Copy).
Office Action received for Japanese Patent Application No. 2018-201088, dated Oct. 11, 2019, 9 pages (5 pages of English Translation and 4 pages of Official Copy).
Office Action received for Japanese Patent Application No. 2019-024663, dated Apr. 27, 2020, 8 pages (4 pages of English Translation and 4 pages of Official Copy).
Office Action received for Japanese Patent Application No. 2019-024663, dated Oct. 5, 2020, 7 pages (4 pages of English Translation and 3 pages of Official Copy).
Office Action received for Korean Patent Application No. 10-2011-7026583, dated Oct. 25, 2013, 4 pages (1 page of English Translation and 3 pages of Official Copy).
Record of Oral Hearing received for U.S. Appl. No. 14/142,640, mailed on Nov. 20, 2019, 15 pages.
Record of Oral Hearing received for U.S. Appl. No. 14/261,112, mailed on Sep. 28, 2020, 20 pages.
Result of Consultation received for European Patent Application No. 08829660.3, dated Nov. 18, 2020, 5 pages.
Result of Consultation received for European Patent Application No. 17210062.0, dated Apr. 20, 2020, 2 pages.
Summons to Attend Oral Proceedings received for European Patent Application No. 12189764.9, mailed on Mar. 12, 2020, 11 pages.
Summons to Attend Oral Proceedings received for European Patent Application No. 12189764.9, mailed on May 20, 2020, 11 pages.
Summons to Attend Oral Proceedings received for European Patent Application No. 17210062.0, mailed on Oct. 30, 2019, 7 pages.
Summons to Oral Proceedings received for European Patent Application No. 09170697.8, mailed on Dec. 17, 2020, 4 pages.
Third Party Proceedings received for European Patent Application No. 17210062.0, mailed on Apr. 23, 2020, 6 pages.
Decision of Board of Appeal received for European Patent Application No. 09170697.8, mailed on Apr. 23, 2021, 17 pages.
Notice of Allowance received for U.S. Appl. No. 14/261,112, dated Apr. 9, 2021, 2 pages.

* cited by examiner

APPLICATION MENU USER INTERFACE

BACKGROUND

The subject matter of this specification relates generally to graphical user interfaces.

Many of today's computers and devices include a graphical user interface ("GUI"), through which a user can interact with the computer or device. A GUI can include various user interface elements, such as windows, scroll bars, and so on. For example, a GUI of a device can include a menu for launching applications on the device. The menu can include a number of user interface elements, each corresponding to an application or functionality on the device. Usability of the menu interface is particularly important, as the menu is a gateway to much of the functionality on the device.

SUMMARY

In general, one aspect of the subject matter described in this specification can be embodied in methods that include presenting a first page of one or more user interface elements on a touch-sensitive display, where each of the user interface elements corresponding to a respective application; detecting a gesture performed on the touch-sensitive display; and in response to the detected gesture, presenting a second page of one or more user interface elements on the touch-sensitive display. Other embodiments of this aspect include corresponding systems, apparatus, computer program products, and computer readable media.

In general, another aspect of the subject matter described in this specification can be embodied in methods that include presenting a first user interface element corresponding to a first application on a device, where the first application has an unrestricted status; simultaneous with presenting the first user interface element, presenting a second user interface element corresponding to a second application on the device, where the second application has a restricted status, and presenting an indication of the restricted status; changing the restricted status of the second application to an unrestricted status; and in response to changing the restricted status, presenting the second user interface element without the indication of the restricted status. Other embodiments of this aspect include corresponding systems, apparatus, computer program products, and computer readable media.

In general, another aspect of the subject matter described in this specification can be embodied in methods, implemented on a device with a touch-sensitive display, that include displaying at least a subset of a plurality of user interface elements in a user interface in an ergonomic layout, where each user interface element corresponds to a respective application on the device. Other embodiments of this aspect include corresponding systems, apparatus, computer program products, and computer readable media.

In general, another aspect of the subject matter described in this specification can be embodied in methods that include presenting a user interface element corresponding to a application on a display device; presenting a graphical representation of a reflection of the user interface element; receiving an input selecting the graphical representation; and presenting information associated with the application in response to the input. Other embodiments of this aspect include corresponding systems, apparatus, computer program products, and computer readable media.

Particular embodiments of the subject matter described in this specification can be implemented to realize one or more of the following advantages. A device can include a more user-friendly and/or ergonomic application menu. Trial applications can be presented in an application menu of the device with an indication of their trial status. A user of the device can try a trial application and remove the trial status of the trial application from the device.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Example Mobile Device

Figure 1A:
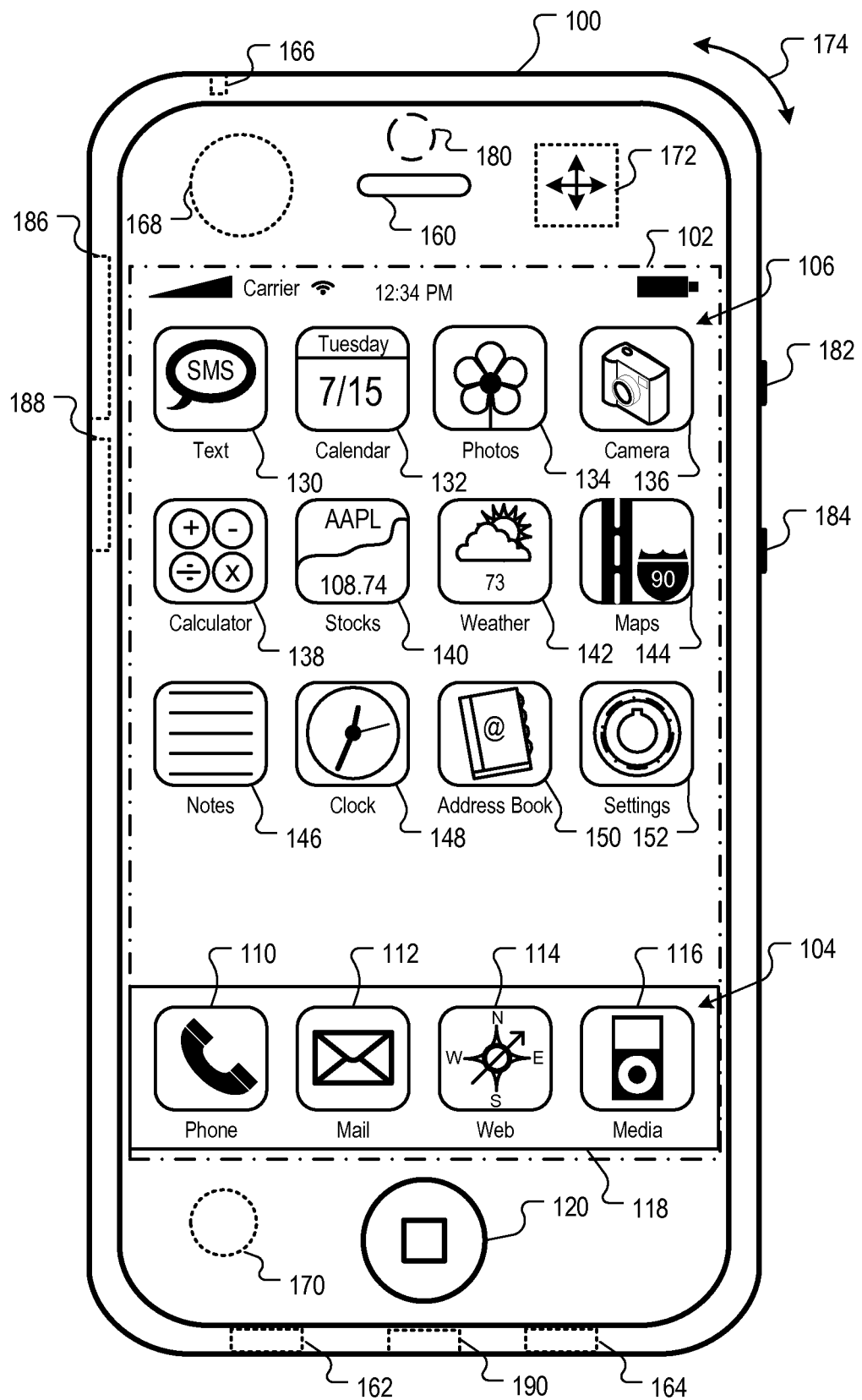
FIG. 1A is a block diagram of an example mobile device with telephony capability.

FIG. 1A is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, the mobile device 100 includes a touch-sensitive display 102. The touch-sensitive display 102 can implement liquid crystal display (LCD) technology, light emitting polymer display (LPD) technology, or some other display technology. The touch-sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and 6,888,536, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. In the example shown, the display objects 104, 106 are graphic representations of system objects. Some examples of system objects include device functions, applications, windows, files, alerts, events, or other identifiable system objects.

Example Mobile Device Functionality

In some implementations, the mobile device 100 can implement multiple device functionalities, such as a telephony device, as indicated by a phone object 110; an e-mail device, as indicated by the e-mail object 112; a network data communication device, as indicated by the Web object 114; a Wi-Fi base station device (not shown); and a media processing device, as indicated by the media player object 116. In some implementations, particular display objects 104, e.g., the phone object 110, the e-mail object 112, the Web object 114, and the media player object 116, can be displayed in a menu bar 118. In some implementations, device functionalities can be accessed from a top-level graphical user interface, such as the graphical user interface illustrated in FIG. 1A. Touching one of the objects 110, 112, 114, or 116 can, for example, invoke corresponding functionality.

In some implementations, the mobile device 100 can implement network distribution functionality. For example, the functionality can enable the user to take the mobile device 100 and provide access to its associated network while traveling. In particular, the mobile device 100 can extend Internet access (e.g., Wi-Fi) to other wireless devices in the vicinity. For example, mobile device 100 can be configured as a base station for one or more devices. As such, mobile device 100 can grant or deny network access to other wireless devices.

In some implementations, upon invocation of device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various e-mail functions; touching the Web object 114 may cause the graphical user interface to present display objects related to various Web-surfing functions; and touching the media player object 116 may cause the graphical user interface to present display objects related to various media processing functions.

In some implementations, the top-level graphical user interface environment or state of FIG. 1A can be restored by pressing a button 120 located near the bottom of the mobile device 100. In some implementations, each corresponding device functionality may have corresponding "home" display objects displayed on the touch-sensitive display 102, and the graphical user interface environment of FIG. 1A can be restored by pressing the "home" display object.

In some implementations, the top-level graphical user interface can include additional display objects 106, such as a short messaging service (SMS) object 130, a calendar object 132, a photos object 134, a camera object 136, a calculator object 138, a stocks object 140, a weather object 142, a maps object 144, a notes object 146, a clock object 148, an address book object 150, and a settings object 152. Touching the SMS display object 130 can, for example, invoke an SMS messaging environment and supporting functionality; likewise, each selection of a display object 132, 134, 136, 138, 140, 142, 144, 146, 148, 150, and 152 can invoke a corresponding object environment and functionality.

Additional and/or different display objects can also be displayed in the graphical user interface of FIG. 1A. For example, if the device 100 is functioning as a base station for other devices, one or more "connection" objects may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, an up/down button 184 for volume control of the speaker 160 and the microphone 162 can be included. The mobile device 100 can also include an on/off button 182 for a ring indicator of incoming phone calls. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, network access devices, a personal computer, a printer, a display screen, or other processing devices capable of receiving and/or transmitting data. In some implementations, the port device 190 allows the mobile device 100 to synchronize with a host device using one or more protocols, such as, for example, the TCP/IP, HTTP, UDP and any other known protocol. In some implementations, a TCP/IP over USB protocol can be used, as described in U.S. Provisional Patent Application No. 60/945,904, filed Jun. 22, 2007, for "Multiplexed Data Stream Protocol," which provisional patent application is incorporated by reference herein in its entirety.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as an 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

Example Mobile Device

Figure 1B:
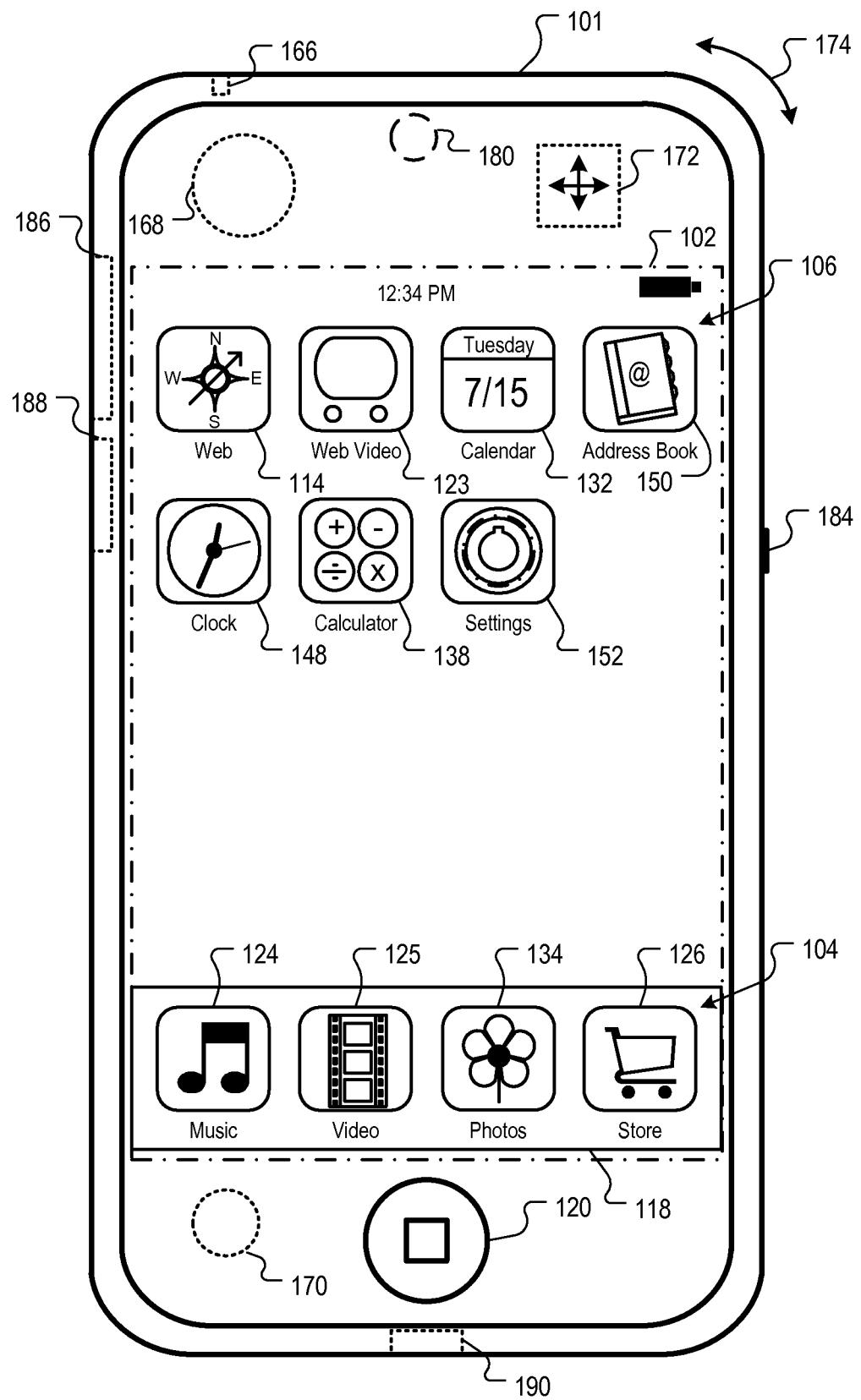
FIG. 1B is a block diagram of an example mobile device without telephony capability.

FIG. 1B is a block diagram of an example mobile device 101. The mobile device 101 can be, for example, a handheld computer, a laptop computer, a personal digital assistant, a network appliance, a camera, a network base station, a media player, a navigation device, an email device, a game console, or a combination of any two or more of these data processing devices or other data processing devices. In some implementations, device 101 shown in FIG. 1B is an example of how device 100 can be configured to display a different set of objects. In some implementations, device 101 has a different set of device functionalities than device 100 shown in FIG. 1A, but otherwise operates in a similar manner to device 100.

Mobile Device Overview

In some implementations, the mobile device 101 includes a touch-sensitive display 102, which can be sensitive to haptic and/or tactile contact with a user. In some implementations, the mobile device 101 can display one or more graphical user interfaces on the touch-sensitive display 102 for providing the user access to various system objects and for conveying information to the user.

Mobile Device Functionality

In some implementations, the mobile device 101 can implement multiple device functionalities, such as a music processing device, as indicated by the music player object 124, a video processing device, as indicated by the video player object 125, a digital photo album device, as indicated by the photos object 134, and a network data communication device for online shopping, as indicated by the store object 126. In some implementations, particular display objects 104, e.g., the music player object 124, the video player object 125, the photos object 134, and store object 126, can be displayed in a menu bar 118. In some implementations, device functionalities can be accessed from a top-level graphical user interface, such as the graphical user interface illustrated in FIG. 1B. Touching one of the objects 124, 125, 134, or 126 can, for example, invoke corresponding functionality.

In some implementations, the top-level graphical user interface of mobile device 101 can include additional display objects 106, such as the Web object 114, the calendar object 132, the address book object 150, the clock object 148, the calculator object 138, and the settings object 152 described above with reference to mobile device 100 of FIG. 1A. In some implementations, the top-level graphical user interface can include other display objects, such as a Web video object 123 that provides functionality for uploading and playing videos on the Web. Each selection of a display object 114, 123, 132, 150, 148, 138, and 152 can invoke a corresponding object environment and functionality.

Additional and/or different display objects can also be displayed in the graphical user interface of FIG. 1B. In some implementations, the display objects 106 can be configured by a user. In some implementations, upon invocation of device functionality, the graphical user interface of the mobile device 101 changes, or is augmented or replaced with another user interface or user interface elements, to facilitate user access to particular functions associated with the corresponding device functionality.

In some implementations, the mobile device 101 can include audio jack 166, a volume control device 184, sensor devices 168, 170, 172, and 180, wireless communication subsystems 186 and 188, and a port device 190 or some other wired port connection described above with reference to mobile device 100 of FIG. 1A.

Network Operating Environment

Figure 2:
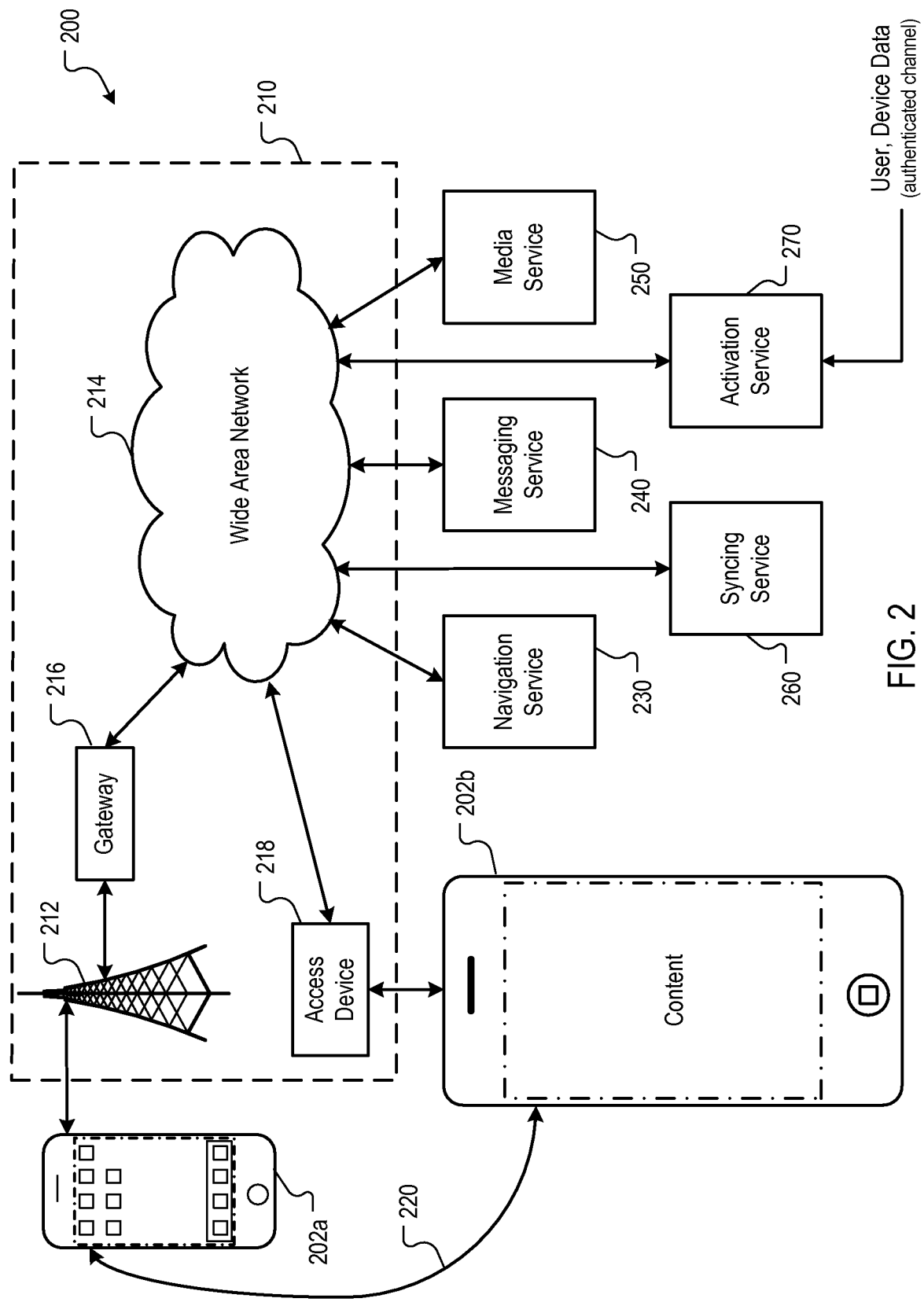
FIG. 2 is a block diagram of an example network operating environment for the mobile devices of FIGS. 1A-1B.

FIG. 2 is a block diagram of an example network operating environment 200. In FIG. 2, mobile devices 202a and 202b each can represent mobile device 100 or 101. Mobile devices 202a and 202b can, for example, communicate over one or more wired and/or wireless networks 210 in data communication. For example, a wireless network 212, e.g., a cellular network, can communicate with a wide area network (WAN) 214, such as the Internet, by use of a gateway 216. Likewise, an access device 218, such as an 802.11g wireless access device, can provide communication access to the wide area network 214. In some implementations, both voice and data communications can be established over the wireless network 212 and the access device 218. For example, the mobile device 202a can place and receive phone calls (e.g., using VoIP protocols), send and receive e-mail messages (e.g., using POP3 protocol), and retrieve electronic documents and/or streams, such as web pages, photographs, and videos, over the wireless network 212, gateway 216, and wide area network 214 (e.g., using TCP/IP or UDP protocols). Likewise, in some implementations, the mobile device 202b can place and receive phone calls, send and receive e-mail messages, and retrieve electronic documents over the access device 218 and the wide area network 214. In some implementations, the mobile device 202a or 202b can be physically connected to the access device 218 using one or more cables and the access device 218 can be a personal computer. In this configuration, the mobile device 202a or 202b can be referred to as a "tethered" device.

The mobile devices 202a and 202b can also establish communications by other means. For example, the wireless device 202a can communicate with other wireless devices, e.g., other mobile devices 202a or 202b, cell phones, etc., over the wireless network 212. Likewise, the mobile devices 202a and 202b can establish peer-to-peer communications 220, e.g., a personal area network, by use of one or more communication subsystems, such as the Bluetooth™ communication devices 188 shown in FIGS. 1A-1B. Other communication protocols and topologies can also be implemented.

The mobile device 202a or 202b can, for example, communicate with one or more services 230, 240, 250, 260, and 270 over the one or more wired and/or wireless networks 210. For example, a navigation service 230 can provide navigation information, e.g., map information, location information, route information, and other information, to the mobile device 202a or 202b. A user of the mobile device 202b can invoke a map functionality, e.g., by pressing the maps object 144 on the top-level graphical user interface shown in FIG. 1A, and can request and receive a map for a particular location.

A messaging service 240 can, for example, provide e-mail and/or other messaging services. A media service 250 can, for example, provide access to media files, such as song files, audio books, movie files, video clips, and other media data. In some implementations, separate audio and video services (not shown) can provide access to the respective types of media files. A syncing service 260 can, for example, perform syncing services (e.g., sync files). An activation service 270 can, for example, perform an activation process for activating the mobile device 202a or 202b. Other services can also be provided, including a software update service that automatically determines whether software updates exist for software on the mobile device 202a or 202b, then downloads the software updates to the mobile device 202a or 202b where the software updates can be manually or automatically unpacked and/or installed.

The mobile device 202a or 202b can also access other data and content over the one or more wired and/or wireless networks 210. For example, content publishers, such as news sites, RSS feeds, web sites, blogs, social networking sites, developer networks, etc., can be accessed by the mobile device 202a or 202b. Such access can be provided by invocation of a web browsing function or application (e.g., a browser) in response to a user touching the Web object 114.

Example Mobile Device Architecture

Figure 3:
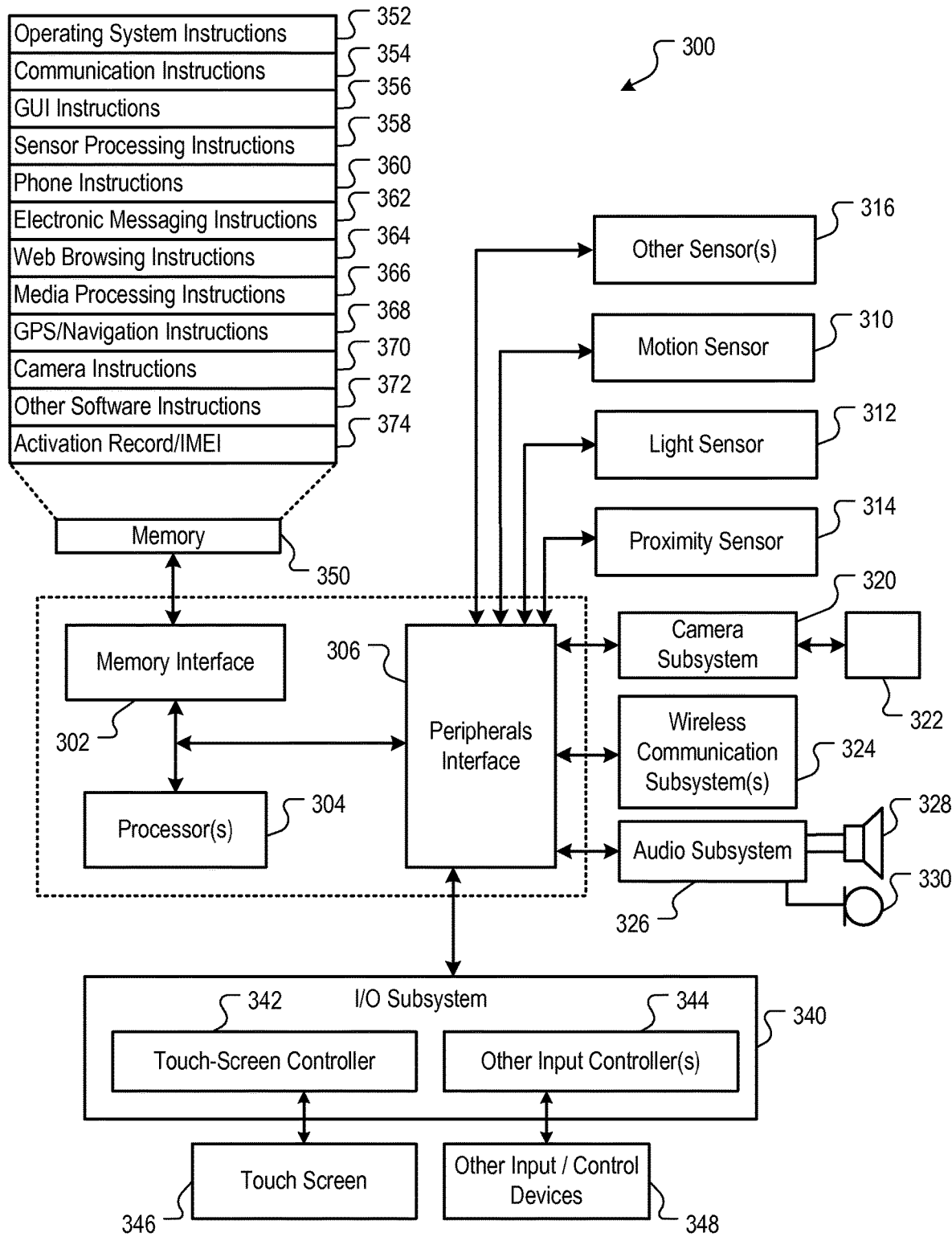
FIG. 3 is a block diagram of an example implementation of the mobile devices of FIGS. 1A-1B.

FIG. 3 is a block diagram 300 of an example implementation of the mobile devices 100 and 101 of FIGS. 1A-1B, respectively. The mobile device 100 or 101 can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device 100 or 101 can be coupled by one or more communication buses or signal lines.

Sensors, devices, and subsystems can be coupled to the peripherals interface 306 to facilitate multiple functionalities. For example, a motion sensor 310, a light sensor 312, and a proximity sensor 314 can be coupled to the peripherals interface 306 to facilitate the orientation, lighting, and proximity functions described with respect to FIG. 1A. Other sensors 316 can also be connected to the peripherals interface 306, such as a positioning system (e.g., GPS receiver), a temperature sensor, a biometric sensor, or other sensing device, to facilitate related functionalities.

A camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device 100 or 101 is intended to operate. For example, a mobile device 100 or 101 may include communication subsystems 324 designed to operate over a GSM network, a GPRS network, an EDGE network, a Wi-Fi or WiMax network, and a Bluetooth™ network. In particular, the wireless communication subsystems 324 may include hosting protocols such that the device 100 or 101 may be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration may disengage a lock of the touch screen 346; and a pressing of the button for a second duration that is longer than the first duration may turn power to the mobile device 100 or 101 on or off. The user may be able to customize a functionality of one or more of the buttons. The touch screen 346 can, for example, also be used to implement virtual or soft buttons and/or a keyboard.

In some implementations, the mobile device 100 or 101 can present recorded audio and/or video files, such as MP3, AAC, and MPEG files. In some implementations, the mobile device 100 or 101 can include the functionality of an MP3 player, such as an iPod™. The mobile device 100 or 101 may, therefore, include a 36-pin connector that is compatible with the iPod. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 may include instructions for handling basic system services and for performing hardware dependent tasks. In some implementations, the operating system 352 can be a kernel (e.g., UNIX kernel), as described in reference to FIGS. 4A and 4B.

The memory 350 may also store communication instructions 354 to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other processes and functions, e.g., security processes and functions as described in reference to FIGS. 4A and 4B. The memory 350 may also store other software instructions (not shown), such as web video instructions to facilitate web video-related processes and functions; and/or web shopping instructions to facilitate web shopping-related processes and functions. In some implementations, the media processing instructions 366 are divided into audio processing instructions and video processing instructions to facilitate audio processing-related processes and functions and video processing-related processes and functions, respectively. An activation record and International Mobile Equipment Identity (IMEI) 374 or similar hardware identifier can also be stored in memory 350.

Each of the above identified instructions and applications can correspond to a set of instructions for performing one or more functions described above. These instructions need not be implemented as separate software programs, procedures, or modules. The memory 350 can include additional instructions or fewer instructions. Furthermore, various functions of the mobile device 100 or 101 may be implemented in hardware and/or in software, including in one or more signal processing and/or application specific integrated circuits.

Software Stack and Security Process

Figure 4A:
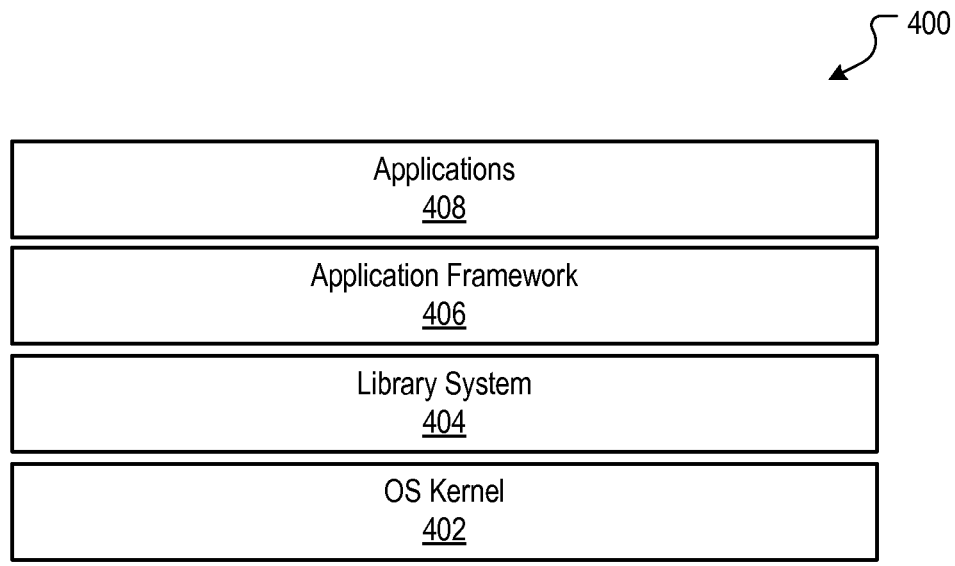
FIG. 4A illustrates an example implementation of a software stack for the mobile devices of FIGS. 1A-1B

FIG. 4A illustrates an example implementation of a software stack 400 for the mobile devices of FIGS. 1A-1B. In some implementations, the software stack 400 includes an operating system (OS) kernel 402 (e.g., a UNIX kernel), a library system 404, an application framework 406 and an applications layer 408.

The OS kernel 402 manages the resources of the mobile device 100 or 101 and allows other programs to run and use these resources. Some examples of resources include a processor, memory, and I/O. For example, the kernel 402 can determine which running processes should be allocated to a processor, processors or processor cores, allocates memory to the processes and allocates requests from applications and remote services to perform I/O operations. In some implementations, the kernel 402 provides methods for synchronization and inter-process communications with other devices.

In some implementations, the kernel 402 can be stored in non-volatile memory of the mobile device 100 or 101. When the mobile device 100 or 101 is turned on, a boot loader starts executing the kernel 102 in supervisor mode. The kernel then initializes itself and starts one or more processes for the mobile device 100 or 101, including a security process 410 for remote access management, as described in reference to FIG. 4B.

The library system 404 provides various services applications running in the application layer 408. Such services can include audio services, video services, database services, image processing services, graphics services, etc.

The application framework 406 provides an object-oriented application environment including classes and Application Programming Interfaces (APIs) that can be used by developers to build applications using well-known programming languages (e.g., Objective-C, Java).

The applications layer 408 is where various applications exist in the software stack 400. Developers can use the APIs and environment provided by the application framework 406 to build applications, such as the applications represented by the display objects 104, 106, shown in FIGS. 1A-1B (e.g., email, media player, Web browser, phone, music player, video player, photos, and store).

Secure Communication Channel

Figure 4B:
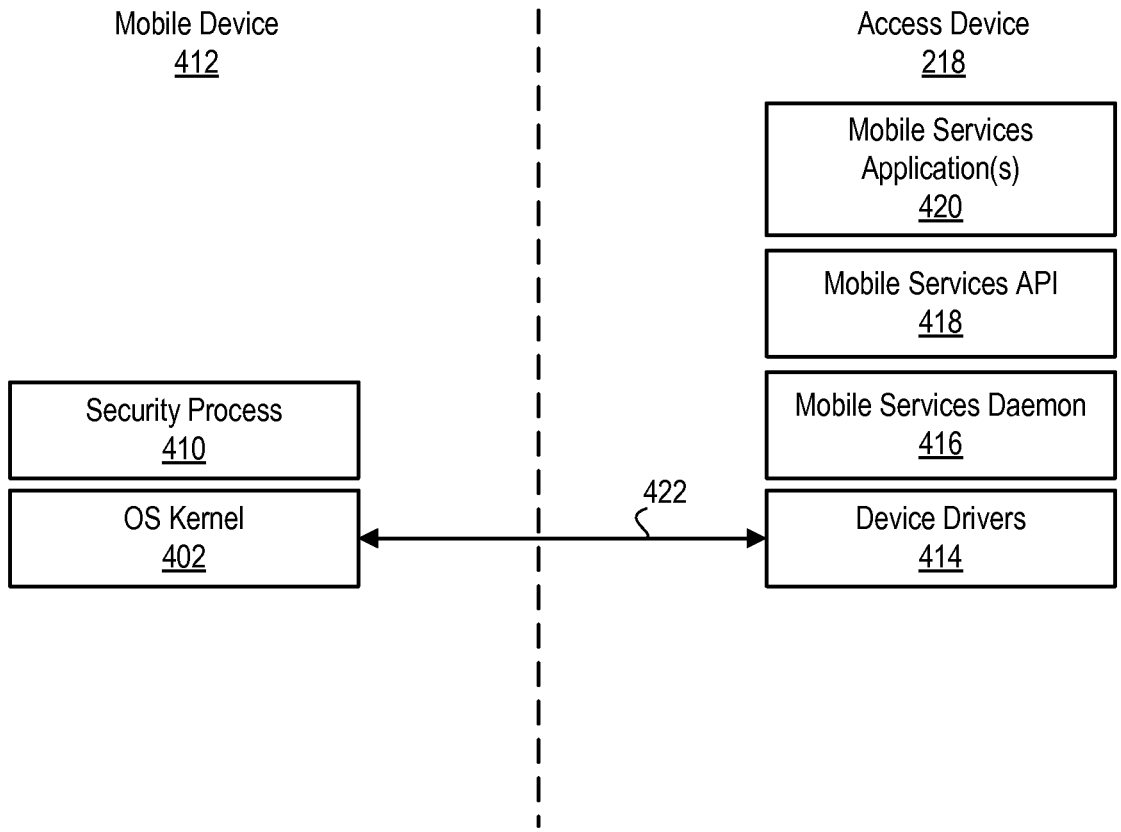
FIG. 4B illustrates an example implementation of a security process for remote access management over a secure communications channel.

FIG. 4B illustrates an example implementation of a security process 410 for remote access management over a secure communications channel 422. In the example shown, the mobile device 412, e.g., mobile device 100 or 101, is running the security process 410, which communicates with the OS kernel 402. Any remote access requests made to the kernel 402 are intercepted by the security process 410, which is responsible for setting up secure communication sessions between the mobile device 412 and a mobile services access device 218. In some implementations, the process 410 uses a cryptographic protocol, such as Secure Sockets Layer (SSL) or Transport Layer Security (TLS) to provide secure communications between the mobile device 412 and the access device 218. The access device 218 can be any device with network connectivity, including but not limited to: a personal computer, a hub, an Ethernet card, another mobile device, a wireless base station, etc. The secure communications channel can be a Universal Serial Bus (USB), Ethernet, a wireless link (e.g., Wi-Fi, WiMax, 3G), an optical link, infrared link, FireWire™, or any other known communications channel or media.

In the example shown, the access device 218 includes device drivers 414, a mobile services daemon 416, a mobile services API 418 and one or more mobile service applications 420. The device drivers 414 are responsible for implementing the transport layer protocol, such as TCP/IP over USB. The mobile services daemon 416 listens (e.g., continuously) to the communications channel 422 for activity and manages the transmission of commands and data over the communication channel 422. The mobile services API 418 provides a set of functions, procedures, variables and data structures for supporting requests for services made by the mobile services application 420. The mobile services application 420 can be a client program running on the access device 218, which provides one or more user interfaces for allowing a user to interact with a remote service (e.g., activation service 270) over a network (e.g., the Internet, wireless network, peer-to-peer network, optical network, Ethernet, intranet). In some implementations, a device activation process can be used, as described in co-pending U.S. patent application Ser. No. 11/767,447, filed Jun. 22, 2007, for "Device Activation and Access," which patent application is incorporated by reference herein in its entirety. The application 420 can allow a user to set preferences, download or update files of content or software, search databases, store user data, select services, browse content, perform financial transactions, or engage in any other online service or function. An example of a mobile services application 420 is the iTunes™ client, which is publicly available from Apple Inc. (Cupertino, Calif.). An example of a mobile device 412 that uses the iTunes™ client is the iPod™ product developed by Apple Inc. Another example of a mobile device 412 that uses the iTunes™ client is the iPhone™ product developed by Apple Inc.

In an example operational mode, a user connects the mobile device 412 to the access device 218 using, for example, a USB cable. In some other implementations, the mobile device 412 and access device 218 include wireless transceivers for establishing a wireless link (e.g., Wi-Fi). The drivers 414 and kernel 408 detect the connection and alert the security process 410 and mobile services daemon 416 of the connections status. Once the connection is established certain non-sensitive information can be passed from the mobile device 412 to the access device 218 (e.g., name, disk size, activation state) to assist in establishing a secure communication session.

In some implementations, the security process 410 establishes a secure communication session (e.g., encrypted SSL session) with the access device 218 by implementing a secure network protocol. For example, if using SSL protocol, the mobile device 412 and access device 218 will negotiate a cipher suite to be used during data transfer, establish and share a session key, and authenticate the access device 218 to the mobile device 412. In some implementations, if the mobile device 412 is password protected, the security process 410 will not establish a session, and optionally alert the user of the reason for failure.

Once a secure session is successfully established, the mobile device 412 and the access device 218 can exchange sensitive information (e.g., passwords, personal information), and remote access to the mobile device 412 can be granted to one or more services (e.g., navigation service 230, messaging service 240, media service 250, syncing service 260, activation service 270). In some implementations, the mobile services daemon 416 multiplexes commands and data for transmission over the communication channel 422. This multiplexing allows several remote services to have access to the mobile device 412 in a single session without the need to start a new session (or handshaking) for each service requesting access to the mobile device 412.

Example Mobile Device Processes

Figure 5:
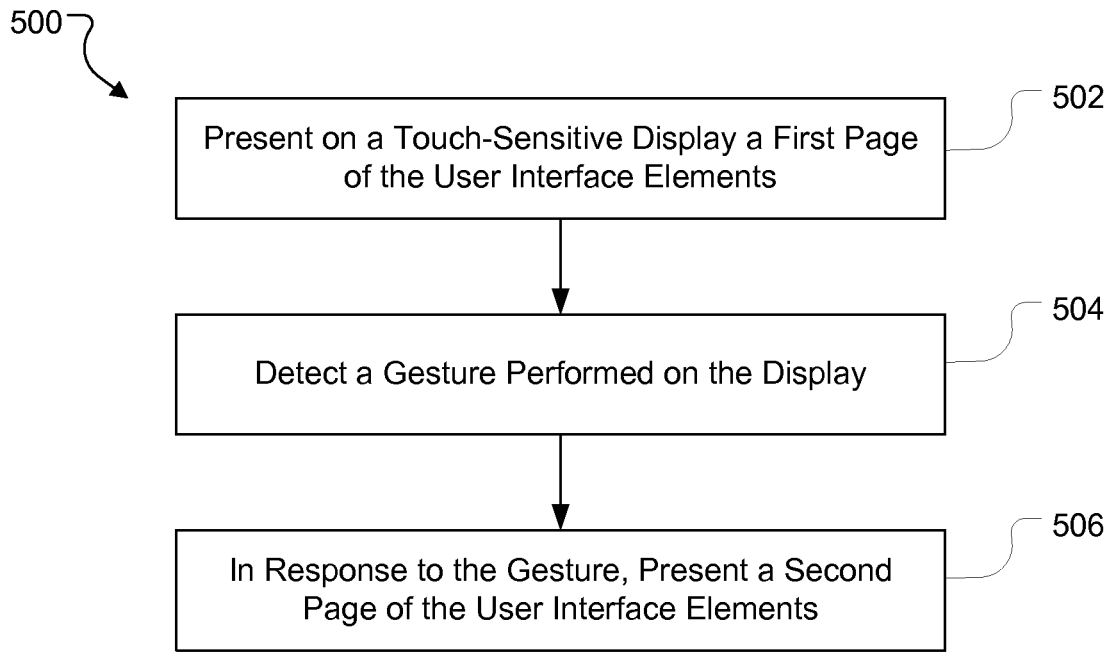
FIG. 5 illustrates an example process for presenting information on a touch-sensitive display of a mobile device.

FIG. 5 illustrates an example process 500 for presenting information on a touch-sensitive display of a mobile device. In some implementations, the process 500 can be used with the mobile device 100 or 101, as described in reference to FIGS. 1A-1B. Generally, the process 500 includes presenting information in response to a user touch input.

The process 500 begins with presenting a first page of user interface elements on the touch-sensitive display of a mobile device (502). In some implementations, a page of user interface elements is a view on the display that is capable of presenting one or more user interface elements on the display, where the user interface elements can be related or unrelated. In some implementations, the first page of user interface elements is displayed on the mobile device upon powering up the mobile device. In some other implementations, a user interaction can trigger presentation of the page of user interface elements. For example, selection of the home button 120 (as shown in FIG. 1A) can present the user with an initial display screen including the first page of user interface elements. The user interface elements, for example, can include the display objects 106 (as shown in FIG. 1A). In some implementations, the first page of user interface elements is a first portion of an application menu.

A gesture performed on the touch-sensitive display is detected (504). In some implementations, the gesture includes a touch, tap, or dragging motion across the touch-sensitive display (e.g., using a finger, stylus, etc.). The gesture, in some implementations, is performed within a region where no user interface elements are displayed. For example, the user can perform a horizontal or vertical swipe across a blank region of the touch-sensitive display of the mobile device. In another example, the user can touch or tap a blank section of the display (e.g., to the top, bottom, left, or right of the blank region). In some implementations, a navigational guide may be displayed to the user. The user can, for example, touch or swipe a region of the navigational guide.

Figure 7A:
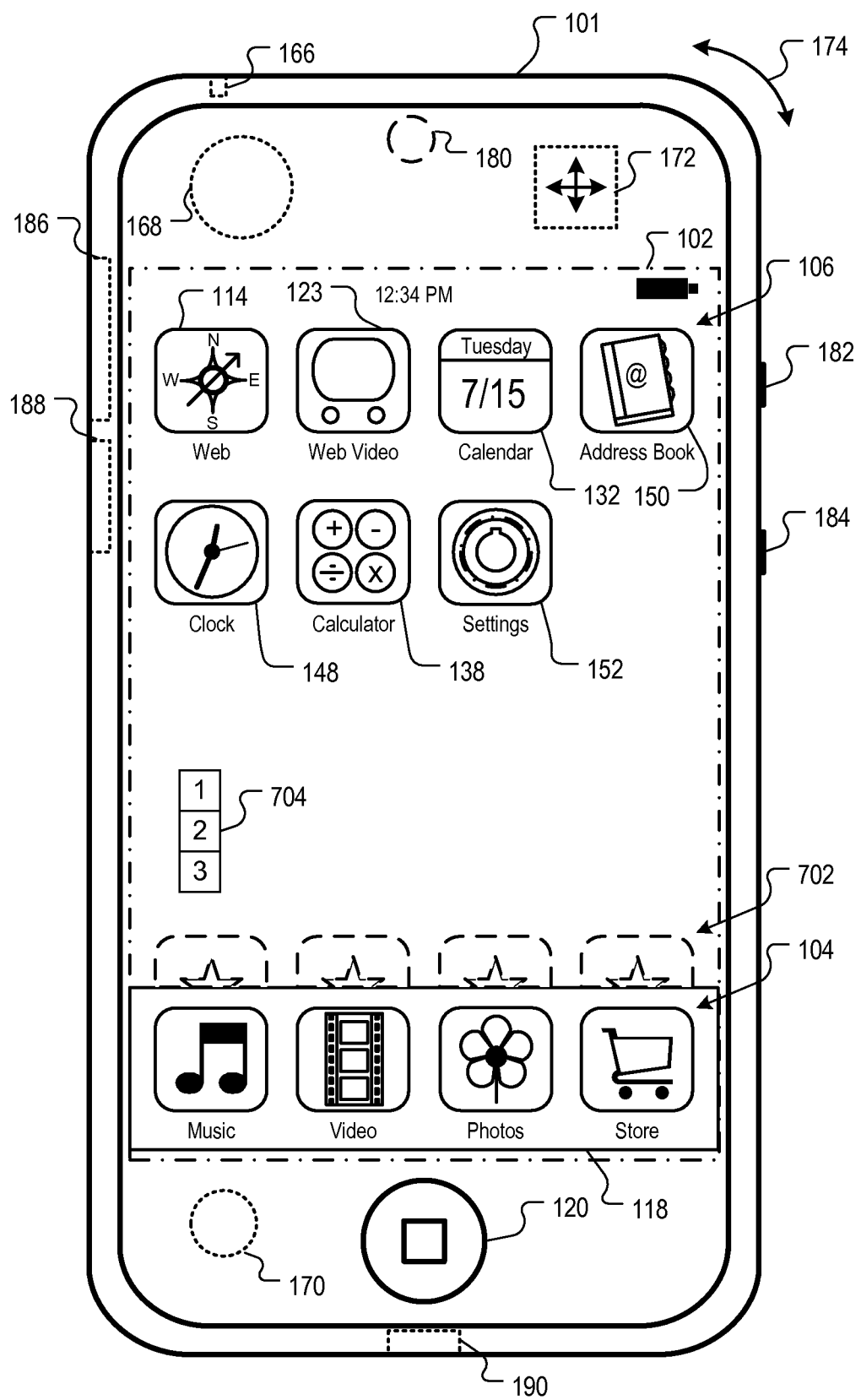
FIG. 7A is a block diagram of an example mobile device with a vertically scrolling application menu on a touch-sensitive display.

In response to the gesture, a second page of user interface elements is presented (506). In some implementations, the second page of user interface elements is a second portion of the application menu. In some implementations, the user is provided with an indication that a second page of user interface elements is available for display. For example, when the first page of user interface elements is displayed, a portion of one or more of the second pages of user interface elements can be visible (e.g., a section of a display object at the edge of the display). In this example, the user interface elements in the second page can appear to be falling off of the edge of the display or can appear smaller, dimmer, less clear, or otherwise secondary to the user interface elements in the first page. In another example, a navigational guide 704 within the display can indicate to the user that there is additional information to be presented (e.g., second or additional pages of user interface elements). In some implementations, the navigational guide 704 can be shaped as a grid, a row, column, an arced or fan-out pattern, etc. For example, the navigational guide illustrated in FIG. 7A shows that there are three vertically scrollable pages of user interface elements. The second page of user interface elements, in some implementations, may include one or more of the elements included within the first page of user interface elements. For example, during user navigation of pages of user interface elements, one or more of the previously displayed elements may remain within the display when the user navigates to the second page of elements.

Any number of pages of user interface elements can be available for navigation. In some implementations, the user can be presented with a looping display of pages of user interface elements. For example, upon detection of a first horizontal left-to-right swipe, the first page of user interface elements is replaced with the second page of user interface elements within the touch-sensitive display. Upon detection of a second horizontal left-to-right swipe by the user, the first page of user interface elements can be displayed to the user again. In some other implementations, the user may be presented with no change in information upon the second left-to-right swipe, but a right-to-left swipe can return the user to the first page of user interface elements. In some implementations, once a gesture has been received by the touch-sensitive display, the pages of user interface elements continue to scroll until a stop indication has been received by the user or until reaching the end of the pages of user interface elements. For example, the user can touch the display using a stop gesture (e.g., tap or press), select a user interface element, press a button on the mobile device, etc. The scrolling can be animated and can be accelerated in response to quicker, repeated gestures or de-accelerated in response to slower, repeated gestures, to give a Rolodex effect.

Figure 6:
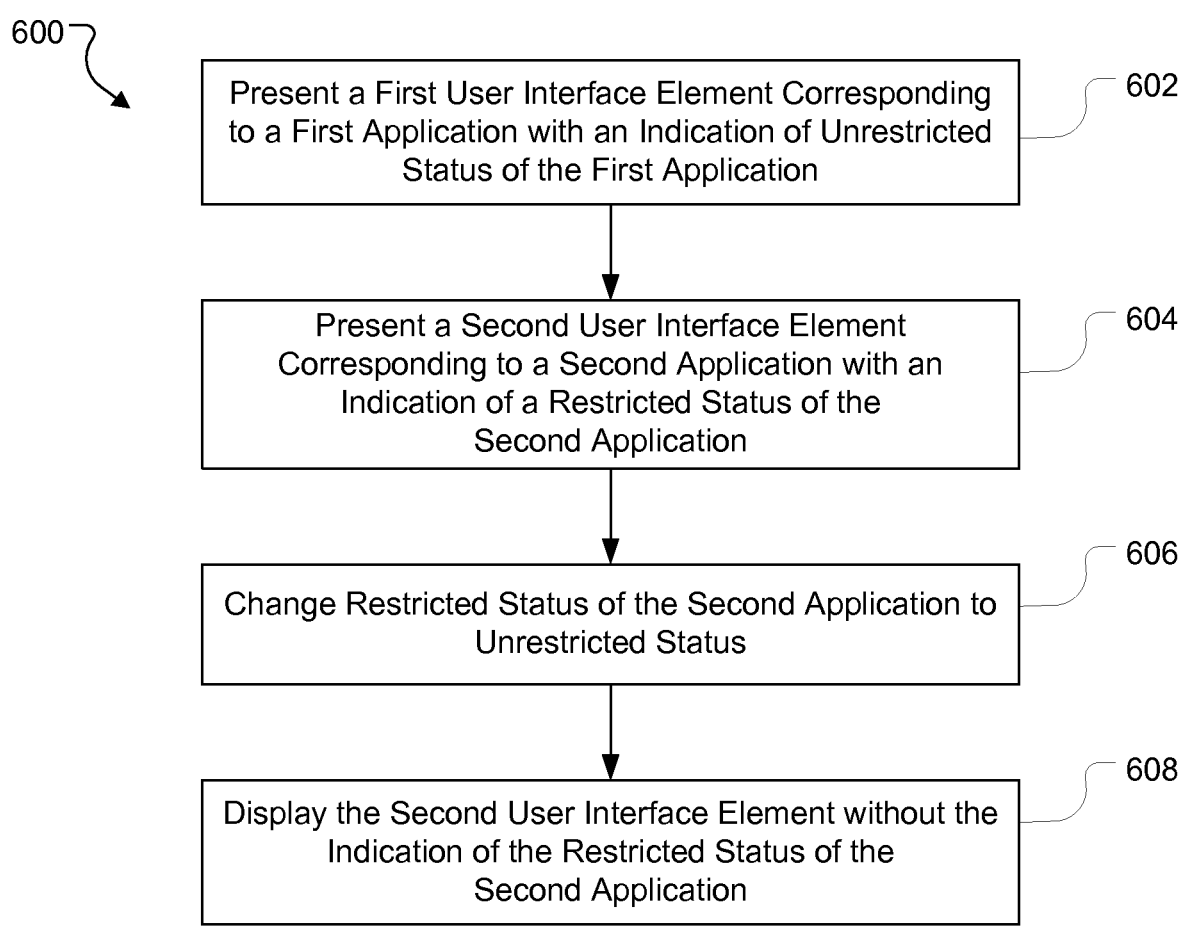
FIG. 6 illustrates an example process for indicating a restricted status of a user interface element on a mobile device.

FIG. 6 illustrates an example process 600 for indicating a restricted status of a user interface element on a mobile device. In some implementations, the process 600 can be used with the mobile device 100 or 101, as described in reference to FIGS. 1A, 1B. Generally, the process 600 includes presenting information regarding the status of an application available on a mobile device.

The process 600 begins with presenting on the display of a mobile device a first user interface element corresponding to a first application in a manner indicating an unrestricted status of the first application (602). The user interface element, for example, can be one of the display objects 106 (as shown in FIG. 1A). In some implementations, denotation of an unrestricted status of an application can be performed by displaying the user interface element using a brightness level, contrast, highlight, or other visual indicator of an unrestricted status. For example, an unrestricted application can be represented by a bright user interface element (e.g., icon image) with high contrast against the background screen. The contrast can be accentuated, in some examples, by a highlighted outline or frame.

A second user interface element is presented corresponding to a second application, indicating a restricted status of the second application (604). The user interface element, for example, can be one of the display objects 106 (as shown in FIG. 1A). In some implementations, denotation of a restricted status can be performed by displaying the user interface element using a brightness level, contrast, highlight, or other visual indicator of a restricted status. For example, a restricted application can be represented by a dimmed, lower resolution, or partially transparent user interface element (e.g., icon image) with low contrast against the background screen. In some implementations, one or more user interface elements can be framed in a manner (e.g., a dark box, dashed outline, or separate tray area) indicative of the restricted status of the application(s). A symbol can overlay the user interface element, in some implementations, to denote the restricted status of the application. For example, a transparent word or image can be presented on top of the user interface element.

The status of the second application is changed from restricted to unrestricted (606). In some implementations, the user selects the interface element associated with the second application and is presented with the option of changing the status of the application. For example, the user can be prompted (e.g., within a new display or within a dialog box overlaying the present display) with the opportunity to purchase the second application. If the user chooses to purchase the application, the status of the application can change from restricted to unrestricted. In another example, the user can be prompted to supply a password or identification number to gain access to the application. In some other implementations, the restricted status can be changed from outside the mobile device. For example, a user can contact the service provider of the mobile device (e.g., call on the telephone, contact through a website on a computer, etc.) and place an order for the application. In this example, the mobile device can then receive a signal (e.g., via the communications devices 186 or 188, through a link from a computer using the port device 190, etc.) providing the mobile device with the new status of the application. In some implementations, changing the status of the application can include downloading additional software, files or other data to allow the application to run. In some other implementations, the application can require a key to unlock encrypted code within the mobile device.

Once the status of the second application has been changed from restricted to unrestricted, the second user interface element is displayed without the indication of a restricted status (608). For example, the second user interface element can be displayed in the manner described above for indicating the unrestricted status of the application.

In some other implementations, the second application can be available on a trial basis. For example, the user can be presented with an option to access a trial version of the application, in some implementations containing a limited version of the capabilities of the application. A means of indicating a trial status of the second application, in some implementations, can be applied to the user interface element. For example, a dashed outline or transparent word or symbol overlay of the user interface element can indicate that the second application is unrestricted for a limited amount of time.

Example Mobile Device with Vertically Scrolling Menu

Figure 7B:
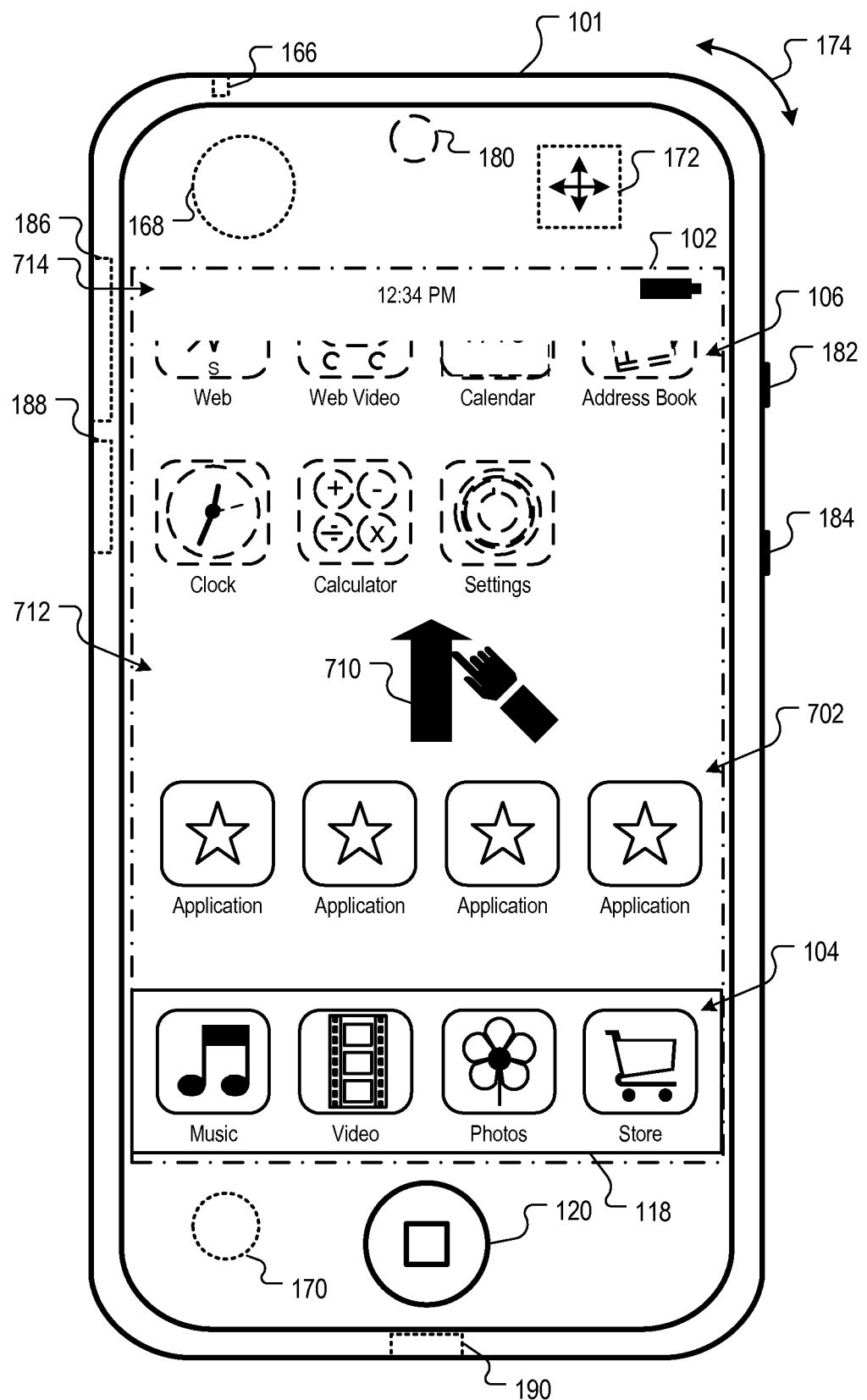
FIG. 7B is a block diagram of an example mobile device with a vertically scrolling application menu on a touch-sensitive display.
Figure 7C:
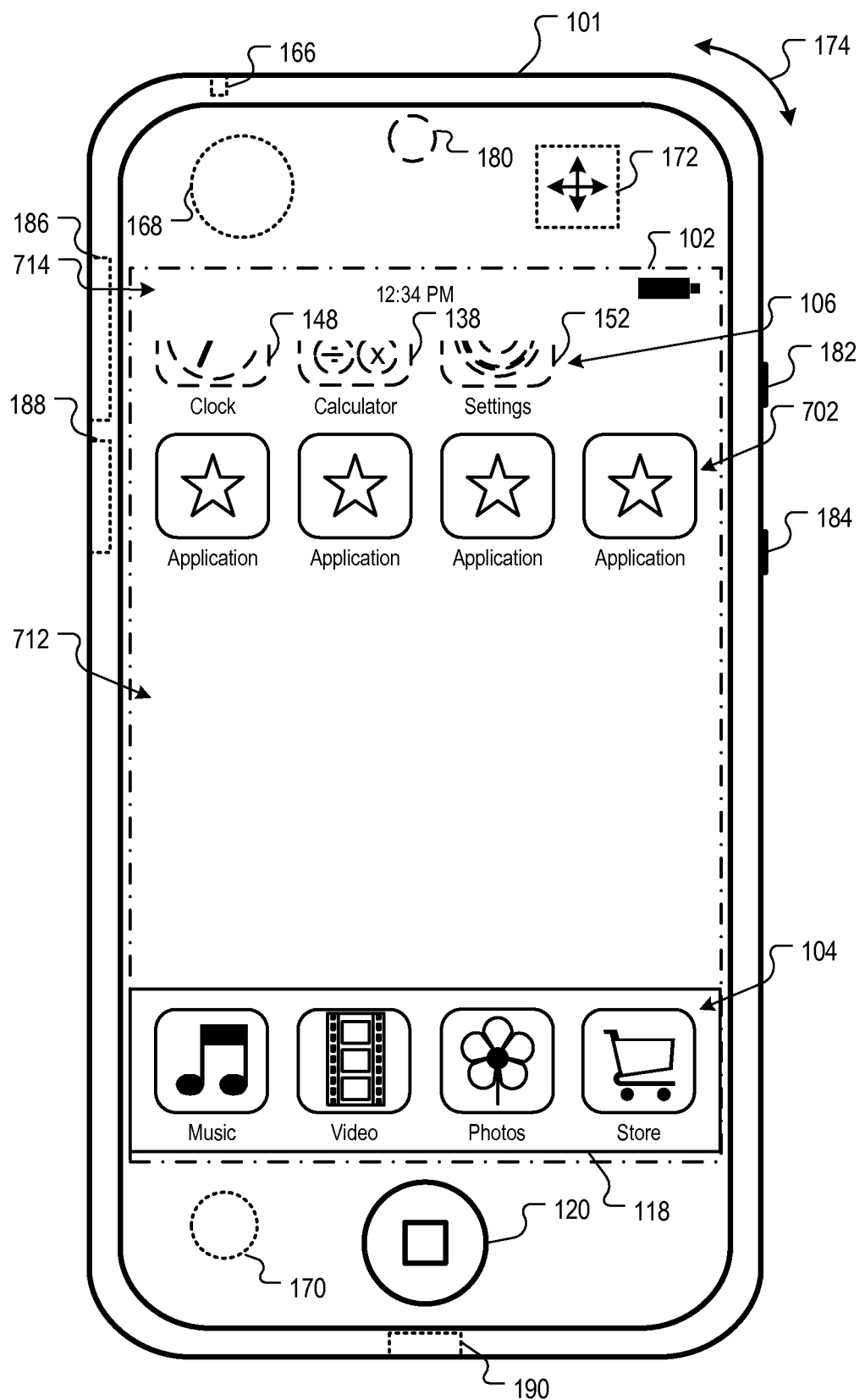
FIG. 7C is a block diagram of an example mobile device with a vertically scrolling application menu on a touch-sensitive display.

FIGS. 7A-7C contains block diagrams of the example mobile device 101 with a vertically scrolling application menu. Referring to FIG. 7A, a second page of display objects 702 is partially covered by the menu bar 118 within the touch-sensitive display 102. In comparison to the first page of display objects 106, in some implementations, the second page of display objects 702 could be dimmer, transparent, or outlined in a manner indicating that the display objects in the second page are not yet active (e.g., not selectable within the touch-sensitive display 102).

As shown in FIG. 7B, the touch-sensitive display 102 contains a modified view of the display objects 106, 702. The mobile device 101 detects a gesture 710 in an upward (vertical) direction in relation to the display 102. In some implementations, the gesture 710 is detected within a navigational region 712 of the touch-sensitive display 102. For example, the navigational region 712 may be left clear of elements such as display objects 106, 702 to provide a section of the display in which a user can input navigational gestures. For example, navigational gestures can include swiping or dragging, with a finger or stylus, in the direction in which the user wishes the display to move. In some other implementations, navigational gestures can include tapping, pressing, swiping, or dragging within a navigational guide 704 presented in the navigational region 712.

In response to the gesture 710, the first page of display objects 106 shifts upwards and are partially obscured by an information panel 714 at the top of the display 102. The information panel can include the current time and a battery indicator icon. The display objects in the first page of display objects appear less vivid. In some implementations, the first page of display objects 106 are rendered in a different method to indicate that those user interface elements are no longer actively selectable within the touch-sensitive display 102. The second page of display objects 702 is now fully visible within the display 102, and the display objects 702 are rendered in a sharp, vivid presentation. In some implementations, the presentation of the second page of display objects 702 is indicative of the display objects being actively selectable within the touch-sensitive display 102.

As shown in FIG. 7C, the first page of display objects 106 is partially visible beneath the information panel 714. The visible portions of the clock object 148, the calculator object 138, and the settings object 152 appear dimmer, transparent, less vivid, or outlined to indicate that these objects are not active. The second page of display objects 702 are located directly beneath the first page of display objects 106. In some implementations, the second page of display objects 702 moves from below the navigational region 712 to above the navigational region 712. In some implementations, the additional movement of the display objects 106, 702 occurs due to an additional gesture 710 by the user. In some other implementations, the display 102 continues to scroll due to the initial gesture 710 until the user inputs a stop gesture (e.g., tap, etc.) or makes another input such as selecting one of the display objects 104, 106, 702, pressing the button 120, etc.

Example Mobile Device with Horizontally Scrolling Menu

Figure 8A:
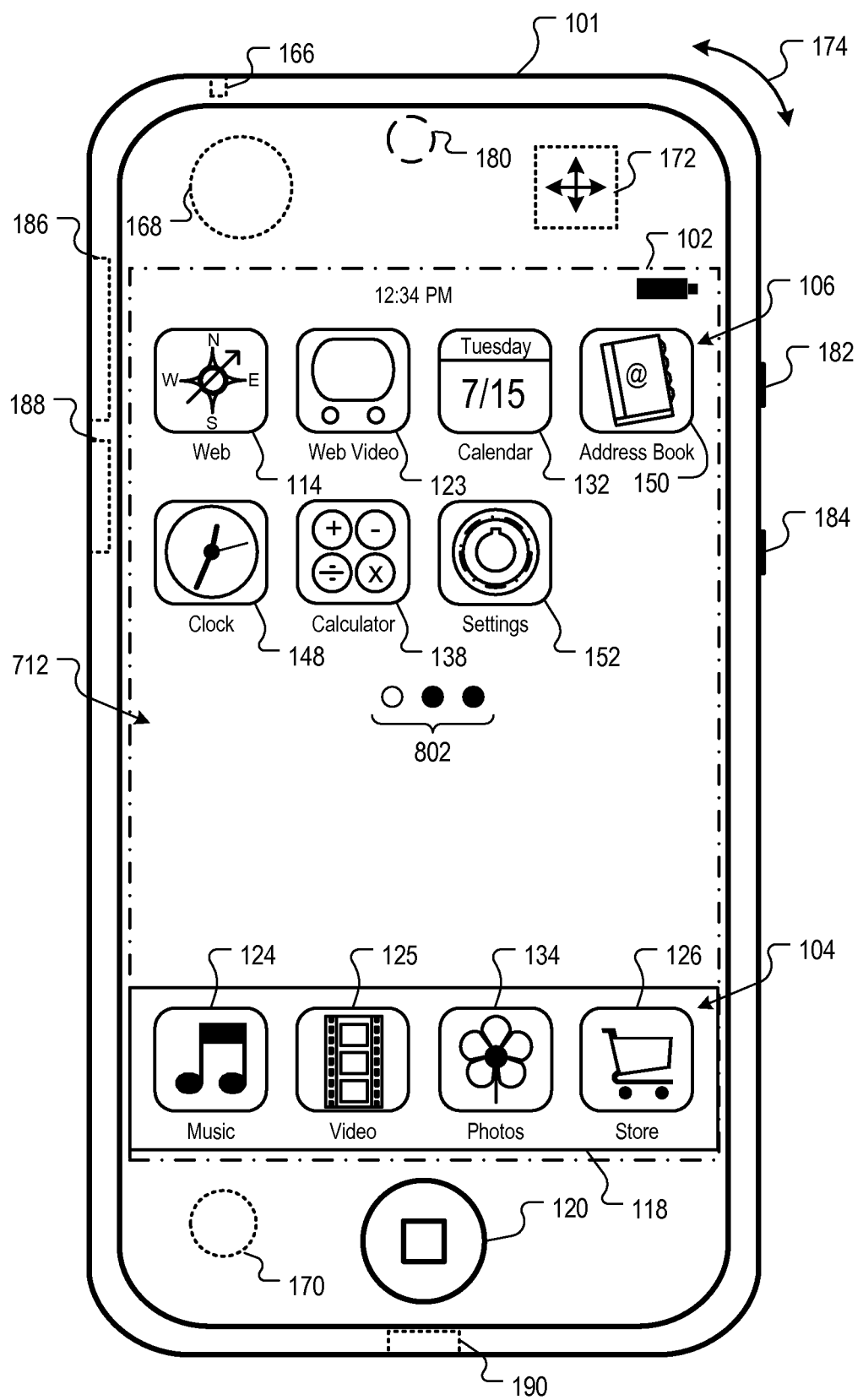
FIG. 8A is a block diagram of an example mobile device with a horizontally scrolling application menu on a touch-sensitive display.
Figure 8B:
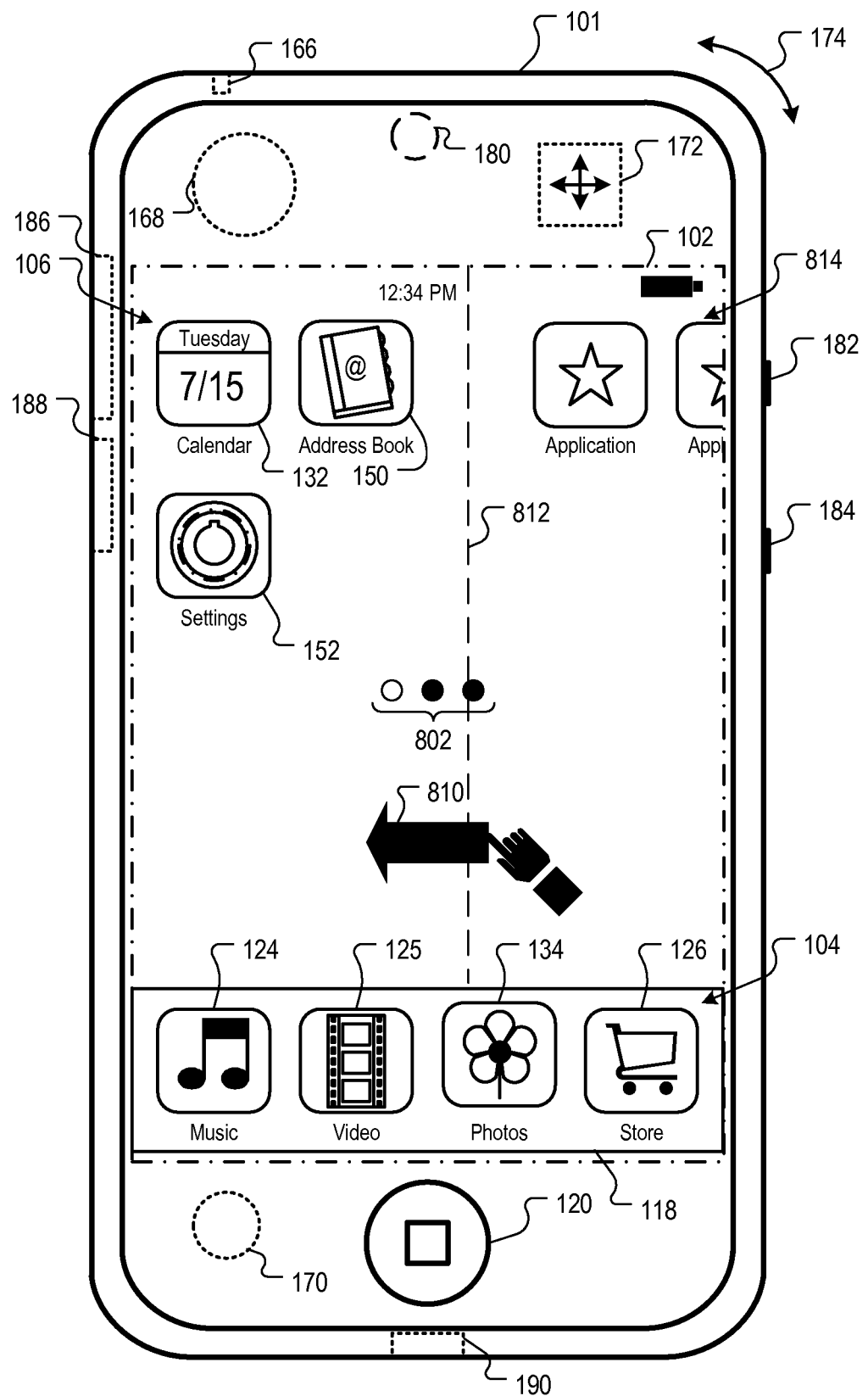
FIG. 8B is a block diagram of an example mobile device with a horizontally scrolling application menu on a touch-sensitive display.
Figure 8C:
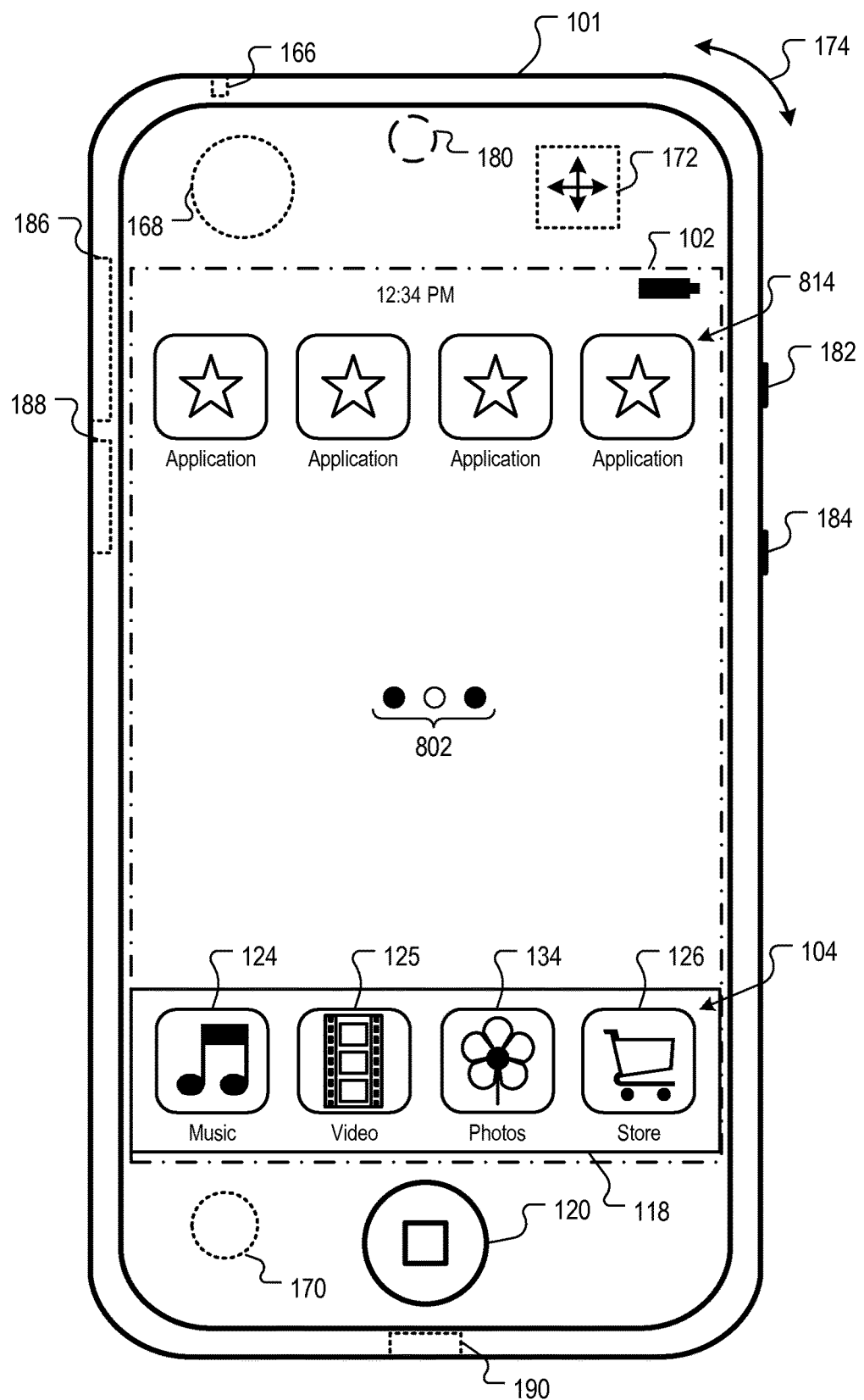
FIG. 8C is a block diagram of an example mobile device with a horizontally scrolling application menu on a touch-sensitive display.

FIGS. 8A-8C contains block diagrams of the example mobile device 101 with a horizontally scrolling application menu. Referring to FIG. 8A, the touch-sensitive display 102 contains a set of three page indicator dots 802 within the navigational region 712. The leftmost dot is open or filled with a bright color (e.g., white), while the middle and rightmost dots are filled with a dark color (e.g., black). In some implementations, the leftmost open dot is indicative of a first page within the display 102. For example, the open dot can refer to the page in which the display objects 106 appear. In some implementations, dragging or swiping in a horizontal manner within the navigational region 712 causes the display to change to the second and/or third pages as indicated by the page indicator dots 802. There can be any number of page indicator dots 802 displayed within the navigational region 712. In some implementations, rather than page indicator dots 802, the navigational region can contain a navigational guide. The navigational guide, for example, can provide the opportunity for both horizontal and vertical navigation within the display 102.

As shown in FIG. 8B, upon detecting a gesture 810, the display 102 within the mobile device 101 is modified to reflect horizontal movement towards the second page of display objects as referenced by the indicator dots 802. FIG. 8B illustrates an instant in the horizontal movement from the first page to the second page, with reference line 812 marking the boundary between the first page and the second page. The visible portion of the first page includes a portion of the display objects 106 (e.g., the calendar object 132, the address book object 150, and the settings object 152), and the visible portion of the second page includes a portion of set of display objects 814. One of the display objects 814 is only partially visible within the display 102. In some implementations, partially displayed objects (e.g., display objects in which a percentage of the object is not contained within the region of the visible display) are rendered in a manner which reflects an inactive status. For example, a partially displayed object can be rendered in a transparent, dim, or low resolution image to indicate to the user that the object is not currently selectable.

The page indicator dots indicate that the first page (leftmost open dot) continues to be active. In some implementations, when the gesture 810 is detected, the display scrolls horizontally from one page to another. In some other implementations, the display continues to scroll until a stop indication is detected. For example, the display could continue to scroll until selection of a display object 104, 106, 814, selection of the button 120, or other user input is detected. In some implementations, the second page of display objects 814 replaces the first page of display objects 106 without displaying an intermediate position. In some implementations, no visible reference line 812 is displayed between pages. For example, the scrolling pages can be rendered in the manner of a seamless rolling display.

Referring to FIG. 8C, the second page of display objects 814 is visible within the touch-sensitive display 102 of the mobile device 101. The middle circle of the page indicator dots 802 is open, reflecting the active page. In some implementations, a swiping or dragging gesture towards the left of the display 102 returns the user to the display illustrated within FIG. 8A. Similarly, a swiping or dragging gesture towards the right of the display 102, in some implementations, provides the user with access to additional pages of display objects.

Example Mobile Device with Ergonomic Display

Figure 9A:
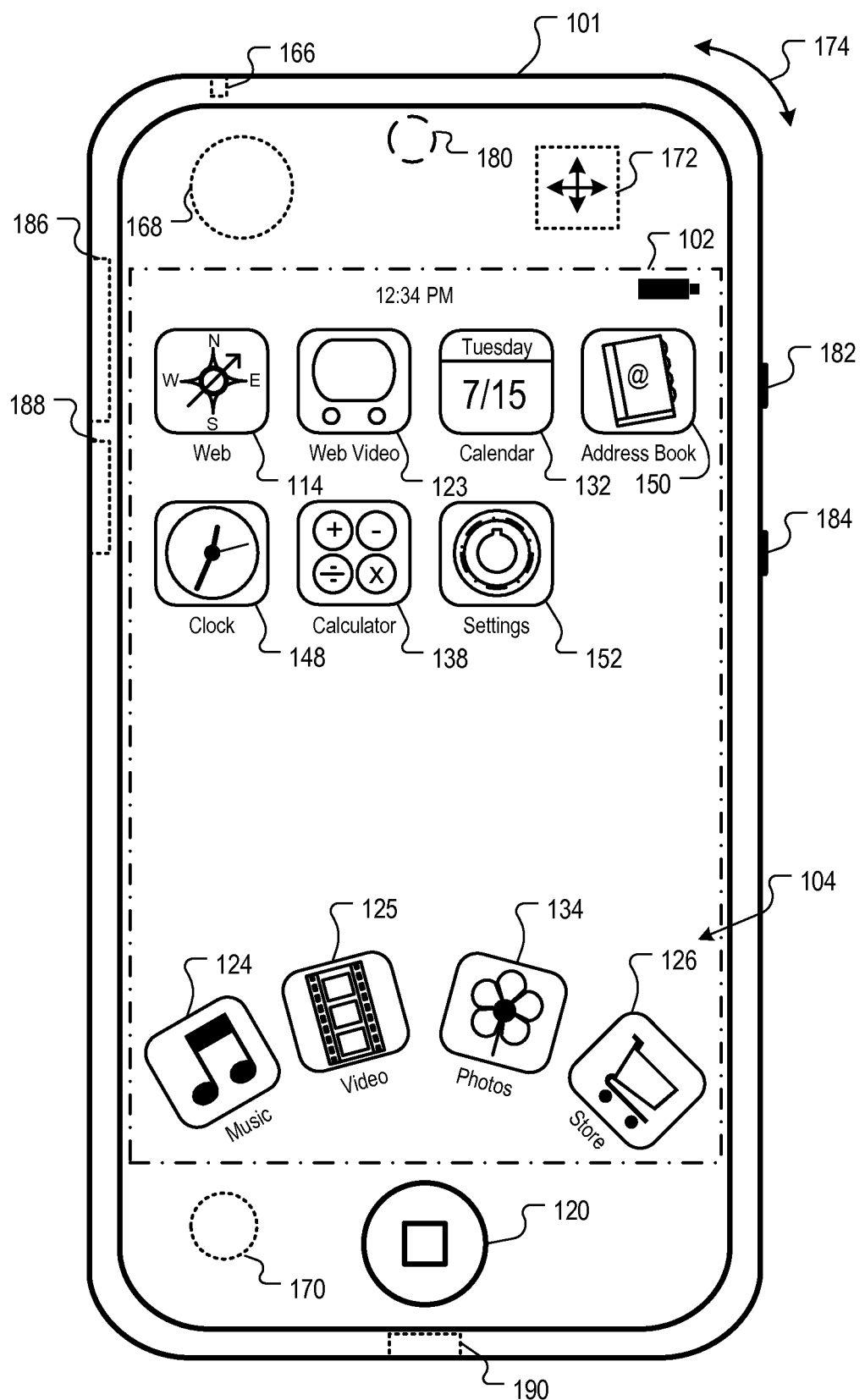
FIG. 9A is a block diagram of an example mobile device with an ergonomic application menu layout.

FIG. 9A is a block diagram of the example mobile device 101 with an ergonomic touch-sensitive menu bar layout. The display objects 104 are arranged in an arc. For example, the arrangement of the display objects 104 follows the sweep of the thumb of a user. In some implementations, the user initiates the positioning and radius of the arc through a touch range setup. For example, selecting the settings object 152 could present the user with the option of initializing the touch-sensitive display 102 in an ergonomic manner. In some other implementations, the ergonomic presentation of the display objects 104 can use a default arc arrangement. The arc presentation of the display objects 104 versus the menu bar presentation 118 (as shown in FIG. 1B), in some implementations, may be a choice available to the user within user-selectable settings (e.g., selecting the settings object 152).

Figure 9B:
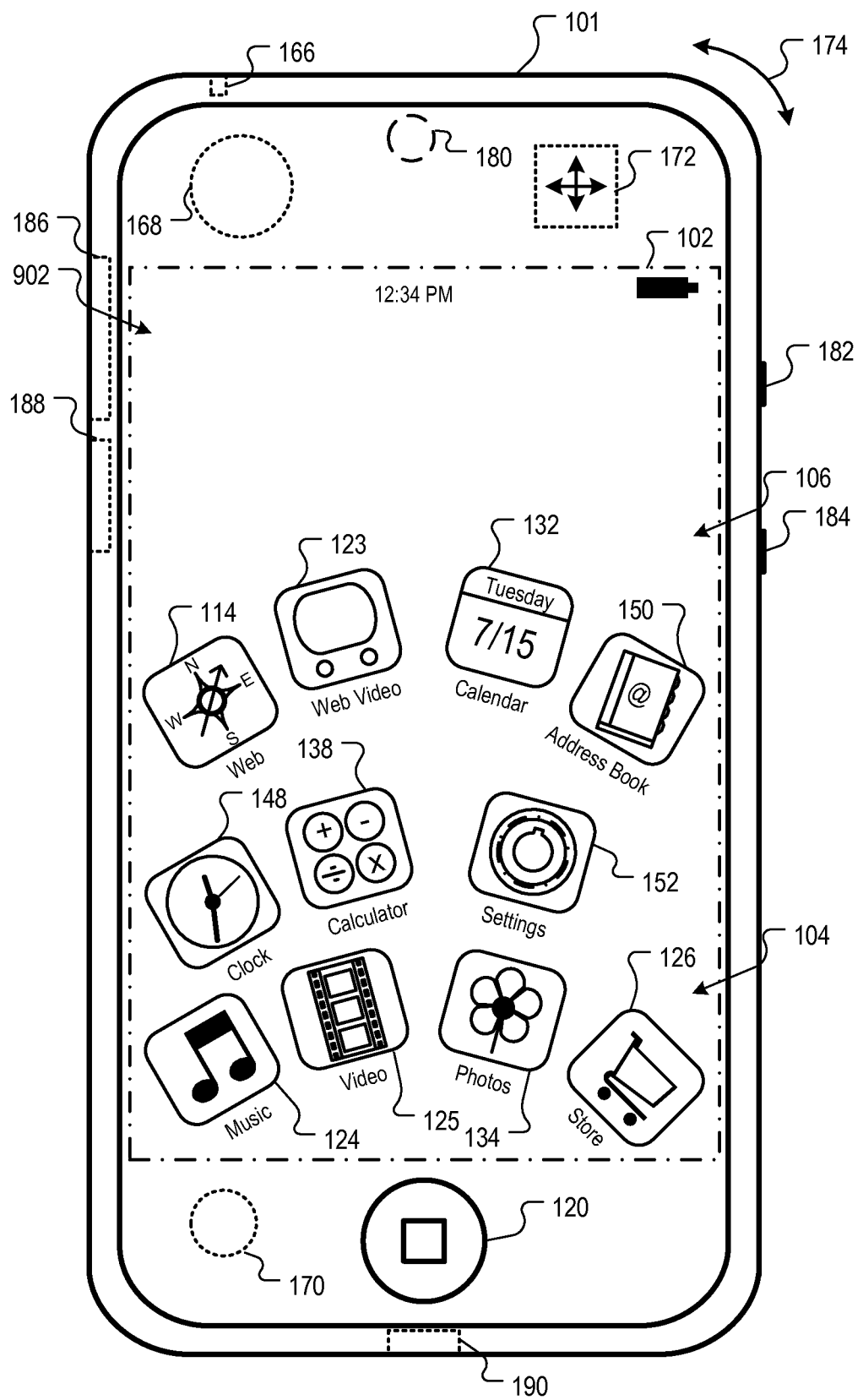
FIG. 9B is a block diagram of an example mobile device with an ergonomic application menu layout.

FIG. 9B is a block diagram of the example mobile device 101 with an ergonomic touch-sensitive display object layout. The display objects 106 in addition to the display objects 104 are arranged in three stacked arcs. The music object 124, the video object 125, the photos object 134, and the store object 126 are arranged in the bottom-most arc. The clock object 148, the calculator object 138, and the settings object 152 are arranged in a middle arc, and the web object 114, the web video object 123, the calendar object 132, and the address book object 150 are arranged in a top-most arc. In some implementations, an upper region 902 is left blank as a navigational region (e.g., as described in FIG. 7B). In some other implementations, display objects can populate the entire display area 102. In some implementations, the user can set a maximum distance for the ergonomic display object layout. For example, within a setup option (e.g., through the settings object 152), the user could input a thumb sweep gesture, indicating the range of comfortable motion for an ergonomic display region. Displaying additional objects which may not fit within the range of comfortable motion, for example, can be accomplished by aligning the objects in straight rows from the top of the display 102 downwards, in a manner similar to the layout of the display objects 106 as illustrated within FIG. 9A.

Example Mobile Device Displaying Elements Indicating a Restricted Status

Figure 10A:
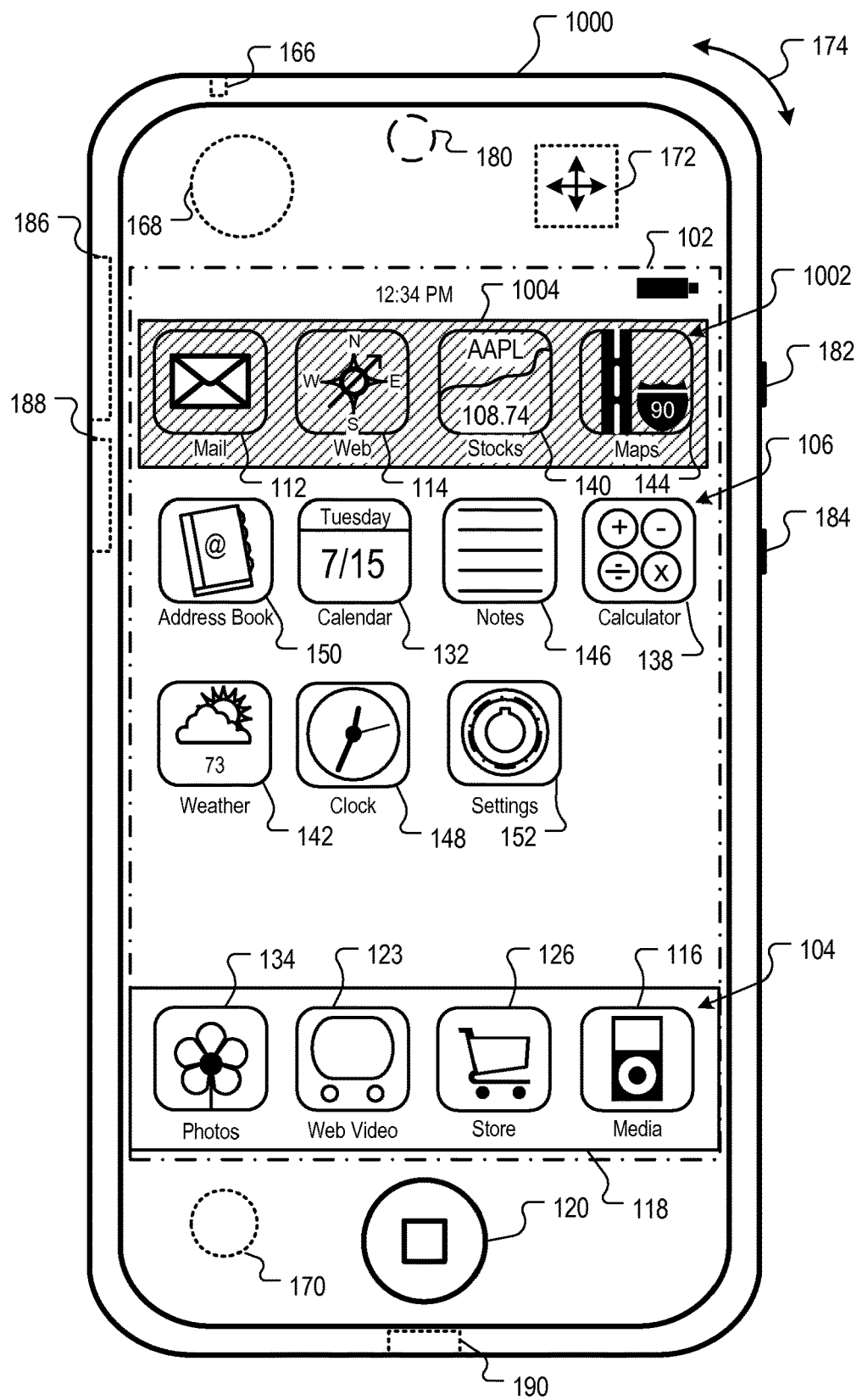
FIG. 10A is a block diagram of an example mobile device displaying user interface elements which have a restricted status.

FIG. 10A is a block diagram of an example mobile device 1000 displaying user interface elements associated with applications which have a restricted status. A set of display objects 1002 are arranged within a restricted applications tray 1004. The display objects 1002 and the tray 1004 are cross-hatched to make them appear darker than the remaining display objects 106, 104 within the touch-sensitive display 102 of the mobile device 1000. The display objects 1002 include the e-mail object 112, the web object 114, the stocks object 140, and the maps object 144. Any number of restricted display objects 1002, in some implementations, can be arranged within the tray 1004. In some implementations, rather than being arranged within a restricted applications tray 1004, visual indications within the restricted display objects 1002 can be used to associate the display objects 1002 with restricted applications. In some examples, the restricted status display objects 1002 can be outlined with a dashed line, made transparent, overlaid with a transparent indicator of restricted status (e.g., text or image), etc.

In some implementations, the applications associated with the display objects 1002 are not presently available for use within the mobile device 1000. For example, to use the e-mail application associated with the e-mail object 112, the user can select the e-mail object 112 and purchase/activate the e-mail application. The applications associated with the restricted display objects 1002, in some implementations, are not fully installed within the mobile device 1000. For example, upon selecting the e-mail object 112 and purchasing the e-mail application, some portion of the e-mail application can be downloaded to the mobile device 1000 (e.g., via the communications devices 186 or 188, through a link from a computer using the port device 190, etc.).

Figure 10B:
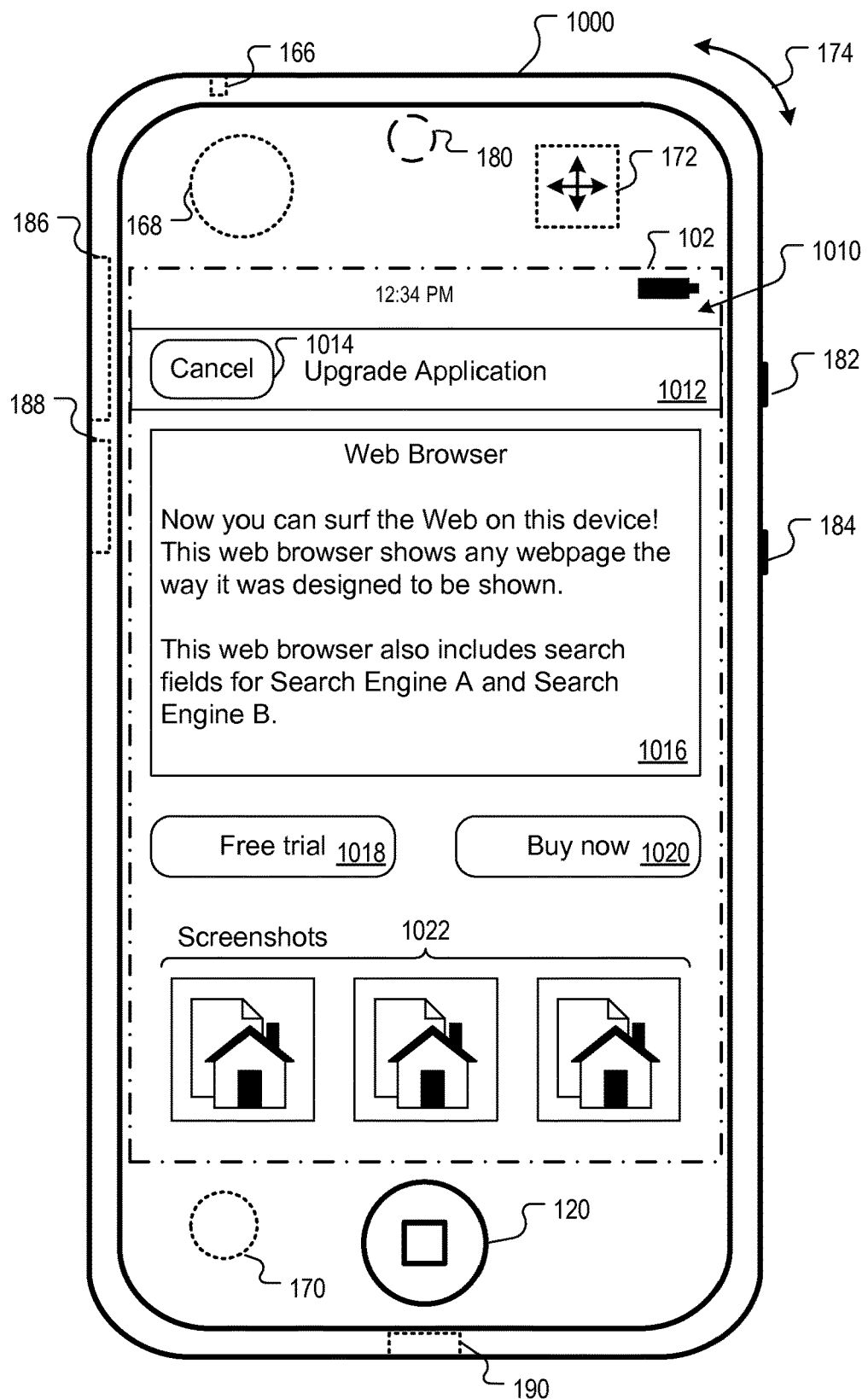
FIG. 10B is a block diagram of an example mobile device displaying an information dialog regarding an interface element which has a restricted status.

FIG. 10B is a block diagram of the example mobile device 1000 displaying an information dialog 1010 regarding the restricted web object 114. The information dialog 1010, for example, can open upon selecting the web object 114 from within the restricted object tray 1004 (as shown in FIG. 10A). A title bar 1012 alerts the user to the opportunity to upgrade the application. A cancel button 1014 provides the user with the option to decline the offer. Selection of the cancel button 1014, for example, can return the user to the display 102 as shown within FIG. 10A. A message box 1016 contains information regarding the capabilities of the restricted application (e.g., a web browsing application associated with the web object 114). In some implementations, navigational means can exist within the message box 1016. For example, if the description of the application does not fit within the space provided by the message box 1016, a scroll bar or other navigational means can be provided to the user to view the remaining information regarding the application. A set of screenshots 1022 illustrate example display layouts using the application associated with the restricted web object 114. For example, the screenshots 1022 can illustrate the browsing, searching, and bookmarking capabilities of the web browser application.

A free trial button 1018 gives the user the opportunity to try the application for a limited time. In some implementations, a version of the application with limited functionality or other limitations is provided to the user during the free trial. For example, the free trial version of the web browsing application can have some features (e.g., bookmarking, history, customized settings, etc.) disabled. A buy now button 1020, in some implementations, can open a further dialog to provide the user with the opportunity to purchase the application. In some implementations, upon selection of the buy now button 1020 or the free trial button 1018, the mobile device 1000 downloads some or all of the application software. In some other implementations, the mobile device 1000 can download a security element (e.g., password, cryptographic key, authorization code, etc.) to unlock the application. For example, the mobile device 1000 can download an encryption key to decrypt the application.

Figure 10C:
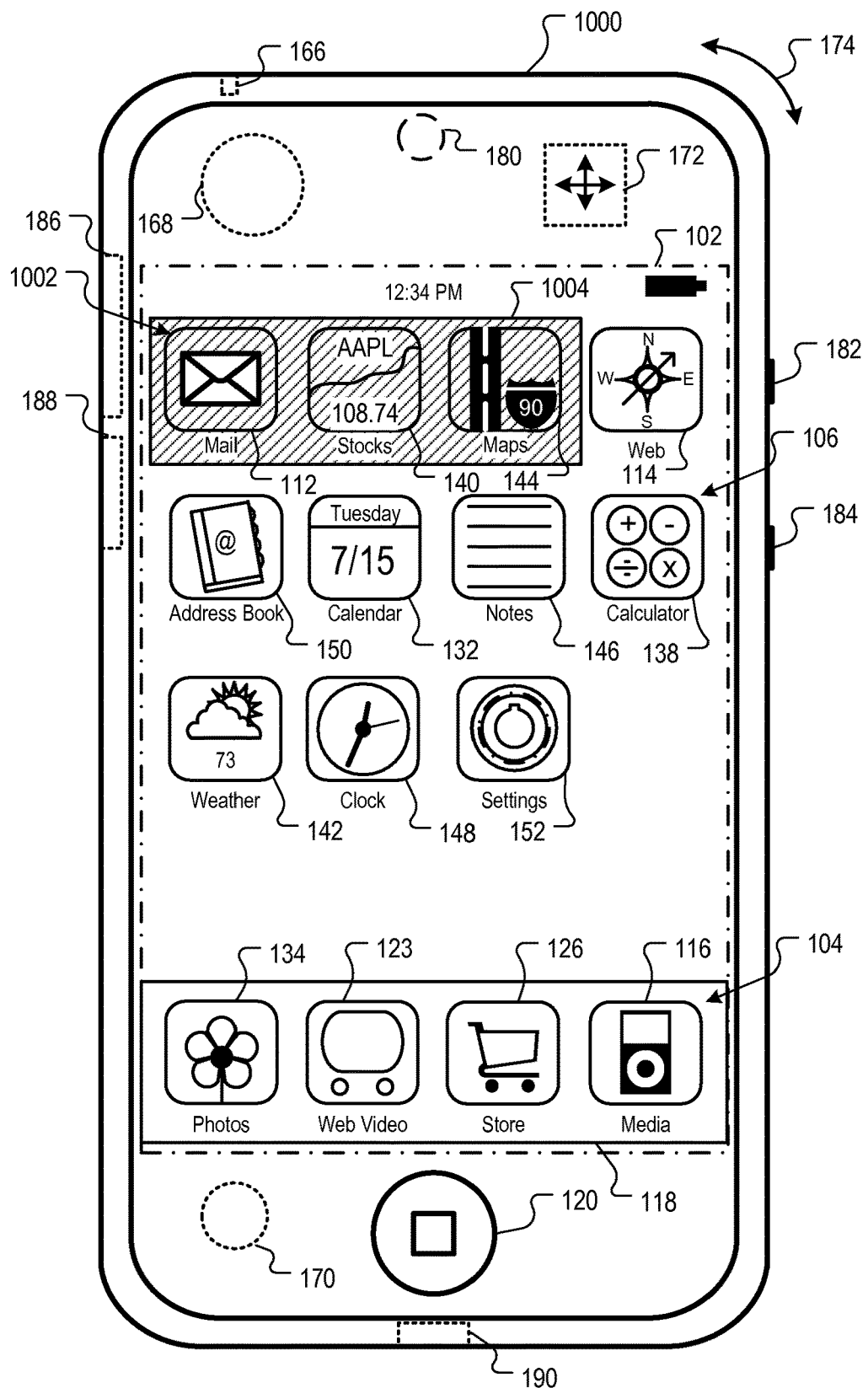
FIG. 10C is a block diagram of an example mobile device displaying user interface elements which have a restricted status.

FIG. 10C is a block diagram of the example mobile device 1000 displaying the web object 114 with an unrestricted status. The web object 114 is no longer located within the restricted tray 1004, and the tray 1004 has been resized accordingly. The web object 114 is free of the hatch-marking associated with the restricted status display objects 1002. In some implementations, the web object 114 is displayed with unrestricted status because the user selected the buy now button 1020 or the free trial button 1018 within the information dialog 1010 (as shown in FIG. 10B). In some other implementations, the user can modify the status of the web application associated with the web object 114 outside of the device 1000. For example, the user could call the service provider of the mobile device 1000 or access the web site of the service provider 1000 to purchase the web application associated with the web display object 114. Upon request by the user, the service provider could then upload to the mobile device 1000 application content and/or a decryption means for making the application available to the user on the mobile device 1000.

In some implementations, upon selecting the free trial button 1018, the web display object 114 could be rendered in a method indicating the temporary availability of the web application. For example, the web display object 114 could be displayed surrounded by a dashed line, overlaid with a transparent symbol, or embellished with another indication representing the temporary status of the availability of the application for use within the device 1000.

Example Mobile Device with Alternative Display

Figure 11:
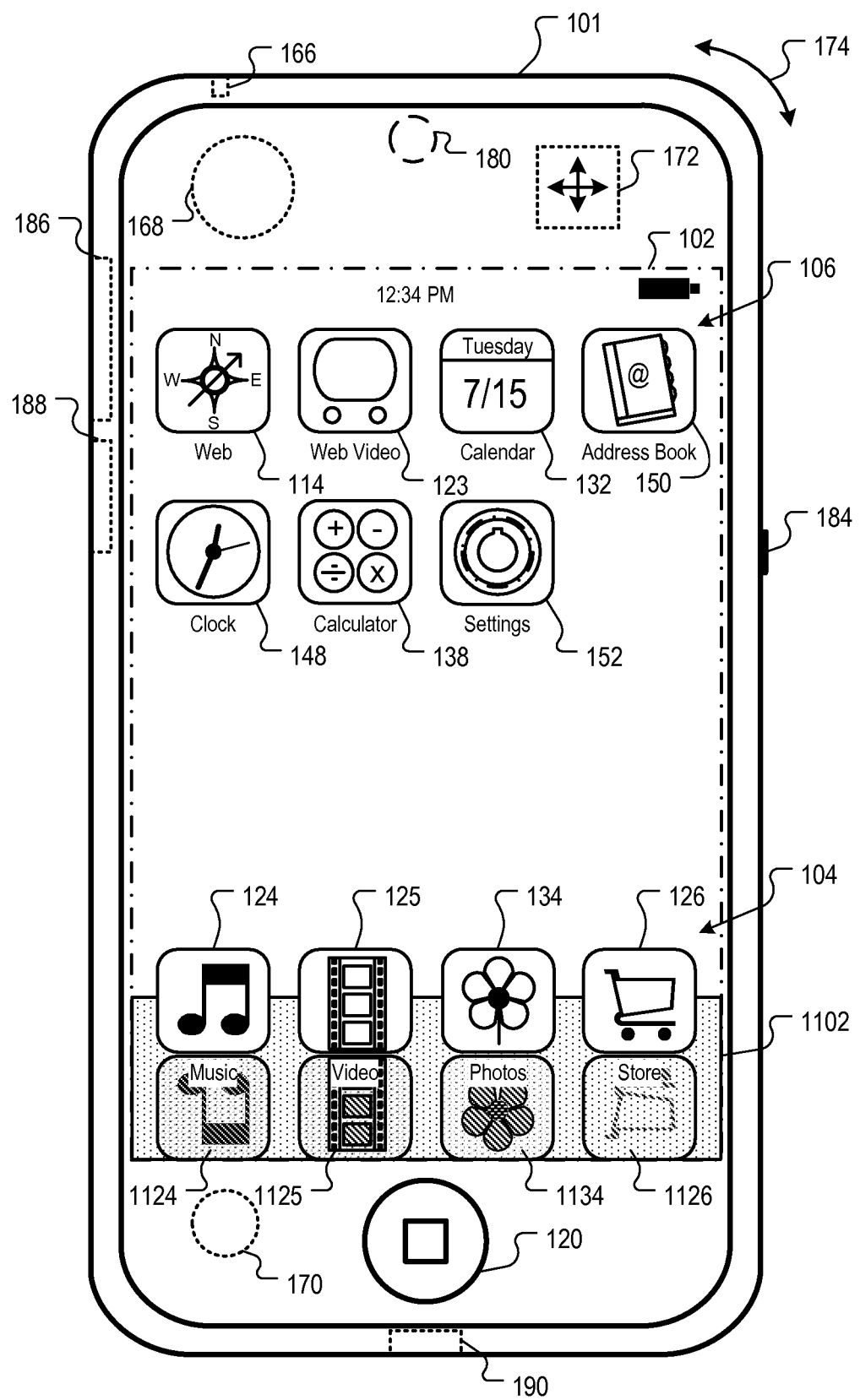
FIG. 11 is a block diagram of an example mobile device with interface elements docked to a menu tray floor.

FIG. 11 is a block diagram of the example mobile device 101 with interface elements docked to a menu tray floor. A docking tray 1102 contains the display objects 104. The music object 124 stands above the docking tray 1102 with a reflection object 1124 beneath it. Similarly, the video object 125, the photo object 134, and the store object 126 are mirrored by the reflection objects 1125, 1134, and 1126. In some implementations, selection of one of the display objects 104 launches the application associated with the display object 104, while selection of the reflection object 1124, 1125, 1134, or 1126 launches an information dialog regarding the associated display object 104. For example, selection of the reflection object 1134 can open a settings dialog associated with the photos application. In some implementations, the reflection objects 1124, 1125, 1134, 1126 are not user-selectable. A display object 104, 106, in some implementations, can be dragged and dropped between the docking tray 1102 and the region of the display 102 which contains the display objects 106. For example, the user can choose to populate the docking tray 1102 with any set (e.g., set of four) of display objects 104, 106 for quick access (e.g., favorites).

In some implementations, the display objects 104, 106 can be repdsitioned by a user. For example, a user can initiate an interface reconfiguration mode on the device 100 or 101. The user may initiate or terminate the interface reconfiguration process by selectin.g one or more appropriate physical buttons on the portable device, by a gesture (such as making contact and swiping one or more fingers across the touch-sensitive display or making contact and holding for more than a predefined time period) and/or by selecting one or more soft buttons (such as one or more icons that are displayed on the touch-sensitive display). As used herein, a gesture is a motion of the object/appendage making contact with the touch screen display surface. In some embodiments, the interface reconfiguration process terminates a pre-defined time after the interface reconfiguration process is initiated, i.e., there is a time out. While in the interface reconfiguration mode, the display objects 104, 106 are movable by the user. The user can touch one of the display objects and drag it to the desired position. The user can drag the display object to an empty position in the display 102, menu bar 118, or docking tray 1102 to drop the display object into that position, to drag the display object to a position between two other display objects to insert the dragged display object into that position, or to drag the display object over another display object in the display 102, menu bar 118, or docking tray 1102 to have the two display objects exchange positions, for example. The repositioning of display objects on a touch-sensitive display is described in further detail in U.S. patent application Ser. No. 11/459, 602, now U.S. Pat. No. 7,509,588, titled "Portable Electronic Device with Interface Reconfiguration Mode," filed Jul. 24, 2006, the disclosure of which is incorporated by reference in its entirety.

In implementations where user interface elements (e.g., display objects 106) can be displayed in multiple pages and the user can navigate between the pages (e.g., as described above in reference to FIGS. 7A-7C and 8A-8C), the user can drag a display object from one page to another. For example, a user can drag a display object within a first page toward the edge of the display 102. When the display object is dragged to within a predetermined distance from the edge of the display (e.g., 5 pixels), a second page is displayed. The user can then position the dragged display object within the second page.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims.

What is claimed is:

1. A method, comprising:
at a computing device with a touch screen display:
displaying a first page that includes application icons in a first area of the touch screen display, wherein:
the first page is one page in a set of pages in an application menu that include application icons,
pages in the application menu are separately displayed in the first area of the touch screen display, and
selection of a respective application icon displayed in the first area of the touch screen display launches an application that corresponds to the respective application icon displayed in the first area of the touch screen display;
displaying a plurality of application icons in a second area, concurrently with the display of the first page that includes application icons in the first area, of the touch screen display, wherein:
the second area is different from the first area, and
selection of a respective application icon displayed in the second area of the touch screen display launches an application that corresponds to the respective application icon displayed in the second area of the touch screen display;
while displaying the first page in the first area and the plurality of application icons in the second area, detecting a first finger swipe gesture on the touch screen display on the first page of application icons in the first area; and
in response to detecting the first finger swipe gesture on the touch screen display in the first area, replacing display of the first page in the application menu with display of a second page in the application menu in the first area on the touch screen display while maintaining display of the plurality of application icons in the second area on the touch screen display, wherein replacing display of the first page in the application menu with display of the second page in the application menu in the first area on the touch screen display comprises an animation that moves the first page out of the first area and the second page into the first area, and wherein the second page in the application menu includes application icons that are different from the application icons in the first page in the application menu.

2. The method of claim 1, wherein the touch screen display has a width, the first page has a width, and the width of the first page substantially fills the width of the touch screen display.

3. The method of claim 1, wherein second area is a menu bar.

4. The method of claim 1, wherein the first page in the first area and the plurality of application icons in the second area are displayed in response to detecting selection of a button.

5. The method of claim 4, wherein the button is a home button.

6. The method of claim 1, including:
while displaying the second page in the first area and the plurality of application icons in the second area, detecting a second finger swipe gesture on the touch screen display; and
in response to detecting the second finger swipe gesture, replacing display of the second page with display of a third page in the application menu in the first area on the touch screen display while maintaining display of the plurality of application icons in the second area on the touch screen display.

7. The method of claim 1, wherein the application menu includes a number of pages that are configured to be separately displayed as a sequence of pages in the first area of the touch screen display, the method further including:
displaying a set of page indicators, wherein the page indicators provide information about the number of pages in the application menu and a position of a displayed page in the sequence of pages; and,
in response to detecting the first finger swipe gesture, updating the information provided by the set page indicators to reflect the replacement of the displayed first page by the second page.

8. The method of claim 1, wherein the first finger swipe gesture is at a location in the first display area where no user interface elements are displayed.

9. The method of claim 1, wherein the application icons displayed in the first area of the first page comprise a first application icon corresponding to a first application and a second application icon corresponding to a second application distinct from the first application.

10. The method of claim 1, wherein the plurality of application icons displayed in the second area comprises a third application icon corresponding to a third application and a fourth application icon corresponding to a fourth application distinct from the third application.

11. A computing device, comprising:
a touch screen display;
one or more processors;
memory; and
one or more programs, wherein the one or more programs are stored in the memory and configured to be executed by the one or more processors, the one or more programs including instructions for:
displaying a first page that includes application icons in a first area of the touch screen display, wherein:
the first page is one page in a set of pages in an application menu that include application icons, pages in the application menu are separately displayed in the first area of the touch screen display, and
selection of a respective application icon displayed in the first area of the touch screen display launches an application that corresponds to the respective application icon displayed in the first area of the touch screen display;
displaying a plurality of application icons in a second area, concurrently with the display of the first page that includes application icons in the first area, of the touch screen display, wherein:
the second area is different from the first area, and
selection of a respective application icon displayed in the second area of the touch screen display launches an application that corresponds to the respective application icon displayed in the second area of the touch screen display;
while displaying the first page in the first area and the plurality of application icons in the second area, detecting a first finger swipe gesture on the touch screen display on the first page of application icons in the first area; and
in response to detecting the first finger swipe gesture on the touch screen display in the first area, replacing display of the first page in the application menu with display of a second page in the application menu in the first area on the touch screen display while maintaining display of the plurality of application icons in the second area on the touch screen display, wherein replacing display of the first page in the application menu with display of the second page in the application menu in the first area on the touch screen display comprises an animation that moves the first page out of the first area and the second page into the first area, and wherein the second page in the application menu includes application icons that are different from the application icons in the first page in the application menu.

12. The device of claim 11, wherein the touch screen display has a width, the first page has a width, and the width of the first page substantially fills the width of the touch screen display.

13. The device of claim 11, wherein second area is a menu bar.

14. The device of claim 11, wherein the first page in the first area and the plurality of application icons in the second area are displayed in response to detecting selection of a button.

15. The device of claim 11, including instructions for:
while displaying the second page in the first area and the plurality of application icons in the second area, detecting a second finger swipe gesture on the touch screen display; and
in response to detecting the second finger swipe gesture, replacing display of the second page with display of a third page in the application menu in the first area on the touch screen display while maintaining display of the plurality of application icons in the second area on the touch screen display.

16. The device of claim 11, wherein the application menu includes a number of pages that are configured to be separately displayed as a sequence of pages in the first area of the touch screen display, the device further including instructions for:
displaying a set of page indicators, wherein the page indicators provide information about the number of pages in the application menu and a position of a displayed page in the sequence of pages; and,
in response to detecting the first finger swipe gesture, updating the information provided by the set page indicators to reflect the replacement of the displayed first page by the second page.

17. The device of claim 11, wherein the first finger swipe gesture is at a location in the first display area where no user interface elements are displayed.

18. The device of claim 11, wherein the application icons displayed in the first area of the first page comprise a first application icon corresponding to a first application and a second application icon corresponding to a second application distinct from the first application.

19. The device of claim 11, wherein the plurality of application icons displayed in the second area comprises a third application icon corresponding to a third application and a fourth application icon corresponding to a fourth application distinct from the third application.

20. A non-transitory computer readable storage medium having stored therein instructions, which when executed by a device with a touch screen display, cause the device to:
display a first page that includes application icons in a first area of the touch screen display, wherein:
the first page is one page in a set of pages in an application menu that include application icons,
pages in the application menu are separately displayed in the first area of the touch screen display, and
selection of a respective application icon displayed in the first area of the touch screen display launches an application that corresponds to the respective application icon displayed in the first area of the touch screen display;
display a plurality of application icons in a second area, concurrently with the display of the first page that includes application icons in the first area, of the touch screen display, wherein:
the second area is different from the first area, and
selection of a respective application icon displayed in the second area of the touch screen display launches an application that corresponds to the respective application icon displayed in the second area of the touch screen display;
while displaying the first page in the first area and the plurality of application icons in the second area, detect a first finger swipe gesture on the touch screen display on the first page of application icons in the first area; and
in response to detecting the first finger swipe gesture on the touch screen display in the first area, replace display of the first page in the application menu with display of a second page in the application menu in the first area on the touch screen display while maintaining display of the plurality of application icons in the second area on the touch screen display, wherein replacing display of the first page in the application menu with display of the second page in the application menu in the first area on the touch screen display comprises an animation that moves the first page out of the first area and the second page into the first area, and wherein the second page in the application menu includes application icons that are different from the application icons in the first page in the application menu.

21. The storage medium of claim 20, wherein the touch screen display has a width, the first page has a width, and the width of the first page substantially fills the width of the touch screen display.

22. The storage medium of claim 20, wherein second area is a menu bar.

23. The storage medium of claim 20, wherein the first page in the first area and the plurality of application icons in the second area are displayed in response to detecting selection of a button.

24. The storage medium of claim 23, wherein the button is a home button.

25. The storage medium of claim 20, including instructions that cause the device to:
while displaying the second page in the first area and the plurality of application icons in the second area, detect a second finger swipe gesture on the touch screen display; and
in response to detecting the second finger swipe gesture, replace display of the second page with display of a third page in the application menu in the first area on the touch screen display while maintaining display of the plurality of application icons in the second area on the touch screen display.

26. The storage medium of claim 20, wherein the application menu includes a number of pages that are configured to be separately displayed as a sequence of pages in the first area of the touch screen display, the storage medium further including instructions that cause the device to:
display a set of page indicators, wherein the page indicators provide information about the number of pages in the application menu and a position of a displayed page in the sequence of pages; and,
in response to detecting the first finger swipe gesture, update the information provided by the set page indicators to reflect the replacement of the displayed first page by the second page.

27. The storage medium of claim 20, wherein the first finger swipe gesture is at a location in the first display area where no user interface elements are displayed.

28. The storage medium of claim 20, wherein the application icons displayed in the first area of the first page comprise a first application icon corresponding to a first application and a second application icon corresponding to a second application distinct from the first application.

29. The storage medium of claim 20, wherein the plurality of application icons displayed in the second area comprises a third application icon corresponding to a third application and a fourth application icon corresponding to a fourth application distinct from the third application.

30. A graphical user interface on a computing device with a touch screen display, comprising:
a first page that includes application icons in a first area of the touch screen display, wherein:
the first page is one page in a set of pages in an application menu that include application icons,
pages in the application menu are separately displayed in the first area of the touch screen display, and
selection of a respective application icon displayed in the first area of the touch screen display launches an application that corresponds to the respective application icon displayed in the first area of the touch screen display; and
a plurality of application icons in a second area on the touch screen display, wherein:
the plurality of application icons in the second area are concurrently displayed with the first page that includes application icons in the first area,
the second area is different from the first area, and
selection of a respective application icon displayed in the second area of the touch screen display launches an application that corresponds to the respective application icon displayed in the second area of the touch screen display;

wherein:

while the first page is displayed in the first area and the plurality of application icons is displayed in the second area, a first finger swipe gesture is detected on the touch screen display on the first page of application icons in the first area; and in response to detecting the first finger swipe gesture on the touch screen display in the first area, display of the first page in the application menu is replaced with display of a second page in the application menu in the first area on the touch screen display while display of the plurality of application icons in the second area on the touch screen display is maintained, wherein replacing display of the first page in the application menu with display of the second page in the application menu in the first area on the touch screen display comprises an animation that moves the first page out of the first area and the second page into the first area, and wherein the second page in the application menu includes application icons that are different from the application icons in the first page of the application menu.

* * * * *